US010728497B2

(12) United States Patent
Siminoff et al.

(10) Patent No.: US 10,728,497 B2
(45) Date of Patent: Jul. 28, 2020

(54) AUDIO/VIDEO DEVICE WITH VIEWER

(71) Applicant: Amazon Technologies, Inc., Seattle, WA (US)

(72) Inventors: Mark Siminoff, Mountain View, CA (US); Matthew J. England, Santa Monica, CA (US); James Siminoff, Pacific Palisades, CA (US); Michael Jason Mitura, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/218,920

(22) Filed: Dec. 13, 2018

(65) Prior Publication Data

US 2019/0364244 A1 Nov. 28, 2019

Related U.S. Application Data

(60) Provisional application No. 62/675,141, filed on May 22, 2018.

(51) Int. Cl.
*H04N 7/14* (2006.01)
(52) U.S. Cl.
CPC ................... *H04N 7/142* (2013.01)
(58) Field of Classification Search
CPC .................................................. H04N 7/14
See application file for complete search history.

(56) References Cited

U.S. PATENT DOCUMENTS

| 7,193,644 B2 | 3/2007 | Carter |
| 8,139,098 B2 | 3/2012 | Carter |
| 8,144,183 B2 | 3/2012 | Carter |
| 8,154,581 B2 | 4/2012 | Carter |

(Continued)

FOREIGN PATENT DOCUMENTS

| CN | 304279386 S | 9/2017 |
| CN | 304897992 S | 11/2018 |

(Continued)

OTHER PUBLICATIONS

EdimaxTV; "Installation of Edimax IC-6220DC Wireless Peephole Camera", retrieved on Jun. 22, 2018 at <<https://www.youtube.com/watch?reload=9&v=6qGH1XzA_7o>>, YouTube, Video, 3 minutes, 2 pages.

(Continued)

*Primary Examiner* — Olisa Anwah
(74) *Attorney, Agent, or Firm* — Lee & Hayes, P.C.

(57) ABSTRACT

An audio/video (A/V) device may include or accommodate a viewer through a barrier. For example, an A/V device may include a first component for installation on an exterior surface of a door, a second component for installation on an interior surface of the door, a viewer that extends through an opening in the door, and a flexible connector that electrically couples the first component and the second component. The A/V device may enable use of an existing hole in the door as part of a door viewer, while also providing the functionality of an A/V device. For example, the A/V device may be configured to receive an input using a button on the first component, generate image data using a camera on the first component, and send the image data to a network device.

20 Claims, 41 Drawing Sheets

(56) References Cited

U.S. PATENT DOCUMENTS

| | | |
|---|---|---|
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| D788,061 S | 5/2017 | Siminoff |
| D789,820 S | 6/2017 | Siminoff et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| D819,476 S | 6/2018 | Siminoff et al. |
| D820,137 S | 6/2018 | Siminoff et al. |
| D820,706 S | 6/2018 | Siminoff et al. |
| D820,707 S | 6/2018 | Siminoff et al. |
| D820,708 S | 6/2018 | Siminoff et al. |
| D822,518 S | 7/2018 | Siminoff et al. |
| D822,519 S | 7/2018 | Siminoff et al. |
| D822,520 S | 7/2018 | Siminoff et al. |
| D829,585 S | 10/2018 | Siminoff et al. |
| D830,871 S | 10/2018 | Siminoff et al. |
| D833,313 S | 11/2018 | Siminoff et al. |
| D837,080 S | 1/2019 | Siminoff et al. |
| 2003/0095185 A1 | 5/2003 | Naifeh |
| 2006/0213682 A1* | 9/2006 | Moon .................... H05K 1/028 174/255 |
| 2007/0103548 A1* | 5/2007 | Carter .................... H04N 7/188 348/143 |
| 2018/0234668 A1* | 8/2018 | Bauswell ............... H04N 7/186 |

FOREIGN PATENT DOCUMENTS

| | | |
|---|---|---|
| CN | 304933710 S | 12/2018 |
| EM | 005795788-0001 L | 1/2019 |
| EP | 2385703 | 11/2011 |
| TW | 265988 A | 12/1995 |
| TW | D170846 A | 10/2015 |
| WO | WO2007081894 | 7/2007 |

OTHER PUBLICATIONS

Australian Office Action dated Aug. 5, 2019 for Australian Patent Application No. 201913629, a counterpart of U.S. Appl. No. 29/675,488, 2 pages.

PCT Search Report and Written Opinion dated Aug. 5, 2019, for the PCT Application No. PCT/US2019/027674, 12 pages.

Chinese Office Action dated Oct. 11, 2019, for Chinese Patent Application No. 201930332256.6, a counterpart foreign application of the U.S. Appl. No. 29/675,488, 1 page.

Chinese Office Action dated Sep. 29, 2019, for Chinese Patent Application No. 201930259756.1, a counterpart foreign application of the U.S. Appl. No. 29/673,311, 1 page.

Chinese Office Action dated Sep. 30, 2019 for Chinese Design Application No. 201930233393.4, a counterpart foreing application of the U.S. Appl. No. 29/670,249.

Japanese Office Action dated Aug. 30, 2019, for Japanese Patent Application No. 2019-012138, a counterpart foreign application of the U.S. Appl. No. 29/673,311, 3 pages.

Japanese Office Action dated Aug. 30, 2019, for Japanese Patent Application No. 2019-012139, a counterpart foreign application of the U.S. Appl. No. 29/673,311, 3 pages.

Japanese Office Action dated Aug. 30, 2019, for Japanese Patent Application No. 2019-012141, a counterpart foreign application of the U.S. Appl. No. 29/673,311, 3 pages.

Japanese Office Action dated Aug. 30, 2019, for Japanese Patent Application No. 2019-012140, a counterpart foreign application of the U.S. Appl. No. 29/673,311, 3 pages.

Japanese Office Action dated Sep. 6, 2019, for Japanese Patent Application No. 2019-010347, a counterpart foreign application of the U.S. Appl. No. 29/670,259, 3 pages.

Japanese Office Action dated Aug. 30, 2019, for Japanese Patent Application No. 2019-012142, a counterpart foreign application of the U.S. Appl. No. 29/673,311, 3 pages.

Japanese Office Action dated Sep. 6, 2019, for Japanese Patent Application No. 2019-010348, a counterpart foreign application of the U.S. Appl. No. 29/670,259, 3 pages.

Chinese Office Action dated Jan. 14, 2020, for Chinese Design Application No. 201930465085.4, a counterpart foreign application of the U.S. Appl. No. 29/681,330, 1 pages.

Translated Taiwanese Office Action dated Dec. 12, 2019 for Taiwanese Patent Application No. 108302982, a counterpart of U.S. Appl. No. 29/673,311, 2 pages.

Translated Taiwanese Office Action dated Dec. 13, 2019 for Taiwanese Patent Application No. 108302983, a counterpart of U.S. Appl. No. 29/673,311, 2 pages.

Translated Taiwanese Office Action dated Dec. 13, 2019 for Taiwanese Patent Application No. 10821187230, a counterpart of U.S. Appl. No. 29/673,311, 2 pages.

Registration Design No. 005795788-0001. Application No. 005795788, filed on Nov. 10, 2018. 5 pages.

Taiwanese Office Action dated Nov. 15, 2019 for Taiwanese Patent Application No. 108302722, a counterpart of U.S. Appl. No. 29/670,249, 4 pages.

Taiwanese Office Action dated Nov. 15, 2019 for Taiwanese Patent Application No. 108302720, a counterpart of U.S. Appl. No. 29/670,249, 4 pages.

Taiwanese Office Action dated Nov. 15, 2019 for Taiwanese Patent Application No. 108302721, a counterpart of U.S. Appl. No. 29/670,249, 4 pages.

Taiwanese Office Action dated Nov. 15, 2019 for Taiwanese Patent Application No. 108302725, a counterpart of U.S. Appl. No. 29/670,259, 4 pages.

Taiwanese Office Action dated Nov. 15, 2019 for Taiwanese Patent Application No. 108302724, a counterpart of U.S. Appl. No. 29/670,259, 4 pages.

Taiwanese Office Action dated Nov. 15, 2019 for Taiwanese Patent Application No. 108302726, a counterpart of U.S. Appl. No. 29/670,259, 4 pages.

(56) References Cited

OTHER PUBLICATIONS

Taiwanese Office Action dated Dec. 12, 2019 for Taiwanese Patent Application No. 108302982, a counterpart of U.S. Appl. No. 29/673,311, 6 pages.
Taiwanese Office Action dated Dec. 13, 2019 for Taiwanese Patent Application No. 108302983, a counterpart of U.S. Appl. No. 29/673,311, 3 pages.
TW265988. 6 pages.
201430358777.6. Sep. 25, 2014. Ma, Shou Kun; Chen, Meng Ling; 7 pages.
Japanese Office Action dated Jan. 31, 2020 for Japanese Patent Application No. 2019-014703, a counterpart of U.S. Appl. No. 29/675,488, 3 pages.
Japanese Office Action dated Jan. 31, 2020 for Japanese Patent Application No. 2019-014704, a counterpart of U.S. Appl. No. 29/675,488, 3 pages.
Japanese Office Action dated Jan. 31, 2020 for Japanese Patent Application No. 2019-014705, a counterpart of U.S. Appl. No. 29/675,488, 3 pages.
Japanese Office Action dated Jan. 31, 2020 for Japanese Patent Application No. 2019-014706, a counterpart of U.S. Appl. No. 29/675,488, 3 pages.
Taiwanese Office Action dated Dec. 13, 2019 for Taiwanese Patent Application No. 10821187230, a counterpart of U.S. Appl. No. 29/673,311, 3 pages.

\* cited by examiner

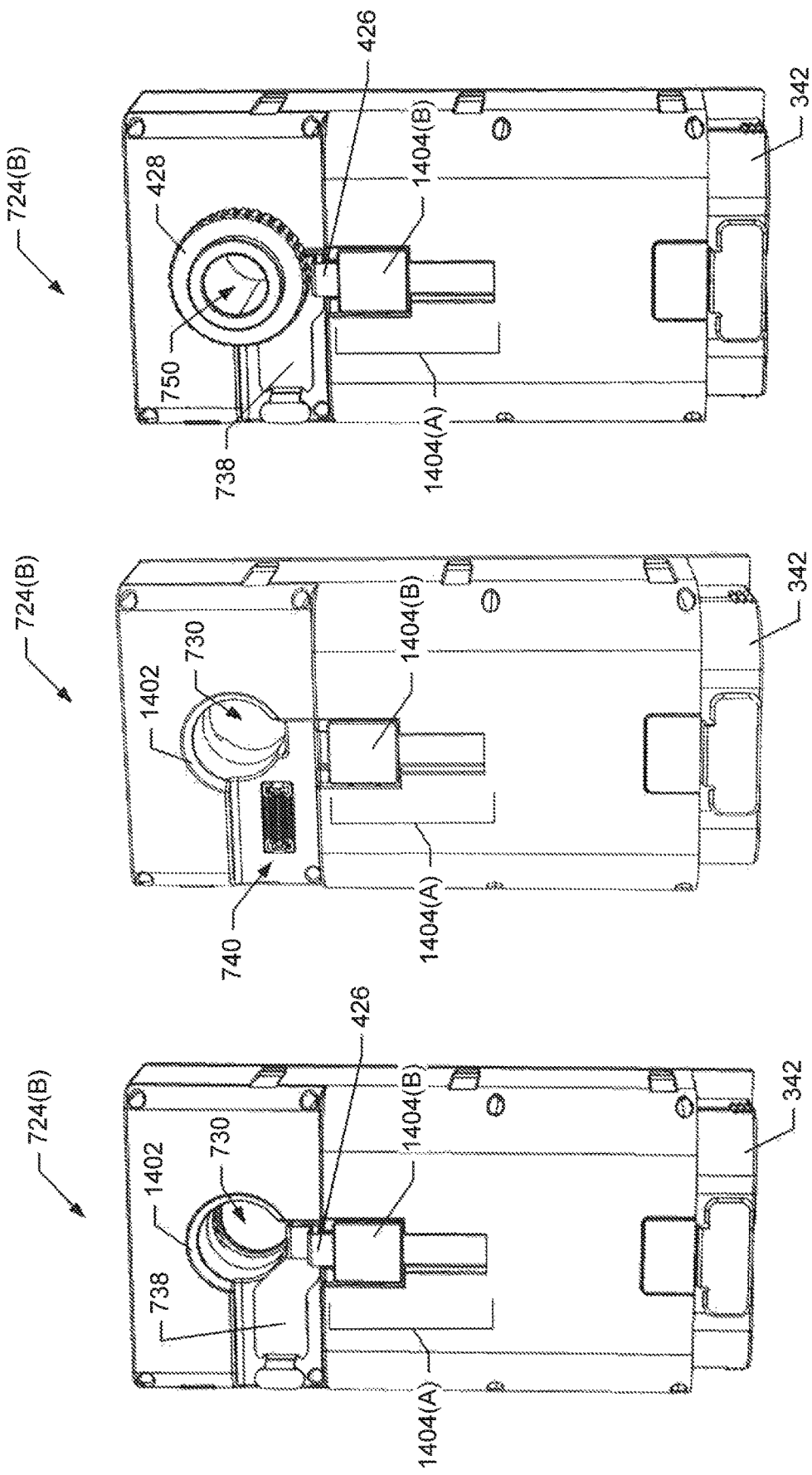

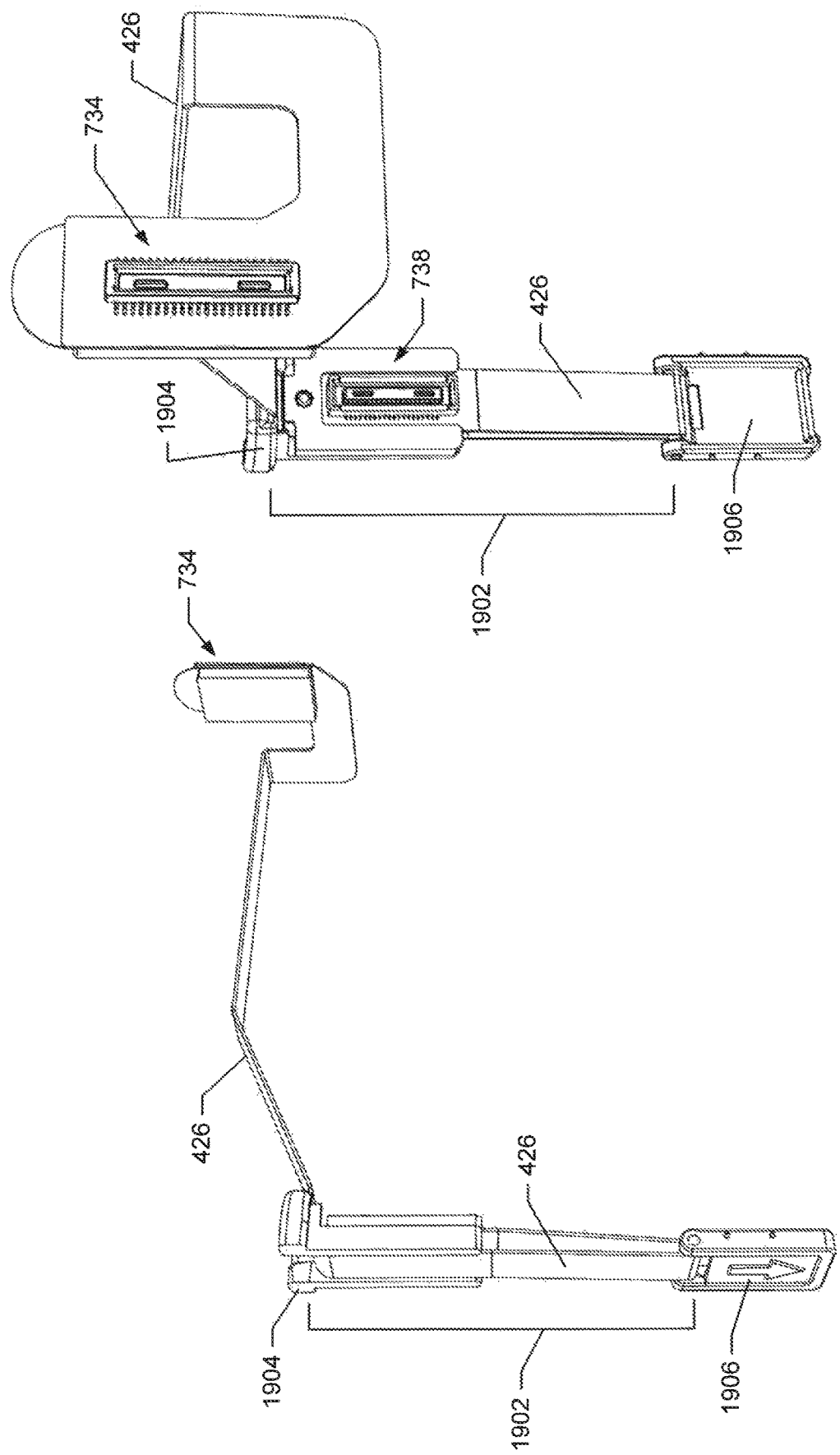

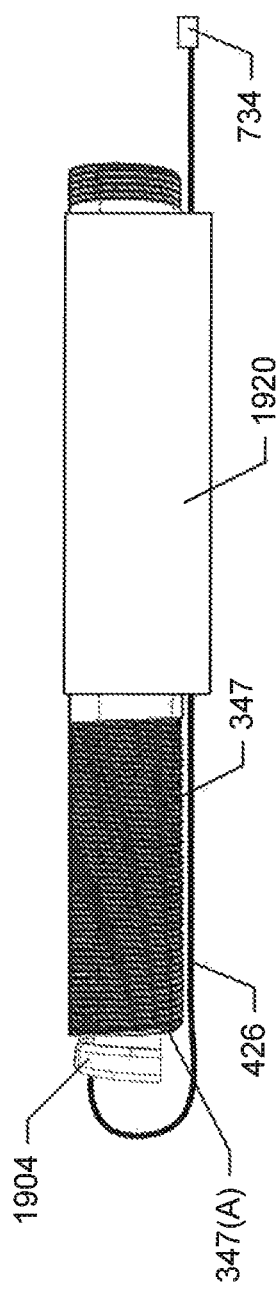
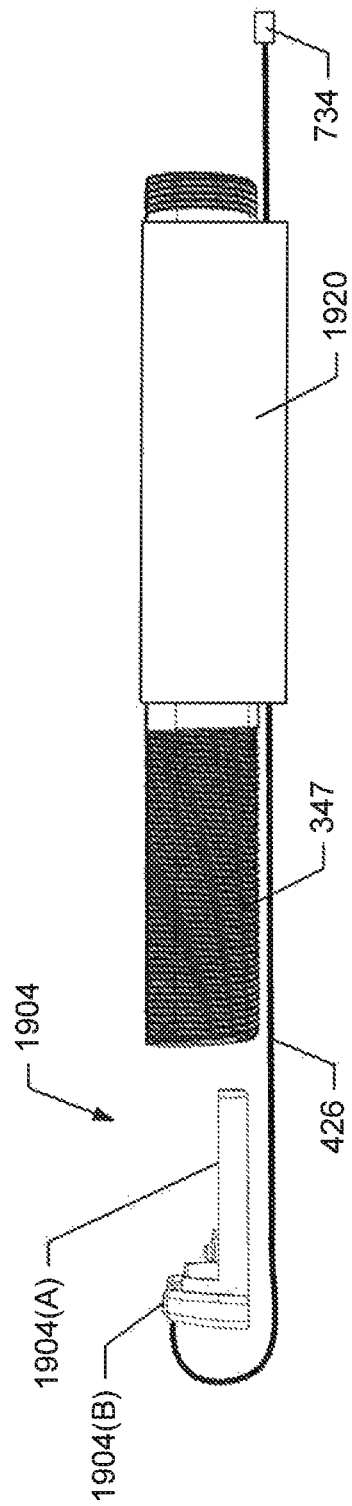
FIGURE 19K
FIGURE 19L

AUDIO/VIDEO DEVICE WITH VIEWER

This Application claims priority to 62/675,141, filed May 22, 2018, which is incorporated herein by reference.

BACKGROUND

Home security is a concern for many homeowners and renters. Those seeking to protect or monitor their homes often wish to have video and audio communications with visitors, for example, those visiting an external door or entryway. A/V devices provide this functionality, and can also aid in crime detection and prevention. For example, audio and/or video captured by an A/V device can be uploaded to the cloud and recorded on a remote server. Subsequent review of the audio and/or video can aid law enforcement in capturing perpetrators of home burglaries and other crimes. Further, the presence of one or more A/V devices on the exterior of a home acts as a powerful deterrent against would-be burglars.

BRIEF DESCRIPTION OF THE DRAWINGS

The various embodiments of the present audio/video (A/V) device with a viewer now will be discussed in detail with an emphasis on highlighting the advantageous features. These embodiments depict the novel and non-obvious A/V device with a viewer shown in the accompanying drawings, which are for illustrative purposes only. These drawings include the following figures, in which like numerals indicate like parts:

FIG. 14A is a rear perspective view of a second component of another A/V device with a viewer and showing a portion of a housing of the second component removed, according to various aspects of the present disclosure;

FIG. 14B is a rear perspective view of the second component of FIG. 14A without a coupler, according to various aspects of the present disclosure;

FIG. 14C is a rear perspective view of the second component of FIG. 13A with a fastener, according to various aspects of the present disclosure;

FIG. 19D is a side perspective view illustrating an example flexible connector, a connector holder, and a tab, according to various aspects of the present disclosure;

FIG. 19E is a rear perspective view illustrating the example flexible connector, the connector holder, and the tab of FIG. 19D, according to various aspects of the present disclosure;

FIG. 19K is a side view illustrating the example connector holder of FIG. 19G inserted within an opening in a tubular member, according to various aspects of the present disclosure;

FIG. 19L is a side view illustrating the example connector holder of FIG. 19G removed from a tubular member, according to various aspects of the present disclosure;

DETAILED DESCRIPTION

Figure 1:
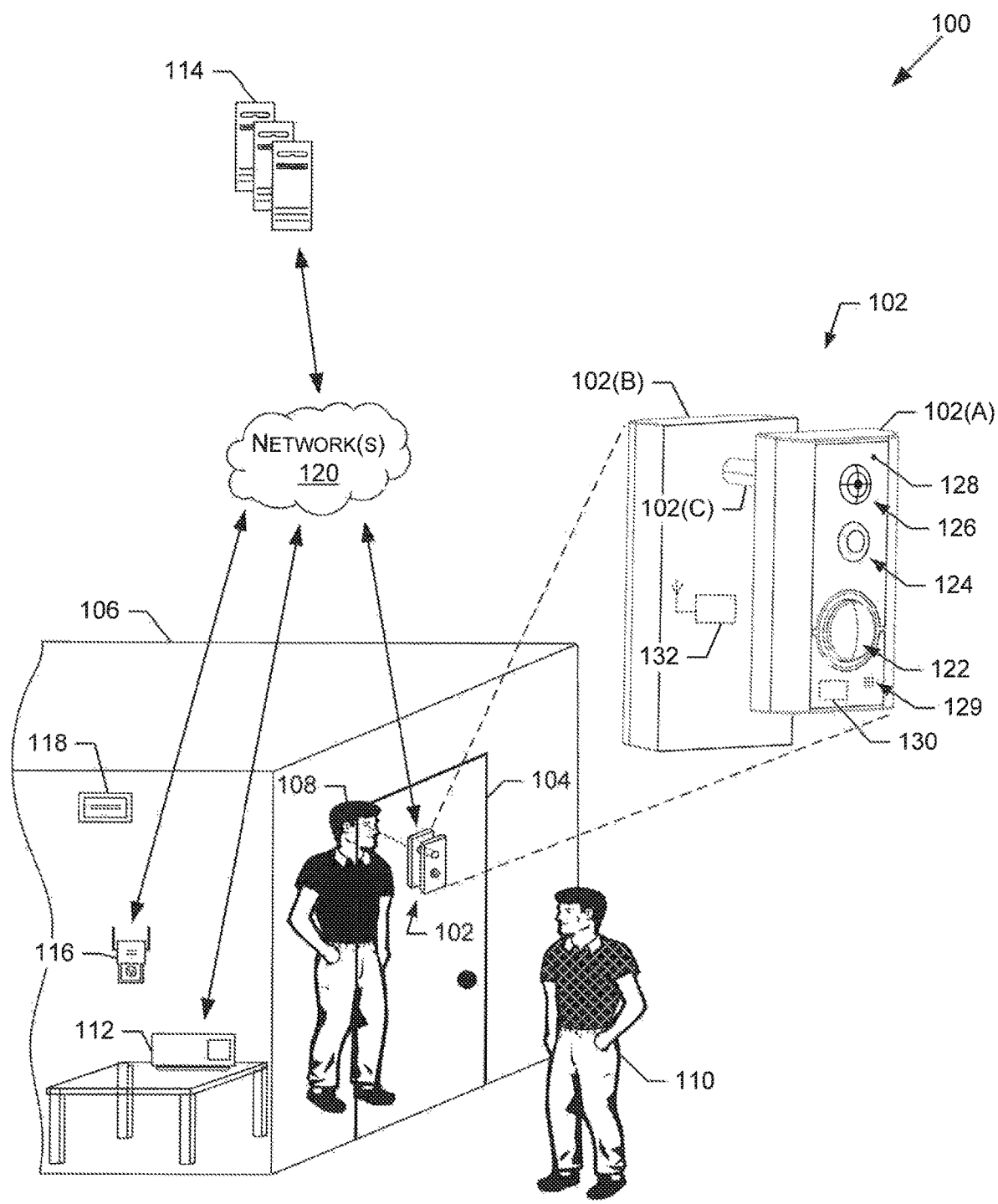
FIG. 1 is a schematic diagram of an example architecture in which an A/V device with a viewer may be implemented, according to various aspects of the present disclosure.

The various embodiments of the present audio/video (A/V) device with a viewer have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that A/V devices, such as A/V doorbells, depending on the orientation of an entryway to a structure, may not provide as useful a field of view to a user as desired. For example, wiring on a house may require an A/V device to be installed at a location that is not ideal for capturing video, such as on a surface perpendicular to the door, at a location that is relatively low, in a corner, etc., thereby limiting the field of view of the A/V device, which may ultimately decrease the effectiveness of the A/V device. As another example, an A/V device that is installed outside on a front porch of a house may be required to communicate with a device within the house through an exterior wall of the house, which may obstruct or otherwise diminish the wireless communication.

Another aspect of the present embodiments includes the realization that some users, especially users renting their residences, may not want to permanently mount an A/V device to a wall of the property to avoid causing damage (e.g., drilling holes, leaving adhesive residue, etc.) that may require the user to repair and/or pay for the damage. Such users may therefore be less inclined to install an A/V device, thereby removing the added security that the A/V device could provide to the user.

Another aspect of the present embodiments includes the realization that electrical connectors that are used to connect devices, such as wires and/or flex printed circuit boards, are fragile and may be damaged when connecting devices. For example, an electrical connector that is fed from one side of a barrier to the other side of the barrier through an opening in the barrier may be damaged if the electrical connector is bent or otherwise moved in a manner that damages the electrical connector.

Another aspect of the present embodiments includes the realization that A/V devices that are mountable on a barrier do not preserve the existing viewer that extends though an opening in the barrier. For example, A/V devices mountable on a barrier typically include a camera that is positioned within, or at the inside end of, the opening in the barrier. Such A/V devices thus prevent a user from looking through the viewer.

The present embodiments solve these problems by, for example, providing an A/V device that includes or accommodates a viewer through a barrier. The A/V device may be attached to, or around, an opening in the barrier, such as an existing hole where a door viewer was installed. For example, an A/V device may include a first component for installation on an exterior surface of a door, a second component for installation on an interior surface of the door, and a viewer that extends through the opening in the door to enable use of the existing hole as a door viewer, while also providing the functionality of an A/V device. In examples, a flexible connector may be installed in the opening to electrically connect the first component to the second component. For example, the flexible connector may be attached to the viewer during installation and inserted through the opening, such as from the exterior side of the door. Once inserted, the flexible connector (e.g., a coupler) may be connected to the second component on the interior side of the door. Although, in other examples, the A/V device may be installed in a different manner. The first component, the second component, and/or the viewer may include passages and/or lenses to enable a user to view through the barrier (e.g., as a door viewer). In examples, the A/V device may include some features within the first component and some features within the second component. For example, a camera, a motion sensor, a button, etc. may be part of the first component on the exterior of the door, while a wireless transceiver, a battery, etc. may be part of the second component on the interior of the door, although in other examples the elements may be partitioned differently.

In some examples, by enabling installation of an A/V device through an opening in a barrier, such as an existing opening, an A/V device may be installed in an efficient manner without marking or damaging the barrier (e.g., in a manner that preserves an existing opening in the barrier). For example, the A/V device may include a viewer that enables a first component and a second component to be connected on separate sides of the barrier through the opening and/or enables installation of a flexible connector to connect the first and second components without damaging the flexible connector. In addition, the A/V device may have a better field of view of an environment (e.g., positioned at eye level, positioned at a door where people enter, etc.), in comparison to wall-mounted A/V devices, such as A/V doorbells. Moreover, the A/V device may provide various functionality, such as receiving input through a button, capturing image data, detecting motion, etc., while at the same time enabling a user to maintain use of a door viewer when the user is physically present at his or her door. Additionally, in examples where a wireless transceiver is positioned in a component of an A/V device that is installed on an interior surface of a door, the A/V device may provide better wireless connectivity (e.g., because an exterior wall, door, or other barrier may not obstruct a wireless transceiver from receiving signals on a local network). Accordingly, the present embodiments provide an A/V device that is easier to install and use, more reliable, and provides more efficient wireless communication, thereby increasing its usage and effectiveness, and ultimately enhancing the safety and security of people associated with the property, the property itself, and/or the surrounding neighborhood.

In a non-limiting illustration, an A/V device includes a first component configured for installation on an exterior surface of a barrier, such as a door, wall, window, gate, etc. The A/V device also includes a second component configured for installation on an interior surface of the barrier. In some examples, the A/V device includes a viewer to connect the first component to the second component. In other examples, the first component and/or the second component may attach to the barrier without the viewer (e.g., with a fastener, adhesive, etc.). The viewer may be installed within an opening in the barrier. The A/V device may also include a flexible connector that electrically couples and/or communicatively couples the first component to the second component. The flexible connector may extend from the first component to the second component through the opening in the barrier and, in examples where the A/V device includes the viewer, the flexible connector may extend through the barrier in addition to the viewer. In examples where both the flexible connector and the viewer extend through the opening in the barrier, the viewer may include a first portion of the exterior surface that is circular, and a second portion of the exterior surface that is flat, where the second portion that is flat provides space within the opening in the barrier for the flexible connector to extend through (e.g., when the flexible connector is a flex printed circuit board).

The viewer may include a passage extending between a first end of the viewer and a second end of the viewer along a first longitudinal axis of the viewer. In some examples, the viewer has an elongated tubular shape or other shape configured for installation within the opening in the barrier. In some examples, the viewer also includes a lens disposed within the passage. The viewer may be part of the first component and/or the second component, or may be a separate element configured to attach to the first component, the second component, and/or the opening in the barrier.

The first component may include a first housing having a first front surface spaced from the exterior surface of the barrier and a first rear surface abutting the exterior surface and opposite the first front surface. The first housing may also include a first opening extending from the first rear surface into the first housing toward the first front surface. The first opening may include a second longitudinal axis that, when the A/V device is installed on the barrier, is substantially aligned with the first longitudinal axis of the viewer. The first component may also include a lens proximate the first front surface, such as a fisheye lens, another wide-angle lens (e.g., angle above a threshold), or any other type of lens. The lens of the first component and/or the lens of the viewer may be aligned to comprise a door viewer (e.g., to enable a user to see through the barrier). In some examples, the first component includes a camera, a microphone, a button, and/or a motion sensor.

The second component may include a second housing having a second front surface abutting the interior surface of the barrier and a second rear surface spaced from the interior surface and opposite the second front surface. The second housing may also have a second opening extending from the second rear surface into the second housing toward the second front surface. The second opening may have a third longitudinal axis that, when the A/V device is installed on the barrier, is substantially aligned with the first longitudinal axis of the viewer. In some examples, the second housing has a cover proximate the second front surface, such as a transparent or semi-transparent cover. In some examples, the second component includes a wireless transceiver and/or a battery to provide power to the first component and/or the second component (e.g., via the flexible connector).

The A/V device may include a connector holder to assist in attaching the flexible connector to the second component. For example, the connector holder may have a first portion that extends in a first direction and a second portion that extends from the first portion such that the second portion extends in a second direction transverse to the first direction. In examples, an outer shape of the second portion may correspond to an inner shape of a passage of the viewer. The connector holder may retain at least a portion of the flexible connector, such as a coupler on one end of the flexible connector. During installation, the connector holder (which is attached to the coupler of the flexible connector) may be placed within the passage of the viewer and the combined components may be inserted through an opening in the barrier, such as from an exterior side to an interior side of the barrier. Once inserted, the connector holder may be removed from the passage and attached to a first end of a channel within the second component. The first end of the channel may include a connection port to connect to the coupler of the flexible connector. In examples, the flexible connector may be looped around a tab, and the tab may be pulled to remove excess length in the flexible connector that may be due to different thicknesses of barriers. The tab may be attached to a second end of the channel to maintain the excess length of the flexible connector in a tightened state. In examples, the channel may include an undercut to engage a detent on the tab (e.g., to enable a friction fit engagement).

The first component and/or the second component of the A/V device may include one or more processors and/or memory to enable various functionality. In examples, the camera and/or the microphone that is positioned on the first component (e.g., an exterior of the barrier) may generate image data and/or audio data when motion is detected by the A/V device. Motion may be detected in a variety of ways, such as by the camera, by the motion sensor, by an additional sensor included in the first component and/or the second component (e.g., an accelerometer, a gyroscope, and/or a magnetometer), etc. The wireless transceiver may send the image data and/or the audio data (and/or a notification regarding such data) to a network device, a client device, or any other device. The notification may inform a user associated with the A/V device, another entity, an application, etc. of motion at the A/V device.

In examples, the A/V device may include an additional sensor, besides the motion sensor, in the first component and/or the second component. The additional sensor may include an accelerometer, a gyroscope, a magnetometer, etc. Based on data from the additional sensor, the A/V device may detect more than a threshold amount of movement or vibration of the A/V device, detect a change to an orientation of the A/V device, etc. These conditions may indicate that a person or object has contacted or moved the barrier to which the A/V device is attached (e.g., a user has knocked on a door, a user or intruder is opening or closing the door, etc.). In response, the camera may capture image data and/or the microphone may generate audio data. Further, the A/V device may send a notification regarding such movement or vibration to a network device, a client device, and/or any other device. As yet another example, the A/V device may cause a speaker(s) to output audio. The speaker(s) may be included within the first component and/or the second component, or may be included in a device that is separate from the A/V device, such as a doorbell signaling device. The A/V device may cause the speaker(s) to output audio when the A/V device detects motion, movement or vibration, a change in an orientation of the A/V device, etc. In yet other examples, the A/V device may perform a multitude of other operations.

Although various elements are discussed as being included within a particular component, the elements may be included or arranged differently. For example, in the above description, the camera, the microphone, the button, the motion sensor, the battery, the wireless transceiver, the one or more processors, and/or the memory may be included in any of the first component, the second component, the viewer, and/or the flexible connector.

In another non-limiting illustration, an A/V device divides light from an opening in a barrier into two paths. One path may be used to capture image data with a camera and the other path may be used as a door viewer. In particular, in this illustration, the A/V device includes a first component configured for installation on an exterior surface of the barrier and a second component configured for installation on an interior surface of the barrier. The first component and the second component may be aligned to the opening in the barrier. In some examples, the A/V device includes a viewer to connect the first component to the second component. In other examples, the first component and/or the second component may attach to the barrier without the viewer. The second component includes a beam splitter to split light received through the opening in the barrier. The beam splitter may split the light into a first beam of light and a second beam of light. The second component may include a camera aligned to receive the first beam of light. The camera may capture image data from the first beam of light. The second component may also include an additional lens to receive the second beam of light. The additional lens may comprise a door viewer to enable a user to see through the barrier.

Another aspect of the present embodiments includes the realization that it is often difficult to determine if a person is knocking on a door. In some examples, people may not recognize a location of a doorbell, or, when the doorbell is an A/V doorbell, the people may not understand how to operate the A/V doorbell and, as a result, may knock on the door. However, a person that knocks on a door may not be heard within a property (e.g., a home) due to, for example, insufficient force applied when knocking, noise within the home, a location of the home's occupants being too far from the door, etc. As such, people within the home may not be informed that someone is at the door. Further, yet another aspect of the present embodiments includes the realization that doors are often opened or closed without users being notified. Door sensors of security systems may be implemented to account for door breaches, but door sensors also may require a smart-home hub device, or another home security type device, to allow the signal from the door sensor to reach the user. However, not all users have home security systems, or smart-home hub devices, installed at their houses.

The present embodiments solve these problems by, for example, providing an A/V device that detects movement and/or vibration on a barrier. For example, an A/V device may be configured for installation on a door. The A/V device may include a sensor, such as an accelerometer, a gyroscope, or a magnetometer. The sensor may be used to detect movement and/or vibration of the door. In response, the A/V device may capture image data and send the image data to a network device, a client device, or any other device. Additionally, or alternatively, the A/V device may send a notification regarding the movement and/or vibration to the network device, the client device, or any other device. The notification may inform a user about activity occurring at the door without the requirement that the user have a home security system installed. Accordingly, the present embodiments provide an A/V device that provides more efficient notifications regarding activity at a barrier, thereby increasing its usage and effectiveness, and ultimately, enhancing the safety and security of people associated with the property, the property itself, and/or the surrounding neighborhood.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a schematic diagram of an example environment 100 in which various aspects of the present disclosure may be implemented. In particular, the environment 100 includes an A/V device 102 attached to a door 104 of a house 106. The A/V device 102 may include a first component 102(A) (also referred to as "exterior component 102(A)") for mounting on an exterior surface of the door 104 and a second component 102(B) (also referred to as "interior component 102(B)") for mounting on an interior surface of the door 104. In some examples, the A/V device 102 may also include a third component 102(C) (also referred to as "viewer 102(C)") that extends through an opening in the door 104, such as a preexisting hole for a door viewer or a newly created hole for the A/V device 102. In some examples, the A/V device 102 may replace a door viewer installed in the door 104 or attach around an existing door viewer. As such, the A/V device 102 may include, or be associated with, a door viewer to enable a user 108 inside the house 106 to view a user 110 outside the house 106 and/or any other things outside the house 106 within a field of view (FOV) of the door viewer (which FOV may be expanded, in some examples, using a wide-angle lens, a fish eye lens, or the like). The A/V device 102 may communicate with a hub device 112, a backend server 114, a first signaling device 116, a second signaling device 118, and/or any other device directly (wirelessly or over a wired connection) and/or via one or more networks 120 and/or network devices (e.g., the smart-home hub device 112, the backend server 114, etc.).

In the example of FIG. 1, the exterior component 102(A) of the A/V device 102 includes a button 122, a camera 124, a lens 126, a microphone 128, a speaker 129, and a sensor 130. The button 122 may be pressed, such as by the user 110, to activate at least one of the first signaling device 116 and the second signaling device 118. The camera 124 may capture image data representative of a FOV for the camera 124. The lens 126 may comprise a fisheye lens or any other lens. The microphone 128 may generate audio data. The sensor 130 may include an accelerometer, a gyroscope, a magnetometer, and/or a glass break detector. In the example of FIG. 1, the interior component 102(B) includes a wireless transceiver 132 for communicating with the hub device 112, the backend server 114, the first signaling device 116 (e.g., a wireless speaker), the second signaling device 118 (e.g., a digital or mechanical doorbell signaling device), and/or any other device. The exterior component 102(A) and/or the interior component 102(B) may include additional, or different components, as discussed herein.

As illustrated, the exterior component 102(A) and the interior component 102(B) are associated with (in some examples, coupled to) the viewer 102(C). In some examples, the exterior component 102(A) and the interior component 102(B) may be secured to the door 104 by being secured to the viewer 102(C). For example, the viewer 102(C) may include structure, such as threads, at one or both ends of the viewer 102(C), and the viewer may extend into a first opening in the exterior component 102(A) and a second opening in the interior component 102(B). In some examples, the engagement between the viewer 102(C) and the exterior component 102(A) and the interior component 102(B) may be tightened (e.g., using male/female threading, using tension, using adhesive, etc.) to reduce the lateral length of the viewer between the exterior component 102(A) and the interior component 102(B), thereby pulling the exterior component 102(A) toward the exterior surface of the door 104 and pulling the interior component 102(B) toward an interior surface of the door 104 until the A/V device is securely mounted on the door 104. In other examples, the exterior component 102(A) and the interior component 102(B) may be securely mounted on the door 104 using alternative methods, such as by adhesively securing the exterior component 102(A) and the interior component 102(B) to the door 104, screwing, nailing, or otherwise physically securing the exterior component 102(A) and the interior component 102(B) to the door 104, and/or by other methods.

The first signaling device 116 and/or the second signaling device 118 may be any type of signaling device, such as a wired signaling device, a wireless signaling device, etc. The first signaling device 116 and/or the second signaling device 118 may include a speaker, an electronic/digital signaling device, a mechanical signaling device, and/or another device to output sound. In the example of FIG. 1, the first signaling device 116 is plugged into an electrical outlet in the house 106 and communicates wirelessly with the A/V device 102 (and/or the hub 112 and/or the backend server 114) to output sound. Here, the first signaling device 116 is implemented as a combination wireless network extender and signaling device, and the second signaling device 118 is implemented as a mechanical or electronic/digital signaling device, such as one that is hard-wired to an existing doorbell.

In some examples, the A/V device 102 operates in cooperation with the hub device 112, the backend server 114, the first signaling device 116, and/or the second signaling device 118 to perform a variety of operations. As one example, the A/V device 102 may capture image data with the camera 124 and generate audio data with the microphone 128 when motion is detected from the user 110 and/or when the user 110 knocks on or contacts the door 104. The A/V device 102 may further detect a button press when the user 110 contacts the button 122. The A/V device 102 may send, using the wireless transceiver 132, the image data, the audio data, an indication of the button press, and/or a notification to the hub device 112 and/or the backend server 114. The hub device 112 and/or the backend server 114 may perform processing on the received data, notify a user associated with the A/V device 102 of an event (e.g., detected motion, movement, vibration, the button press, etc.), send the image data, the audio data, and/or the indication of the button press, and/or perform other processing. As another example, the A/V device 102 may detect more than a threshold amount of movement or vibration of the A/V device 102, detect a change to an orientation of the A/V device 102, etc., based on data from the sensor 130. These events may indicate that the user 108 and/or the user 110 has contacted or moved the door 104 (e.g., the user 110 has knocked on the door 104, the user 108 and/or the user 110 is opening or closing the door 104, etc.). In response, the A/V device 102 may cause the camera 124 to activate and capture image data and/or the microphone 128 to active and generate audio data. Further, the A/V device 102 may send, using the wireless transceiver 132, the image data, the audio data, and/or an indication of the movement or vibration to the hub device 112 and/or the backend server 114. As yet another example, the A/V device 102 may cause the speaker 129, the first signaling device 116, and/or the second signaling device 118 to output audio when the A/V device 102 detects motion, movement or vibration, a change in an orientation of the A/V device, etc. In some examples, the same audio may be output for each type of detected event, while in other examples, one or more different sounds may be output for different types of detected events (e.g., motion detected causes output of first audio and a press of the button 122 causes output of second audio). In yet other examples, the A/V device 102 may perform a variety of other operations.

Although the door 104 is illustrated in the example of FIG. 1, the A/V device 102 may be attached to other types of barriers, such as walls, windows, gates, or other objects. Further, while the door 104 in FIG. 1 is a front door for the house 106, the door 104 may be any type of door, such as a garage door, a back door, a sliding door, a hinged door, etc. Further, although various functionality and/or components are discussed as being embodied in the exterior component 102(A), the interior component 102(B), and the viewer 102(C), respectively, the functionality and/or components may be implemented in other configurations, as discussed in further detail hereafter.

Figure 2:
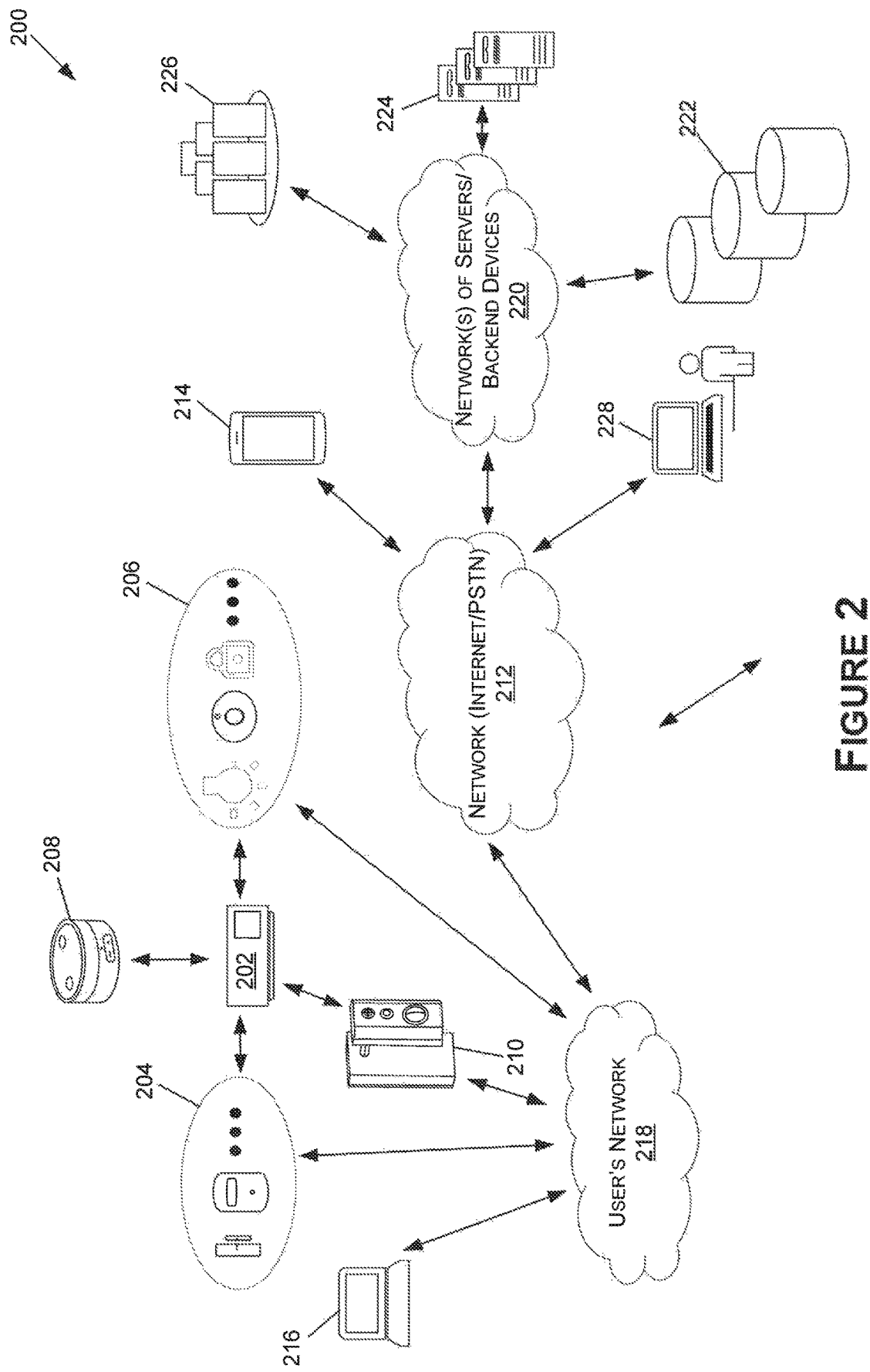
FIG. 2 is a functional block diagram illustrating a system for communicating in a network, according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized people) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) devices 210, etc.), when remotely monitored and controlled via a network (Internet/a public switched telephone network (PSTN)) 212 (which may be similar to, and represent the one or more networks 120 of FIG. 1), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V devices 210 (alternatively be referred to herein as "A/V devices 210" or "A/V device 210") (which may represent, and/or be similar to, the A/V device 102 of FIG. 1). The A/V devices 210 may include security cameras, light cameras (e.g., floodlight cameras, spotlight cameras, etc.), video doorbells (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that accommodates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell signaling device, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216. The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 (which may represent, and/or be similar to, the backend server 114 of FIG. 1) may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices." The hub device 112 and/or the backend server 114 of FIG. 1 may include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

In some examples, the one or more networks 120 of FIG. 1 may be representative of the user's network 218, the network 212, and/or the network of servers/backend devices 220.

Figure 3:
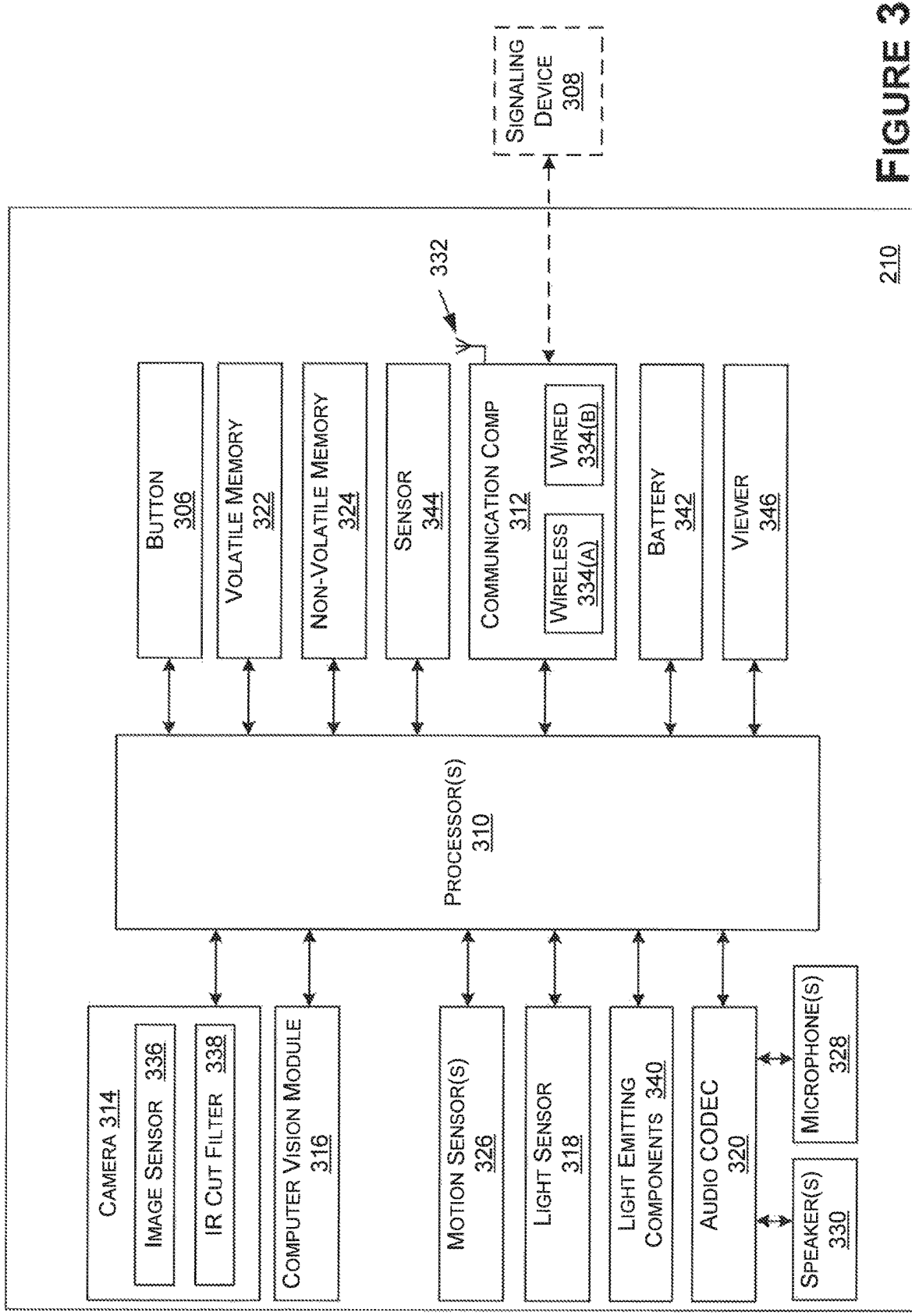
FIG. 3 is a functional block diagram of an A/V device, according to various aspects of the present disclosure.

FIG. 3 is a functional block diagram for an audio/video (A/V) recording and communication device ("A/V device") according to various aspects of the present disclosure. In some embodiments, the A/V device 210 may include a button 306 and/or a connection to a signaling device 308 (e.g., a pre-installed signaling device, such as a wired signaling device, and/or a wireless signaling device, connected over Wi-Fi, BLE, or another wireless communication protocol). With further reference to FIG. 3, the A/V device 210 may include a processor(s) 310, a communication component 312 (e.g., network interface, wireless transceiver, etc.), a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication component 312, and may perform various functions as described in the present disclosure. In various embodiments, when the processor(s) 310 is triggered by the motion sensor(s) 326, the camera 314, the speaker(s) 330, the microphone(s) 328, the communication component 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication component 312 and the camera 314.

With further reference to FIG. 3, the communication component 312 may comprise an integrated circuit including a processor core, memory, and programmable input/output peripherals. The communication component 312 may be operatively connected to the processor(s) 310. In some embodiments, the communication component 312 is configured to handle communication links between the A/V device 210 and other, external devices, external receivers, external transmitters, and/or external transceivers, and to route incoming/outgoing data appropriately. For example, inbound data from an antenna 332 of the communication component 312 may be routed through the communication component 312 before being directed to the processor(s) 310, and outbound data from the processor(s) 310 may be routed through the communication component 312 before being directed to the antenna 332 of the communication component 312. As another example, the communication component 312 may be configured to transmit data to and/or receive data from a remote network device (e.g., one or more components of the network(s) of servers/backend devices 220 described in FIG. 2). The communication component 312 may include wireless 334(a) and wired 334(b) adapters. For example, the communication component 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication component 312 may receive inputs, such as power and/or data, from the camera 314, the processor(s) 310, the button 306 (in embodiments where the A/V device 210 is the video doorbell), the motion sensors 326, a reset button (not shown in FIG. 3 for simplicity), and/or the non-volatile memory 324. The communication component 312 may also include the capability of communicating over wired connections, such as with a signaling device 308. For example, when the button 306 of the video doorbell is pressed, the communication component 312 may be triggered to perform one or more functions, such as to transmit a signal over the wired 334(b) connection to the signaling device 308 (although, in some embodiments, the signal be transmitted over a wireless 334(a) connection to the signaling device) to cause the signaling device 308 to emit a sound (e.g., a doorbell tone, a user customized sound, a ringtone, a seasonal ringtone, etc.). The communication component 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication component 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light and/or invisible (e.g., IR) light when supplied with power (e.g., to enable night vision). In some embodiments, when activated, the light-emitting components 340 illuminates a light pipe. In some examples, when the A/V device 210 is activated, the light-emitting components 340 emit light.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication component 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication component 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the communication component 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—A person instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe people. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

With further reference to FIG. 3, in embodiments the A/V device 210 may include the button 306. In embodiments where the button 306 is a mechanical button (e.g., has a range of movement), the button 306 may make contact with a button actuator located within the A/V device 210 when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the A/V device 210, such as transmitting an output signal, using the communication component 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a notification), using the communication component 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

In some examples, the A/V device 210 may include a sensor 344. The sensor 344 may comprise an accelerometer, a gyroscope, a magnetometer, and/or a glass break detector. An accelerometer may detect acceleration of the A/V device 210. A gyroscope may detect an orientation and/or an angular velocity of the A/V device 210. A magnetometer may detect a magnetism for the A/V device 210. A glass break detector may detect noise or vibrations. In some examples, the glass break detector uses the microphone(s) 328.

Although the A/V device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

With further reference to FIG. 3, in some embodiments the A/V device 210 may include a viewer 346. As discussed in further detail below, the viewer 346 may be part of the A/V device 210 or may be a separate element configured to attach to the A/V device 210, and/or an opening in a barrier.

Although not illustrated in FIG. 3, in some embodiments, the A/V device 210 may include a light controller and/or one or more lights. The light controller may include a switch for controlling the lights. For example, in response to the motions sensor(s) 326 and/or the camera 314 detecting motion, the light controller may receive an output signal from the processor(s) 310 that causes the light controller to activate the one or more lights. In some embodiments, a light camera may include motion sensor(s) 326 detecting motion for controlling activation of the lights, and may further include the camera 314 for detecting motion for activating the recording of the image data using the camera 314 and/or the recording of the audio data using the microphone(s) 328. In other embodiments, the motion sensor(s) 326 may detect the motion for activating the lights, the camera 314, and the microphone(s) 328, or the camera 314 may detect the motion for activating the lights, the camera 314 to being recording the image data, and the microphone(s) 328 to being recording the audio data. The lights may include floodlights, spotlights, porch lights, or another type of illumination device. The lights may provide for better image data quality when ambient light levels are low (e.g., at dusk, dawn, or night), while also providing a deterrent effect by being illuminated when motion is detected.

FIGS. 4A-4D are example functional block diagrams illustrating embodiments of the A/V device 210 according to various aspects of the present disclosure. In some embodiments, the A/V device 210 may represent, and further include one or more of the components from the A/V device 210 illustrated in FIG. 3. Additionally, in some embodiments, the A/V device 210 may omit one or more of the components shown in FIG. 3 or FIGS. 4A-4D, and/or may include one or more additional components not shown in FIG. 3 or FIGS. 4A-4D.

As shown in FIG. 4A-4D, the A/V device 210 includes memory 402, which may represent the volatile memory 322 and/or the non-volatile memory 324 (FIG. 3). The memory 402 stores a device application 404. In various embodiments, the device application 404 may include instructions that cause the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also include instructions that cause the processor(s) 310 to generate text data 414 describing the image data 406, the audio data 408, and/or the input data 410, such as in the form of metadata, for example.

In addition, the device application 404 may include instructions that cause the processor(s) 310 to transmit the image data 406, the audio data 408, the motion data 412, the input data 410, the text data 414, and/or notification(s) 416 to the client devices 214, 216, the hub device 202, and/or the backend server 224 using the communication component 312. In various embodiments, the device application 404 may also include instructions that cause the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the communication component 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

In further reference to FIGS. 4A-4D, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314. The image data 406 may be representative of (e.g., depict) a physical environment in a field of view of the camera 406. In some embodiments, the physical environment may include one or more objects (e.g., persons, vehicles, animals, items, etc.), and the image data 406 may be representative of the one or more objects, such as the one or more objects within the physical environment.

In further reference to FIGS. 4A-4D, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell, the A/V device 210 may not include the button 306, and the A/V device 210 may not generate the input data 410.

With further reference to FIGS. 4A-4D, a notification 416 may be generated by the processor(s) 310 and transmitted, using the communication component 312, to the client device 214, 216, the backend server 224, and/or the hub device 202. For example, in response to detecting motion using the camera 314 and/or the motion sensor(s) 326, the A/V device 210 may generate and transmit the notification 416. In some of the present embodiments, the notification 416 may include at least the image data 406, the audio data 408, the text data 414, and/or the motion data 412.

As described herein, the notification(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, notification(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and/or transmitting the image data 406, the audio data 408, the text data 414, and/or the motion data 412 when motion is detected (e.g., in the notification 416 or otherwise), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events. Additionally, or alternatively, in some examples, the A/V device 210 may generate and/or transmit the image data 406, the audio data 408, the text data 414, and/or the motion data 412 when more than a threshold amount of movement or vibration is detected, when a change to an orientation of the A/V device 210 is detected, etc.

In some examples, the sensor 344 may generate sensor data 420 that is stored in the memory 402. The device application 404 may include instructions that cause the processor(s) 310 to analyze the sensor data 420 when the sensor data 420 is received from the sensor 344 and/or at any other time. For example, the device application 404 may analyze the sensor data 420 to detect more than a threshold amount of movement or vibration of the A/V device 210 (e.g., indicating that a barrier or other surface to which the A/V device 210 is mounted has experienced movement or vibration), detect a change in orientation of the A/V device 210 (e.g., indicating that a barrier or other surface to which the A/V device 210 is mounted has experienced a change in orientation), etc. To illustrate, a threshold amount of movement, vibration, or change in orientation may be detected when the sensor data 420 includes acceleration values from an accelerometer that are greater than a threshold (e.g., indicating that more than a threshold amount of acceleration occurred), when the sensor data 420 includes orientation and/or angular velocity values from a gyroscope that are greater than a threshold (e.g., indicating that an orientation or angular velocity of the A/V device 210 has changed by more than a threshold amount), when the sensor data 420 includes values from a magnetometer that indicate more than a threshold amount of a change in a direction, strength, etc. of a magnetic field, when the sensor data 420 includes noise or vibration values from a glass break detector that are greater than a threshold (e.g., indicating that more than a threshold amount of noise or vibration was detected), and so on.

In some examples, the device application 404 may detect that a barrier attached to the A/V device 210 has opened or closed. To illustrate, if the A/V device 210 detects a resting position for more than a threshold amount of time (e.g., based on not receiving a change in data or any data at all from the sensor 344), the A/V device 210 may determine that a door to which the A/V device 210 is attached is closed. Thereafter, if the A/V device 210 detects a threshold amount of movement, vibration, and/or change in orientation, the A/V device 210 may determine that the door is being opened. When the movement, vibration, and/or change in orientation ceases, the A/V device 210 may determine that the door is open. Further, when the A/V device 210 determines movement, vibration, and/or change in orientation again (and in an opposite direction), the A/V device 210 may determine that the door is being closed.

In some examples, the A/V device 210 includes a first component 422, a second component 424, the viewer 346, a flexible connector 426, and/or a fastener(s) 428. In some examples, the first component 422 may be mounted on one side of a barrier, while the second component 424 may be mounted on a second side of the barrier.

The viewer 346 may include a passage extending through a middle of the viewer 346. For example, the viewer 346 may have an elongated tubular shape or other shape with a hollow center. In some examples, the viewer 346 may include a len(s) disposed within the passage. The viewer 346 may be part of the first component 422 and/or the second component 424, or may be a separate element attachable to the first component 422, the second component 424, and/or an opening in a barrier. The viewer 346 may be formed of a variety of substances, such as metal (e.g., steel, aluminum, copper, titanium, etc.), plastic, etc. The viewer 346 may be a variety of sizes, such as 68 mm, 50 mm, 60 mm, 70 mm, 80 mm, etc. In some examples, the viewer 346 may fit a door thickness between 34 and 56 mm. In other examples, other door thicknesses may be met.

The flexible connector 426 may mechanically couple and/or electrically couple the first component 422 to the second component 424. For example, the flexible connector 426 may allow power to be provided from the second component 424 (e.g., the battery 342) to the first component 422, or vice versa. Further, the flexible connector 426 may allow one or more elements of the first component 422 to communicate with one or more elements of the second component 424 (e.g., may provide a communicate channel). In some examples the first component 422 and the second component 424 may communicate wirelessly (e.g., over a wireless channel). The flexible connector 426 may comprise a wire, a cable (e.g., USB cable, HDMI cable, power cable, etc.), flexible electronics (e.g., a flex printed circuit board (PCB), also referred to as flex cord, etc.), and so on.

The fastener(s) 428 may connect the viewer 346 to the first component 422 and/or to the second component 424. The fastener(s) 428 may take various forms, such as a bolt, screw, washer, nut, button, clip, flange, staple, pin, nail, latch, rivet, etc. Although the fastener(s) 428 is discussed in many examples, in other examples other forms are used to join the viewer 346, the first component 422, and/or the second component 424, such as an adhesive (e.g. glue, cement, etc.), welding, soldering, brazing, crimping, etc.

Figure 4A:
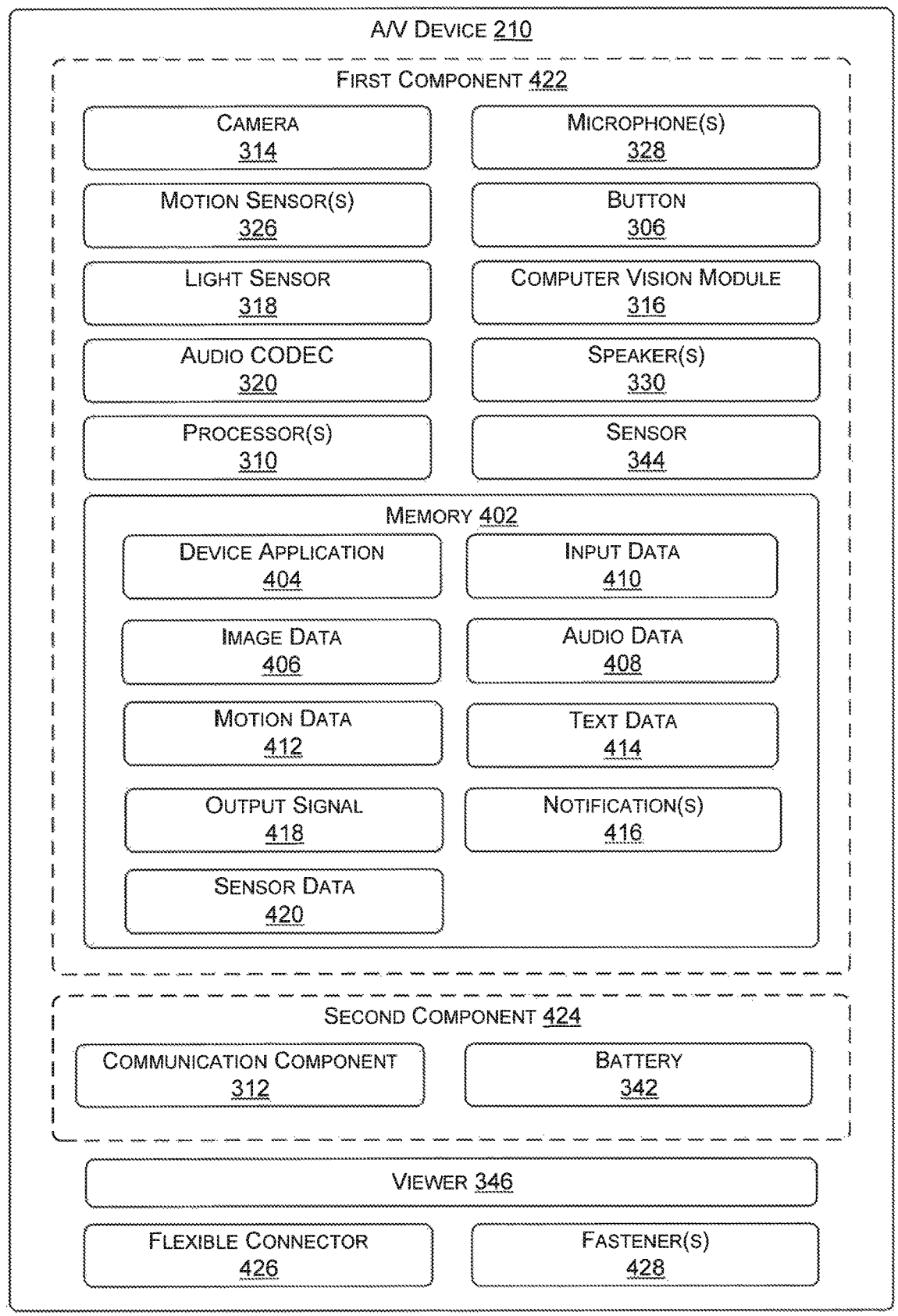
FIGS. 4A-4D are functional block diagrams illustrating example embodiments of an A/V device, according to various aspects of the present disclosure.

The components of the A/V device 210 may be arranged in a variety of manners. In one example, as illustrated in FIG. 4A, the first component 422 includes the camera 314, the microphone(s) 328, the motion sensor(s) 326, the button 306, the light sensor 318, the computer vison module 316, the audio codec 320, the speaker(s) 330, the sensor 344, the processor(s) 310, and the memory 402. The second component 424 may include the communication component 312 and the battery 342. The battery 342 may provide power to the first component 422 and/or the second component 424.

Figure 4B:
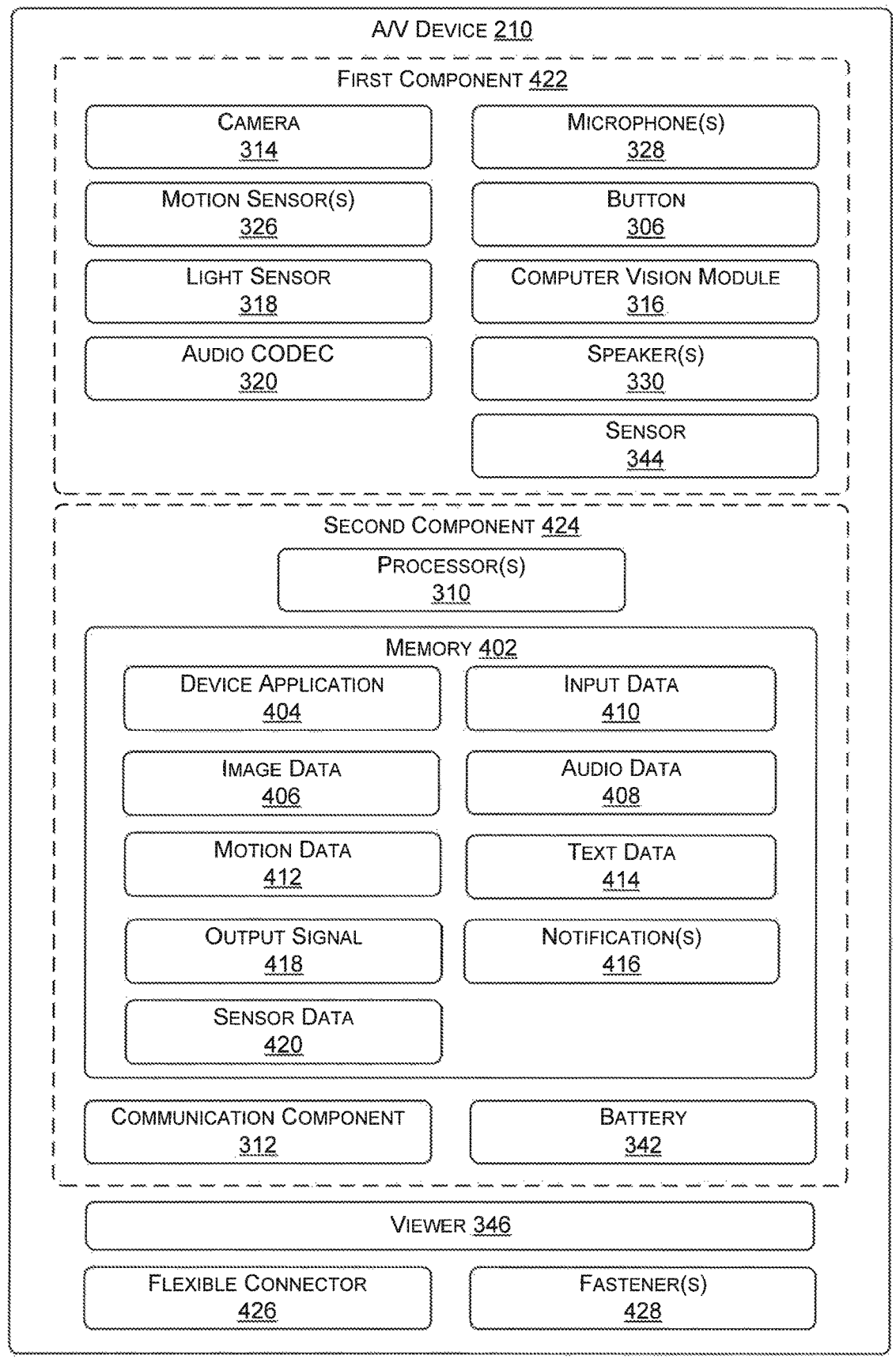

In another example, as illustrated in FIG. 4B, the first component 422 includes the camera 314, the microphone(s) 328, the motion sensor(s) 326, the button 306, the light sensor 318, the computer vison module 316, the audio codec 320, the speaker(s) 330, and the sensor 344. In this example, the second component 424 may include the processor(s) 310, the memory 402, the communication component 312, and the battery 342. The battery 342 may provide power to the first component 422 and/or the second component 424.

Figure 4C:
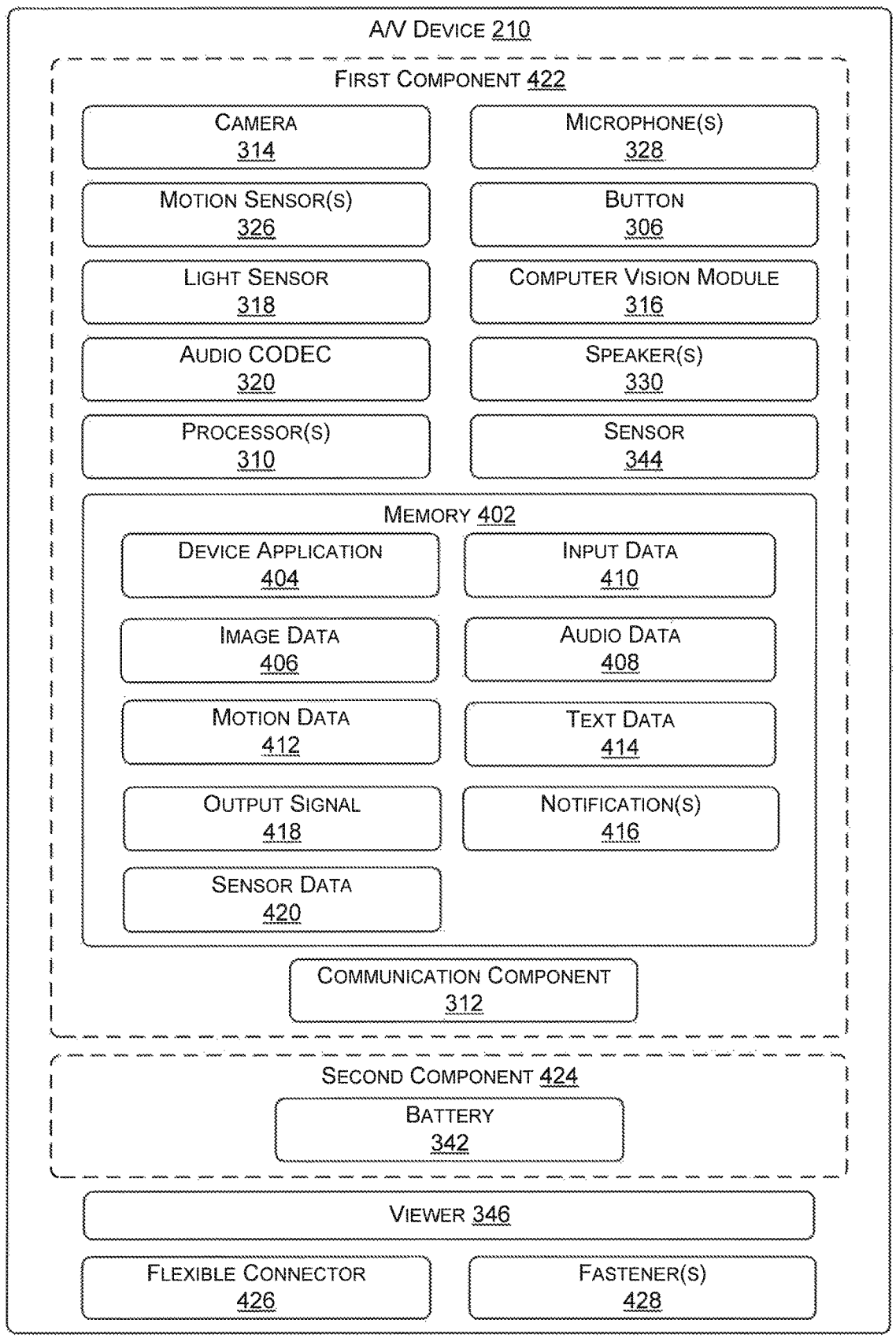

In yet another example, as illustrated in FIG. 4C, the first component 422 includes the camera 314, the microphone(s) 328, the motion sensor(s) 326, the button 306, the light sensor 318, the computer vison module 316, the audio codec 320, the speaker(s) 330, the sensor 344, the processor(s) 310, the memory 402, and the communication component 312. In this example, the second component 424 may include the battery 342. The battery 342 may provide power to the first component 422 and/or the second component 424.

Figure 4D:
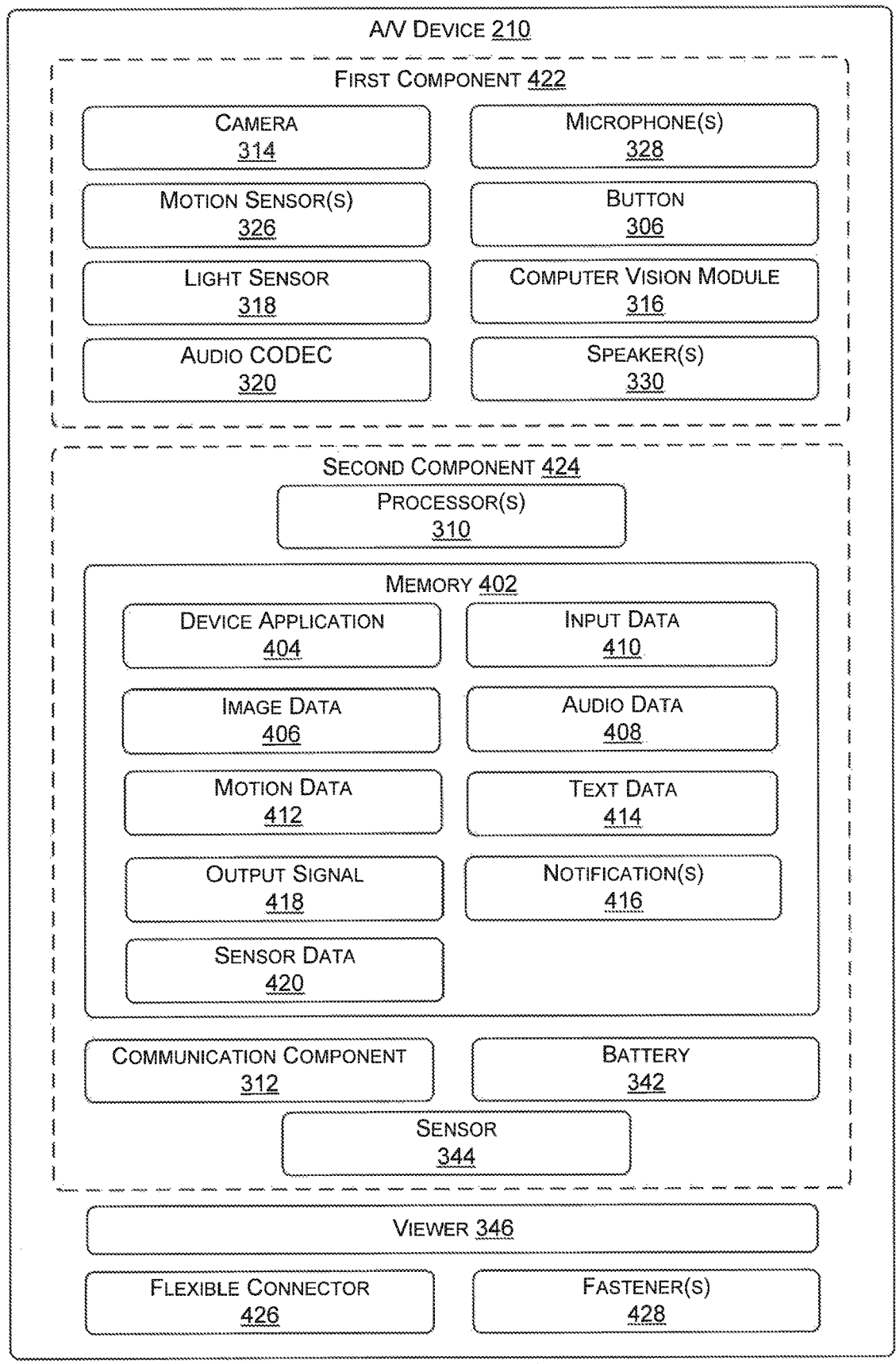

In a further example, as illustrated in FIG. 4D, the first component 422 includes the camera 314, the microphone(s) 328, the motion sensor(s) 326, the button 306, the light sensor 318, the computer vison module 316, the audio codec 320, and the speaker(s) 330. In this example, the second component 424 may include the processor(s) 310, the memory 402, the communication component 312, the battery 342, and the sensor 344. The battery 342 may provide power to the first component 422 and/or the second component 424.

In some examples, the first component 422 and the second component 424 each include memory and one or more processors.

Although not illustrated in FIGS. 4A-4D, in some examples, the A/V device 210 may include a display, such as a touch screen, a liquid-crystal display (LCD), a light-emitting diode (LED) display, an organic LED display, a plasma display, an electronic paper display, or any other type of technology. In some examples, the display may be configured to display the image data 406 and/or the notification 416. For example, the second component 424 that may attach to an interior surface of a barrier may include the display to display the image data 406 and/or the notification 416. In another example, the first component 422 may include a display to display the image data 406 and/or image data of a user located remotely (e.g., a user communicating with an individual at the user's door).

Further, although not illustrated in FIGS. 4A-4D, in some examples, the A/V device 210 includes a depth sensor (also referred to as a range sensor) included in the first component 422 and/or the second component 424. The depth sensor may implement a variety of techniques to generate depth data indicating distance to points in an environment. In one example, the depth sensor may include a structured-light 3D scanner (e.g., an infrared emitter and infrared camera) to implement a structured-light technique that projects a known pattern (e.g., structured light) onto a surface and captures image(s). In another example, the depth sensor may include a time-of-fight camera ((ToF) camera) that measures the time-of-flight of a light signal between the ToF camera and a target in an environment. In yet other examples, the depth sensor may implement other techniques, such as sheet of light triangulation, stereo triangulation, interferometry, and so on. As non-limiting examples, the depth sensor may implement techniques and/or components used by the TrueDepth® camera from Apple®, the RealSense® camera from Intel®, the Kinect® system from Microsoft®, the Hololens® from Microsoft®, the Tango® system from Google®, etc. In some examples, the depth sensor includes the camera 314 to capture image data. The depth sensor may generate depth data, such as a range image, depth map, etc.

Figure 5:
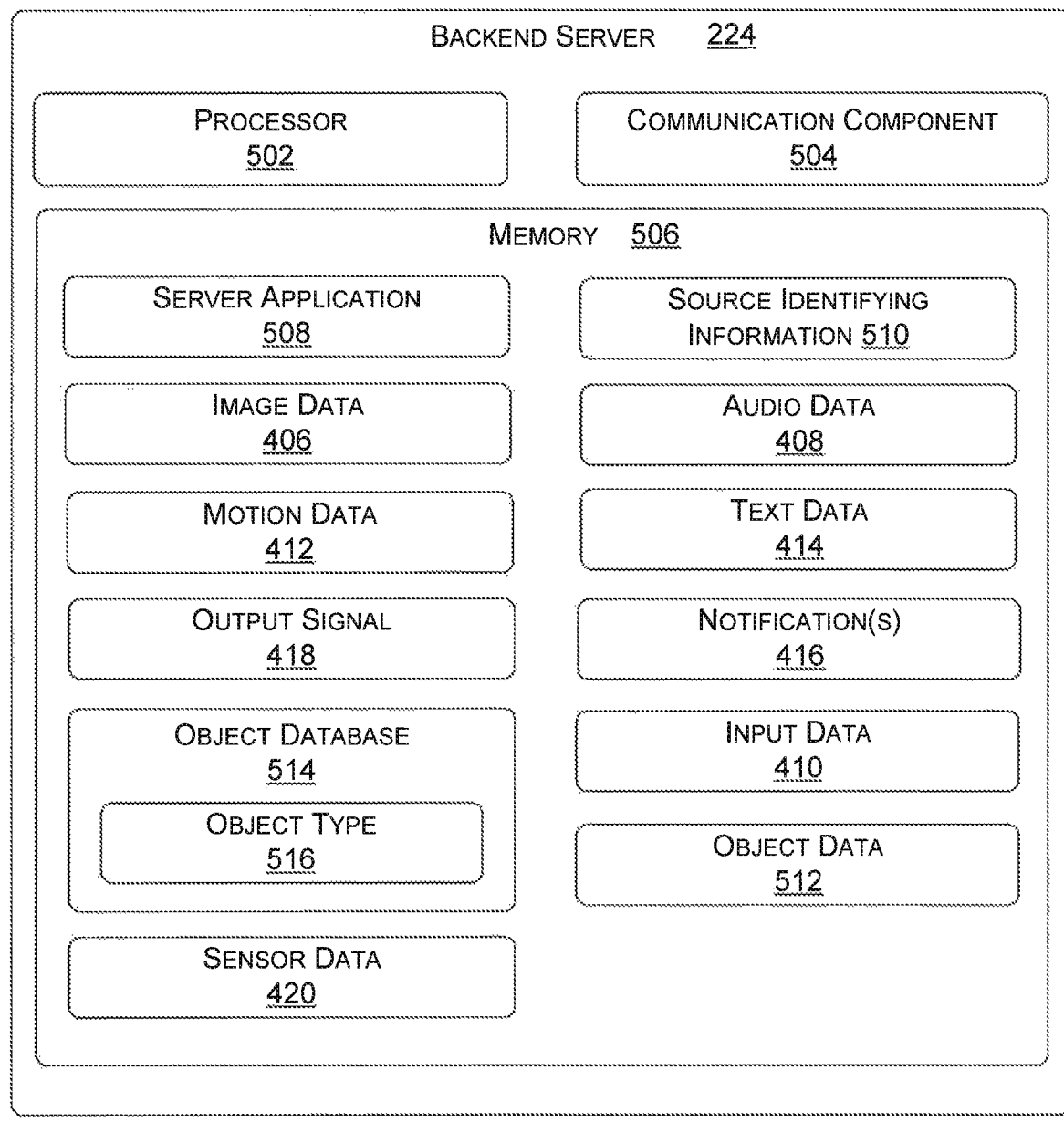
FIG. 5 is a functional block diagram illustrating one example embodiment of a backend device, according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a communication component 504 (which may be similar to, and/or include similar functionality as, the communication component 312), and a memory 506 (which may be similar to, and/or include similar functionality as, the memory 402). The communication component 504 (e.g., network interface) may allow the backend server 224 to access and communicate with devices connected to the network (Internet/PSTN) 212 (e.g., the A/V device 210, the hub device 202, the client devices 214, 216, a device controlled by the security monitoring service 228, the lighting controller 232, the lighting devices 230, etc.).

The memory 402 may include a server application 508 that includes instructions that cause the processor(s) 502 to receive and/or retrieve the audio data 408, the text data 414, the input data 410, the notification 416, the image data 406, and/or the motion data 412 from the A/V device 210 (e.g., in the output signal 418) and/or the hub device 202. The server application 508 may also include instructions that cause the processor(s) 502 to transmit (and/or forward) the audio data 408, the text data 414, the input data 410, the notification 416, the image data 406, and/or the motion data 412 to the client devices 214, 216 using the communication component 504.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further include instructions that cause the processor(s) 502 to generate and transmit a report signal (not shown) to a third-party client device (e.g., electronic device(s) 234), which may be associated with a law enforcement agency or the security monitoring service 228, for example. The report signal, which may be the notification 416, in some examples, may include the image data 406, the audio data 408, and/or the text data 414.

In some examples, the server application 508 may include instructions that cause the processor(s) 502 to analyze the image data 406 that is received from the A/V device 210. For example, the server application 508 may include instructions that cause the processor(s) 502 to analyze the image data 406 in order to determine if the image data 406 depicts an object or surface. Objects or surfaces may include, but are not limited to, people, animals, vehicles, parcels (e.g., packages), electronic devices (e.g., remote control vehicles, drones, lighting devices, etc.), bushes, fences, and/or any other type of object that can be depicted by the image data 406 and/or cause motion that can be detected by the A/V device 210. In some examples, the processor(s) 502 of the backend server 224 may analyze the image data 406 whenever the backend server 224 receives the image data 406 from the A/V device 210. For ease of discussion, many examples will discuss analyzing the image data 406 to detect an object. Although such techniques are applicable to surfaces as well.

In some examples, to analyze the image data 406, computer vision processing and/or image processing, for example, may be performed by the processor(s) 502 of the backend server 224 to determine that the image data 406 depicts one or more objects. For example, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the backend server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparing, the processor(s) 502 of the backend server 224 may match the object data 512 from the image data 406 to the image data stored in the object database 514. The processor(s) 502 of the backend server 224 may then use the match to determine that the object data 512 represents an object and/or to determine the type of object 516 that the object data 512 represents. For example, if the processor(s) 502 of the backend server 224 matches the object data 512 from the image data 406 to image data stored in the object database 514 that represents a person, then the processor(s) 502 of the backend server 224 may determine that the image data 406 depicts an object and/or that the image data 406 depicts a person. In some examples, when the object data 512 represents multiple objects, the processor(s) 502 of the backend server 224 may perform a similar analysis to identify each object represented by the object data 512 and/or the respective type of object 516 associated with each of the objects represented by the object data 512.

In some examples, in addition to, or alternatively from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Although described as being performed in the backend server 224, in some embodiments, the image data 406 may be analyzed by any of the A/V device 210, the hub device 202, and/or the client device 214, 216. Thus, any or all of the operations described herein to analyze the image data 406 may be performed by any of these devices. To perform these operations, any or all of these devices may also include the object database 514, including the object type 516, and/or the object data 514, as described with reference to FIG. 5.

In some examples, the backend server 224 may receive the sensor data 420 from the A/V device 210 and store the sensor data 420 in the memory 506. The server application 508 may analyze the sensor data 420 to detect more than a threshold amount of movement or vibration of the A/V device 210, detect a change in orientation of the A/V device 210, etc. To illustrate, a threshold amount of movement, vibration, or change in orientation may be detected when the sensor data 420 includes acceleration values from an accelerometer that are greater than a threshold (e.g., indicating that more than a threshold amount of acceleration occurred), when the sensor data 420 includes orientation and/or angular velocity values from a gyroscope that are greater than a threshold (e.g., indicating that an orientation or angular velocity of the A/V device 210 has changed by more than a threshold amount), when the sensor data 420 includes values from a magnetometer that indicate more than a threshold amount of a change in a direction, strength, etc. of a magnetic field, when the sensor data 420 includes noise or vibration values from a glass break detector that are greater than a threshold (e.g., indicating that more than a threshold amount of noise or vibration was detected), and so on.

In some examples, the server application 508 may detect that a barrier attached to the A/V device 210 has opened or closed. To illustrate, if the server application 508 detects that the A/V device 210 has been at a rest for more than a threshold amount of time (e.g., based on not receiving a change in the sensor data 420 or any sensor data 420 at all from the A/V device 210), the server application 508 may determine that a door to which the A/V device 210 is attached is closed. Thereafter, if the backend server 224 receives additional sensor data 420 indicating a threshold amount of movement, vibration, and/or change in orientation, the server application 508 may determine that the door is being opened. When the movement, vibration, and/or change in orientation ceases (e.g., the backend server 224 does not receive additional sensor data 420), the server application 508 may determine that the door is open. Further, when the server application 508 determines movement, vibration, and/or change in orientation again (e.g., based on receiving additional sensor data 420), the server application 508 may determine that the door is being closed.

In some examples, the server application 508 may send the notification 416 (e.g., to the client device 214, 216 or another device) when more than a threshold amount of movement, vibration, or change in orientation of the A/V device 210 is detected. The notification 416 may indicate such movement, vibration, or change in orientation. As noted above, in some examples, the notification 416 may include the image data 406, the audio data 408, the text data 414, and/or the motion data 412. Further, in some examples, the server application 508 may perform other processing when more than a threshold amount of movement, vibration, or change in orientation of the A/V device 210 is detected. For examples, the server application 508 may send a signal to the A/V device 210 to cause the A/V device 210 to capture the image data 406 (in cases where the image data 406 has not already been captured). Additionally, or alternatively, the server application 508 may send a signal to the A/V device 210 and/or a signaling device to cause output of audio.

The hub device 202 and/or the backend server 224 (and/or one or more additional or alternative components of the network(s) of servers/backend devices 220) may be referred to herein as "network devices."

Figure 6:
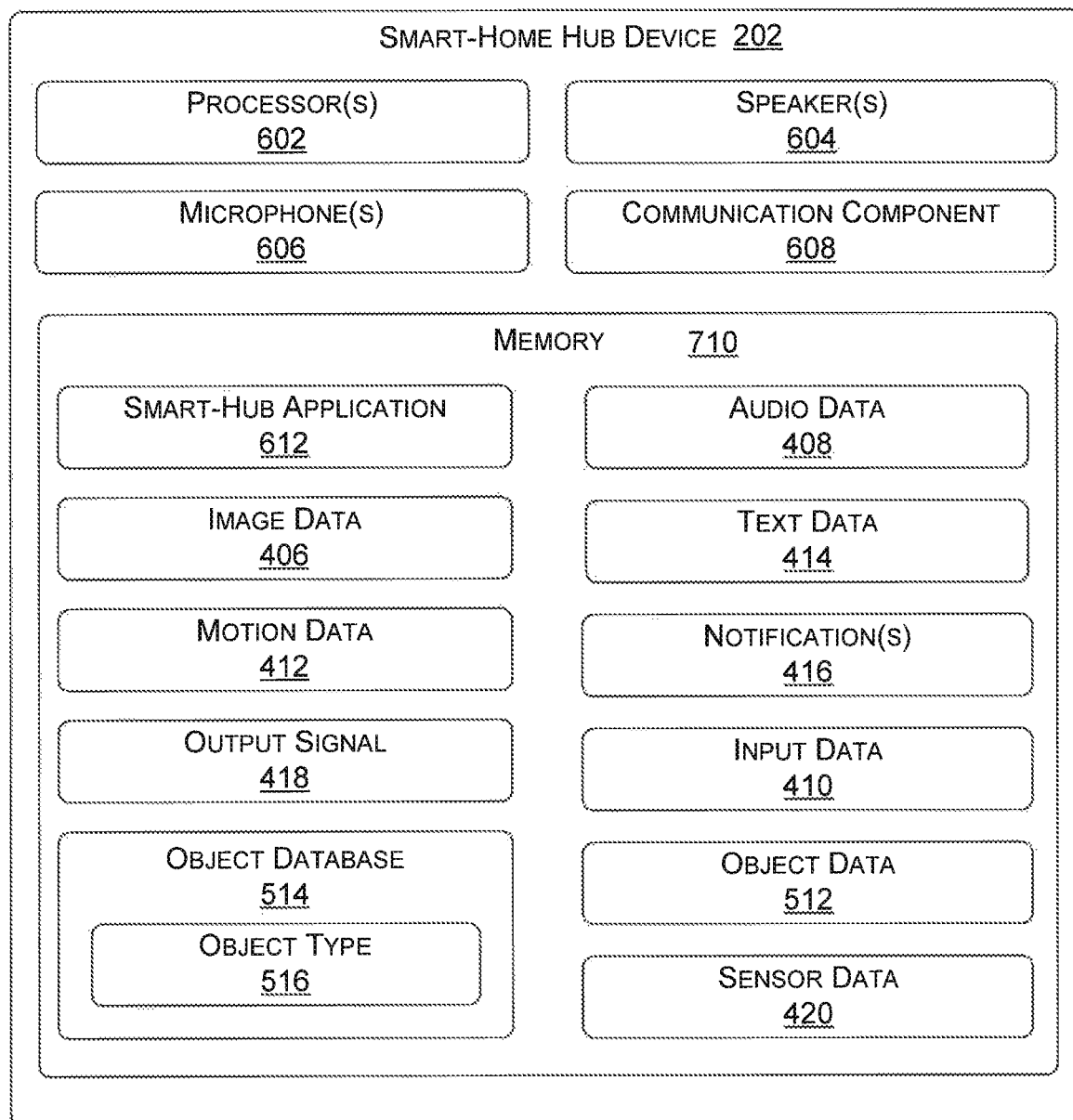
FIG. 6 is a functional block diagram illustrating one example embodiment of a smart-home hub device, according to various aspects of the present disclosure.

FIG. 6 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 602 (which may be similar to, and/or include similar functionality as, the processor(s) 310) that are operatively connected to speaker(s) 604, microphone(s) 606, a communication component 608 (which may be similar to, and/or include similar functionality as, the communication component 312), and memory 610 (which may be similar to, and/or include similar functionality as, the memory 402). In some embodiments, the hub device 202 may further comprise a camera (not shown). In some embodiments, the hub device 202 may not include one or more of the components shown in FIG. 6, such as the speaker(s) 604 and/or the microphone(s) 606.

As shown in the example of FIG. 6, the memory 610 stores a smart-home hub application 612. In various embodiments, the smart-home hub application 612 may include instructions that cause the processor(s) 602 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 6, the smart-home hub application 612 may include instructions that cause the processor(s) 602 to receive the audio data 408, the text data 414, the image data 406, the motion data 412, the input data 410, the output signal 418, the notification 416, and/or the sensor data 420 from the A/V device 210 (in some embodiments, via the backend server 224) using the communication component 608. For example, the hub device 202 may receive and/or retrieve (e.g., after receiving a signal from the A/V device 210 that the A/V device 210 has been activated) the image data 406, the input data 410, the motion data 412, and/or the sensor data 420 from the A/V device 210 and/or the backend server 224 in response to motion being detected by the A/V device 210. The smart-hub application 612 may include instructions that cause the processor(s) 602 to transmit, using the communication component 608, the audio data 408, the text data 414, the image data 406, the motion data 412, the input data 410, the output signal 418, and/or the notification 416 to the client device 214, 216, the backend server 224, and/or an additional electronic device (e.g., a second A/V device 210, the automation device(s) 206, the sensor(s) 204, etc.).

As described herein, at least some of the processes of the A/V device 210, the backend server 224, and/or the client device 214, 216 may be executed by the hub device 202. For example, the hub device 202 may perform any of the operations discussed herein with respect to the backend server 224.

Figure 7A:
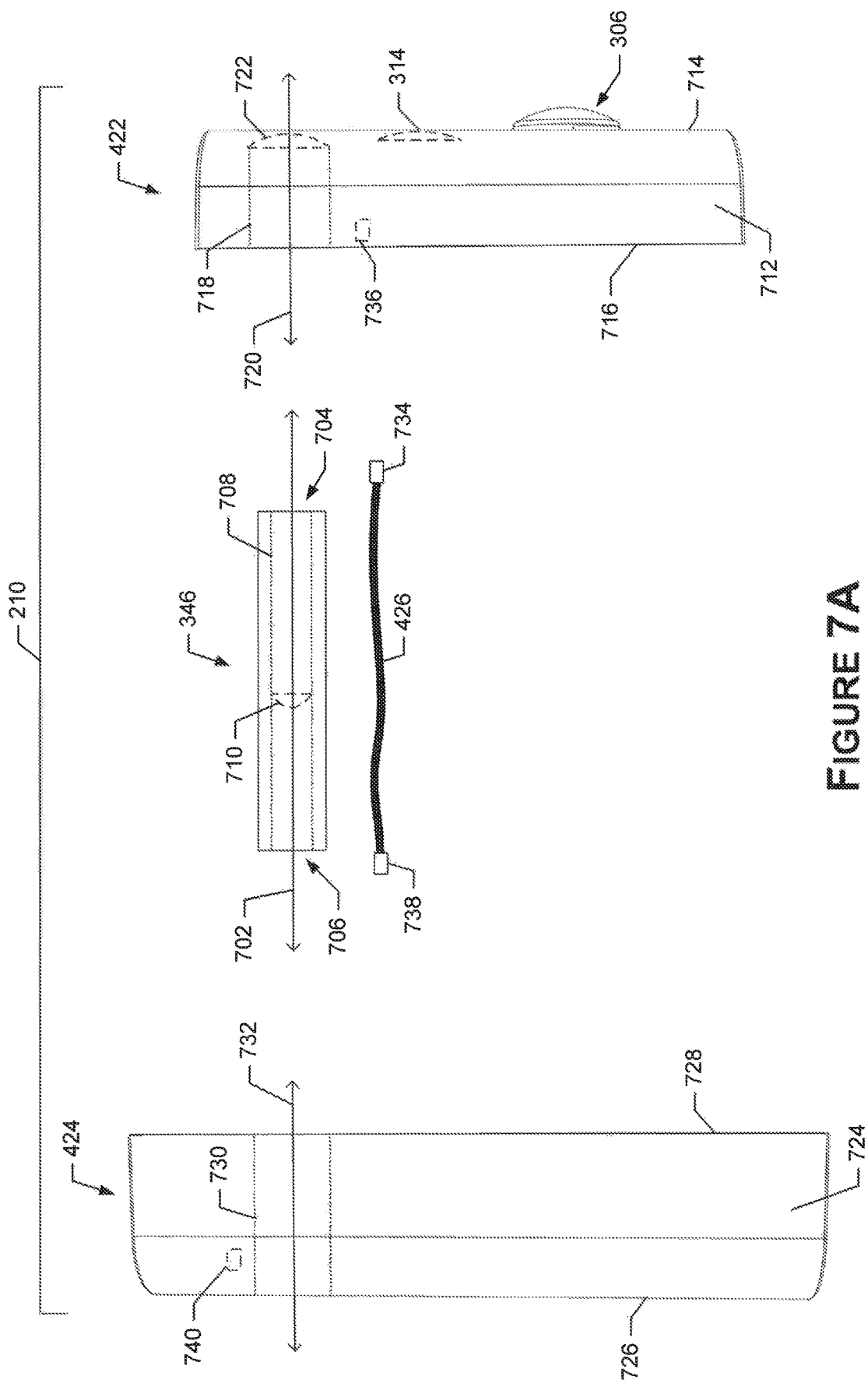
FIGS. 7A-7C are exploded side views of an example A/V device with a viewer, according to various aspects of the present disclosure.

FIG. 7A is an exploded side views of an example A/V device 210 according to various aspects of the present disclosure. In particular, the first component 422 (sometimes referred to as an "electronic device"), the second component 424 (sometimes referred to as an "electronic device"), and the viewer 346 (sometimes referred to as the "third component 346") have been separated from each other. As illustrated, the viewer 346 may include a first longitudinal axis 702, a first end 704, a second end 706, a passage 708, and a first lens 710. The passage 708 may extend between the first end 704 and the second end 706 along the first longitudinal axis 702. The first lens 710 may be disposed within the passage 708. Although illustrated with the first lens 710 positioned in substantially a middle of the viewer 346, the first lens 710 may be positioned at any location within the passage 708. Further, in some examples, the first lens 710 may be attached to the first end 704 or the second end 706 of the viewer 346. Moreover, in some examples, multiple lenses may be used instead of only the first lens 710. Alternatively, the first lens 710 may be eliminated entirely.

The first component 422 may include a first housing 712 having a first front surface 714 (sometimes referred to as a "front portion") and a first rear surface 716 (sometimes referred to as a "rear portion"). The first rear surface 716 may abut an exterior surface of a barrier, such as a door. As such, the first front surface 714 may be spaced from the exterior surface. The first housing 712 may also include a first opening 718 extending from the first rear surface 716 into the first housing 712 toward the first front surface 714. The first opening 718 may include a second longitudinal axis 720 that, when the A/V device 210 is installed, is substantially aligned (e.g., coaxial) with the first longitudinal axis 702. The first housing 712 may include a second lens 722 proximal the first front surface 714 and defining a base of the first opening 718. In this example, the second lens 722 located behind the first surface 714. However, in other examples, the second lens 722 may lie on a same plane as the first surface 714, protrude outward from the first surface 714, or otherwise be arranged differently than as shown. FIG. 7A also illustrates the button 306 and the camera 314 included with the first component 422.

The second component 424 may include a second housing 724 having a second front surface 726 and a second rear surface 728. The second rear surface 728 may abut an interior surface of the barrier. As such, the second front surface 726 may be spaced from the interior surface of the barrier. The second housing 724 may include a second opening 730 extending from the second rear surface 728 into the second housing 724 toward the second front surface 726. The second opening 730 may include a third longitudinal axis 732 that, when the A/V device 210 is installed, is substantially aligned (e.g., coaxial) with the first longitudinal axis 702.

The first lens 710 and/or the second lens 722 may comprise a door viewer (e.g., to allow a user to view from an inside of the barrier to an outside of the barrier). The second lens 722 may be implemented as a variety of types of lenses, such as an ultra-wide-angle lens (e.g., a fisheye lens with an angle of view greater than 100 degrees, between 100 and 180 degrees, greater than 200 degrees, etc.), a wide-angle lens (e.g., with an angle of view between 64 and 84 degrees, greater than 60 degrees, etc.), or any other lens that may or may not be wide-angle.

The A/V device 210 may also include the flexible connector 426 electrically and communicatively coupling the first component 422 to the second component 424. The flexible connector 426 may extend from the first component 422 to the second component 424 through an opening in a barrier. As noted above, the flexible connector 426 may be a wire, a cable (e.g., USB cable, HDMI cable, power cable, etc.), flexible electronics (e.g., a flex printed circuit board (PCB)), and so on. The flexible connector 426 may include a first coupler 734 for connection to a first connection port 736 on the first component 422 and a second coupler 738 for connection to a second connection port 740 on the second component 424. The first coupler 734, the second coupler 738, the first connection port 736, and/or the second connection port 740 may be implemented in a variety of manners, such as through a 20-pin connection, a 24-pin connection, an n-pin connection, a USB connection, etc.

Figure 7B:
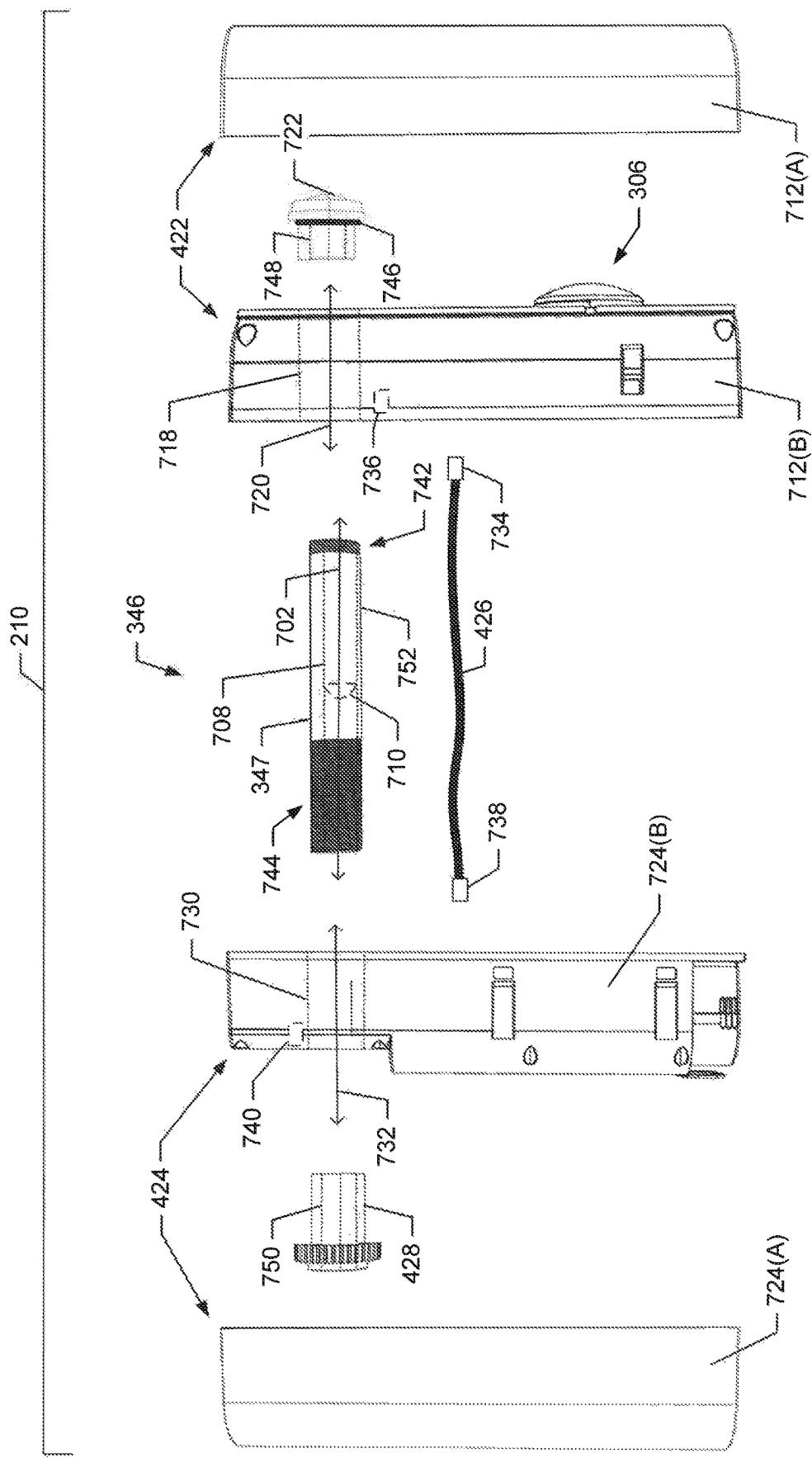

FIG. 7B is another exploded side view of the A/V device 210. In particular, the first component 422, the second component 424, and the viewer 346 have been separated from each other. Here, a front portion 712(A) of the first housing 712 is removed from a rear portion 712(B) of the first housing 712 and a front portion 724(A) of the second housing 724 is removed from a rear portion 724(B) of the second housing 724.

As illustrated, the viewer 346 may include the first longitudinal axis 702 with the first lens 710 disposed within the passage 708. Here, the viewer 346 comprises an elongated tubular member 347. The second lens 722 may be detachably coupled to a first part 742 of the viewer 346. In this example, the second lens 722 includes female threading and the first part 742 of the viewer 346 includes male threading, although in other embodiments the threading may be reversed. Further, the fastener 428 may be detachably coupled to a second part 744 of the viewer 346. In this example, the fastener 428 includes female threading and the second part 744 of the viewer 346 includes male threading, although in other embodiments the threading may be reversed.

The first component 422 may include the first housing 712 having the first opening 718 (also referred to as "second passage 718") extending through the first component 712 (e.g., through the rear portion 712(B) of the first housing 712) along the second longitudinal axis 720. The first component 422 may be removably secured to the viewer 346 such that, when the A/V device 210 is installed, the second longitudinal axis 720 is substantially aligned (e.g., coaxial) with the first longitudinal axis 702 of the viewer 346 and/or the second lens 722 defines a base of the first opening 718. In some examples, at least a portion of the viewer 346 extends into the first opening 718. For example, at least the first part 742 of the viewer 346 may extend into the first opening 718 to attach to the second lens 722 within the first opening 718.

As illustrated, a gasket 746 may be detachably coupled between the second lens 722 and the first housing 712. In particular, the gasket 746 may be part of the second lens 722, placed over the second lens 722, and/or placed on the rear portion 712(B) of the first housing 712. The gasket 746 may provide a seal to prevent water or other substances from traveling into the viewer 346. In some examples, the gasket 746 comprises a resilient O-ring. As shown, the second lens 722 may include a passage 748 extending through substantially a center of the second lens 722. When the second lens 722 is attached to the viewer 346, the passage 748 may be aligned (e.g., coaxial) with the passage 708 of the viewer 346.

With continued reference to FIG. 7B, the second component 424 may include the second housing 724 having the second opening 730 (also referred to as "second passage 730") extending through the second component 724 (e.g., through the rear portion 724(B) of the second housing 724) along the third longitudinal axis 732. The second component 424 may be removably secured to the viewer 346 such that, when the A/V device 210 is installed, the third longitudinal axis 732 is substantially aligned (e.g., coaxial) with the first longitudinal axis 702 of the viewer 346. In some examples, at least a portion of the viewer 346 extends into the second opening 730. For example, the second part 744 of the viewer 346 may extend into the second opening 730 to attach to the fastener 428 within the second opening 730. As illustrated, the fastener 428 may include a passage 750 extending through substantially a center of the fastener 428. When the fastener 428 is attached to the viewer 346, the passage 750 may be aligned (e.g., coaxial) with the passage 708 of the viewer 346.

In some examples, the viewer 346 includes a substantially flat portion 752 extending along the first longitudinal axis 702 over at least a portion of the viewer 346. For example, when viewed in cross-section, the perimeter of the viewer 346 may not be entirely circular, but may instead include a flattened segment. The flat portion 752 may extend along a bottom portion of the viewer 346 with reference to the orientation illustrated in FIG. 7B. The flat portion 752 may provide a path that allows the flexible connector 426 to be positioned within a hole in a door along with the viewer 346. That is, the flat portion 752 may provide room for the flexible connector 426 to be positioned below the viewer 346 within the hole. The flexible connector 426 may extend along an outside of the viewer 346 and electrically couple the first component 422 and the second component 424 to one another.

In some examples, the second opening 730 of the second component 424 engages or is secured to an outer surface of a portion of the viewer 346. For example, an inner surface of the second opening 730 may engage or be secured to an outer surface of the viewer 346 (e.g., the second part 744), such as with mating threads. Further, an inner surface of the first opening 718 may engage or be secured to an outer surface of a portion of the viewer 346 (e.g., the first part 742), such as with mating threads.

Figure 7C:
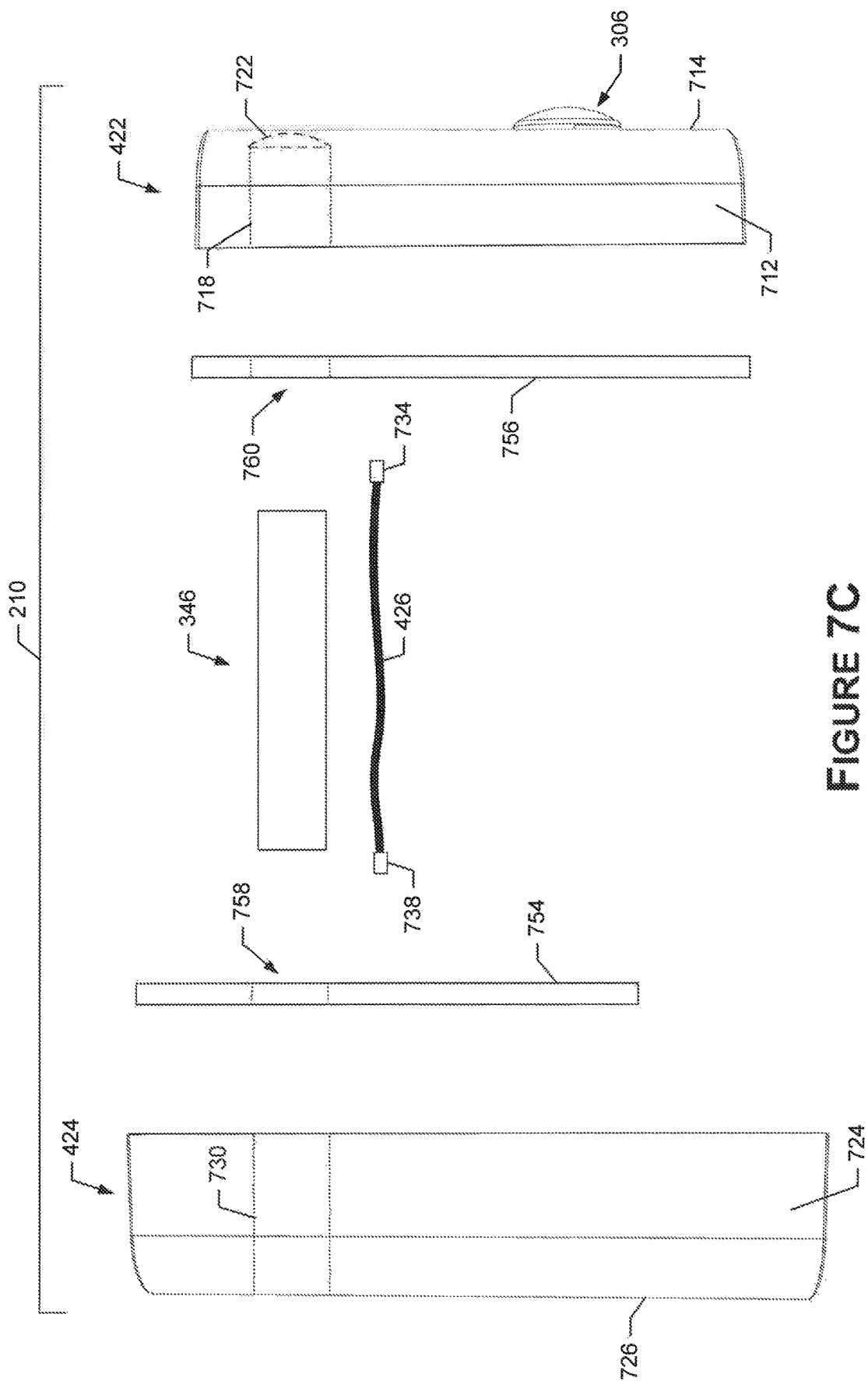

FIG. 7C is another exploded side view of the example A/V device 210 according to various aspects of the present disclosure. Here, the A/V device 210 includes a second gasket 754 to attach between the second component 424 and a barrier, and a first gasket 756 to attach between the first component 422 and the barrier. As illustrated, the gaskets 754, 756 may include openings 758, 760 to allow the viewer 346 to pass through. In examples, the gasket(s) 754 and/or 756 may protect the barrier, provide grip to enable the A/V device 210 to maintain an installed position, seal out water or other substances, etc. The gasket(s) 754, 756 may comprise a high-friction material that provides grip to resist movement of the A/V device 210 relative to the barrier. In various embodiments, the gaskets 754, 756 may comprise rubber, silicone, various plastics, etc.

Figure 8:
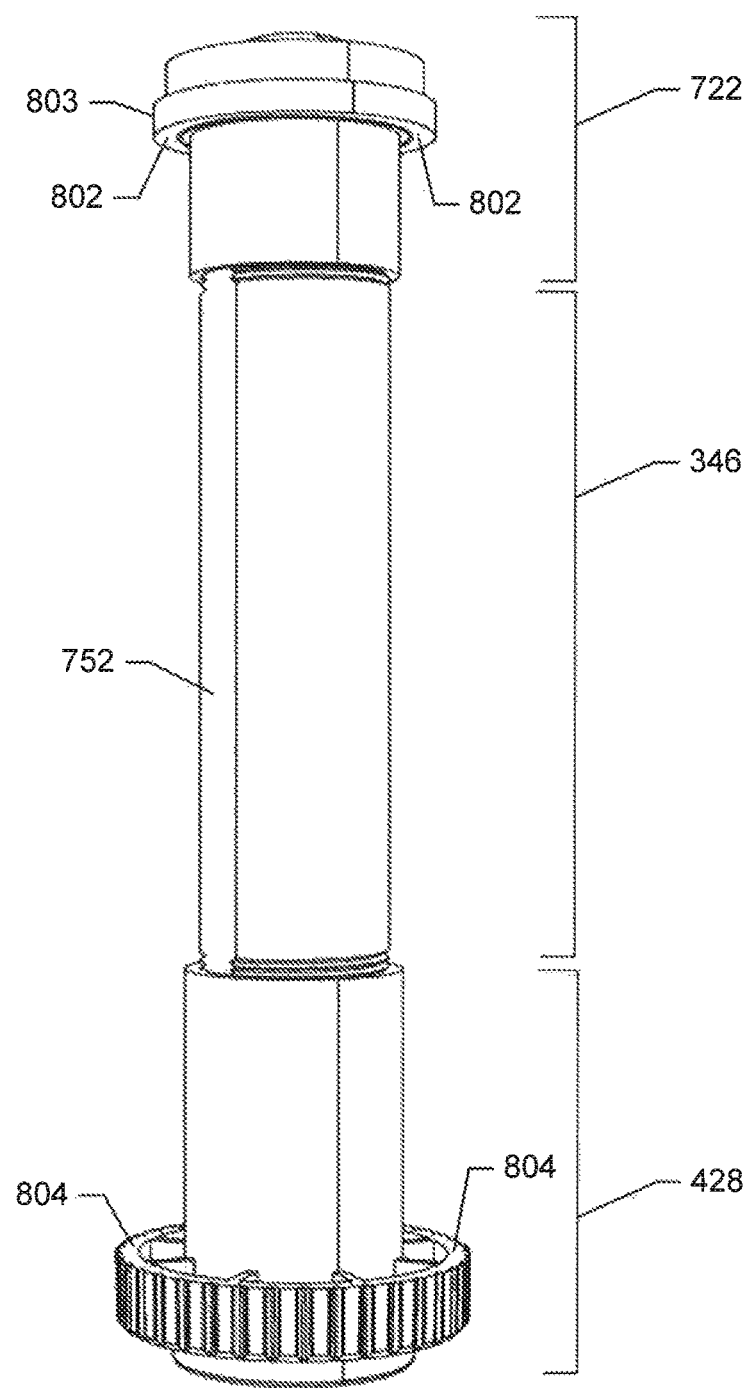
FIG. 8 is a side perspective view of an example viewer connected to a fastener and a second lens, according to various aspects of the present disclosure.

FIG. 8 illustrates the viewer 346 connected to the fastener 428 and the second lens 722. As illustrated, the fastener 428 and the second lens 722 have each been screwed onto the viewer 346, although in other embodiments other types of securing mechanisms may be used besides threading. As shown, the viewer 346 includes the flat portion 752 which may or may not have threading. In the example of FIG. 8, the flat portion 752 does not include threading. In examples, the flexible connector 426 may extend along an outside of the viewer 346 adjacent to the flat portion 752.

An inner surface 802 of a flange 803 around a circumference of the second lens 722 may contact the first component 422, such as the rear portion 712(B) of the first housing 712, when the viewer 346 is secured to the first component 422. Similarly, an inner surface 804 around a circumference of the fastener 428 may contact the second component 424, such as the rear portion 724(B) of the second housing 724, when the viewer 346 is secured to the second component 424. When the second lens 722 and/or the fastener 428 are tightened onto the viewer 346, the surface 802 may contact the rear portion 712(B) of the first housing 712 and the surface 804 may contact the rear portion 724(B) of the second housing 724 to secure the A/V device 210 to a barrier.

Figure 9A:
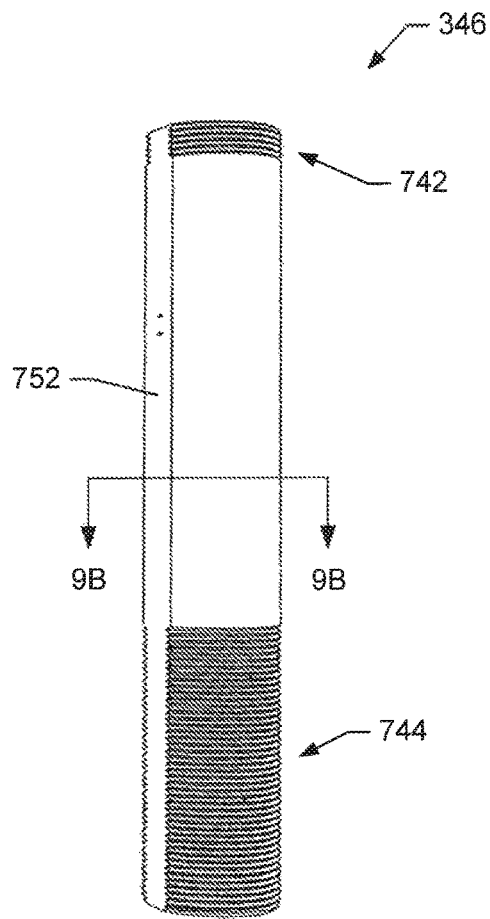
FIG. 9A is a side view of the example viewer of FIG. 8 detached from other elements, according to various aspects of the present disclosure.

FIG. 9A illustrates a portion of the viewer 346 (e.g., a shaft). In this example, the flat portion 752 extends along the entire length of the viewer 346, although in other examples the flat portion 752 may extend along only a portion of the length of the viewer 346, such as along a middle section of the viewer 346. As noted above, the first part 742 of the viewer 346 includes first threading configured to detachably couple to second threading on the second lens 722. Further, the second part 744 of the viewer 346 includes third threading configured to detachably couple to fourth threading on the fastener 428.

Figure 9B:
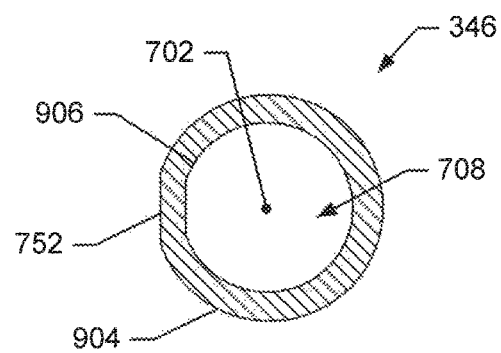
FIG. 9B is a cross-sectional view of the viewer of FIG. 9A taken along the line 9B-9B in FIG. 9A, according to various aspects of the present disclosure.

FIG. 9B illustrates a cross-sectional view of the viewer 346 taken along the section line 9B-9B in FIG. 9A. As illustrated, the viewer 346 includes the passage 708 extending along the first longitudinal axis 702 (traveling into and out of the page). A profile shape of the cross-section of the viewer 346 (e.g., taken perpendicular to the first longitudinal axis 702) includes a rounded portion 904 of the wall (e.g., being circular) and the flat portion 752 of the wall. As illustrated, an interior wall 906 of the viewer 346 may include a similar shape.

Figure 10A:
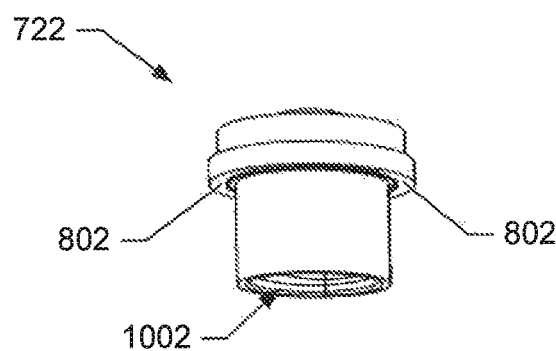
FIG. 10A is a side perspective view of an example second lens that may attach to an end of the viewer of FIG. 8, according to various aspects of the present disclosure.

FIG. 10A illustrates the second lens 722, which is removably attachable to the first part 742 of the viewer 346. As illustrated, an interior portion of the second lens 722 may include threading 1002, such as male or female threading, to attach to the first part 742 of the viewer 346.

Figure 10B:
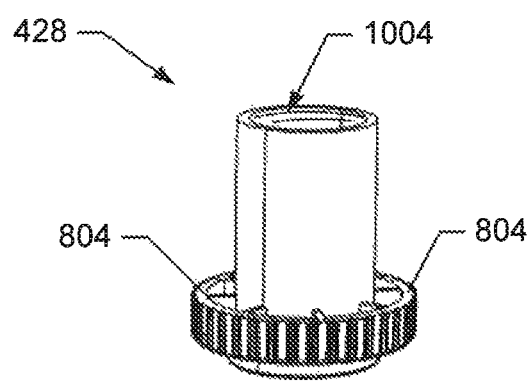
FIG. 10B is a side perspective view of an example fastener that may attach to an end of the viewer of FIG. 8, according to various aspects of the present disclosure.

FIG. 10B illustrates the fastener 428, which is removably attachable to the second part 744 of the viewer 346. As illustrated, an interior portion of the fastener 428 may include threading 1004, such as male or female threading, to attach to the second part 744 of the viewer 346.

Figure 11A:
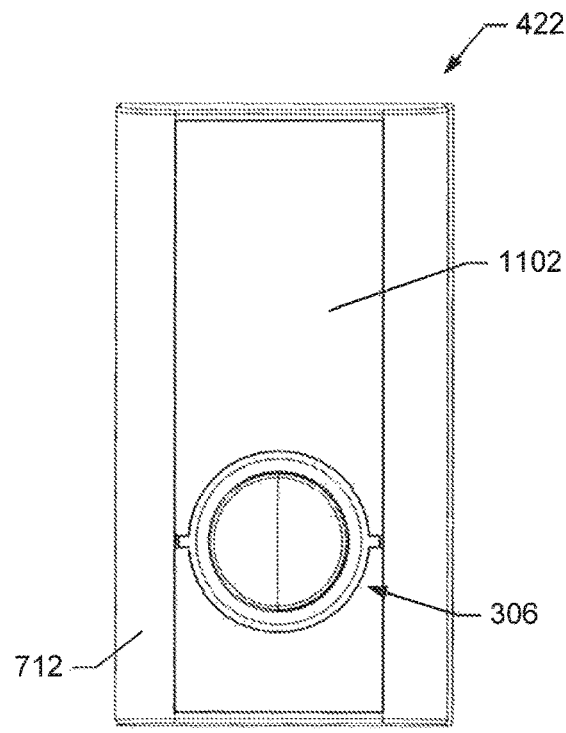
FIGS. 11A and 11B are front views of a first component of a A/V device with a viewer of FIGS. 7A-7C, according to various aspects of the present disclosure.
Figure 11B:
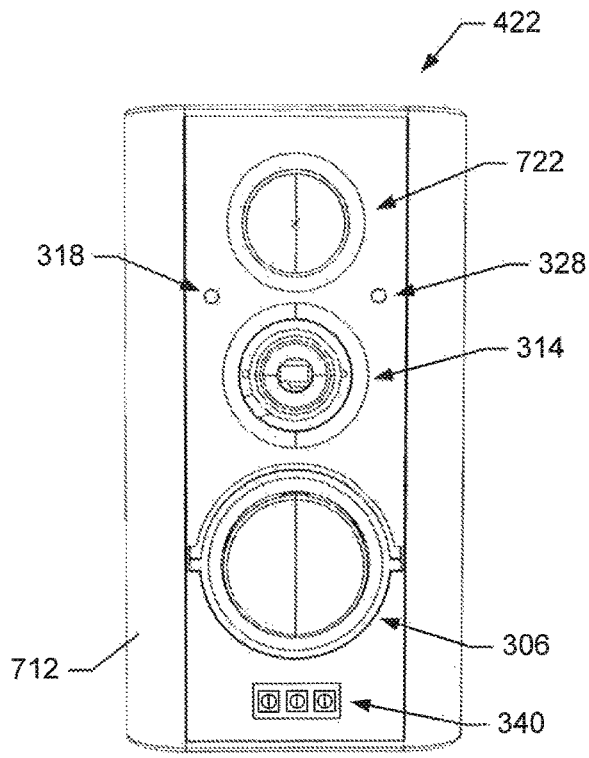

FIGS. 11A and 11B illustrate front views of the first component 422 of the A/V device 210. FIG. 11A illustrates a front view of the first component 422 with a cover 1102 disposed over the second lens 722 and the camera 314. The cover 1102 may be transparent, semi-transparent, etc., and protects the second lens 722, the camera 314, and/or other internal components of the first component 422. The cover 1102 may be formed of plastic, glass, metal, etc. In some examples, the cover 1102 is part of the first housing 712, while in other examples the cover 1102 is a separate component.

FIG. 11B illustrates a front view of the first component 422 with the cover 1102 of FIG. 11A removed to show the second lens 722, the camera 314, the microphone(s) 328, the light emitting components 340 (e.g., infrared lights), and the light sensor 318 (e.g., capable of detecting ambient light).

Figure 12A:
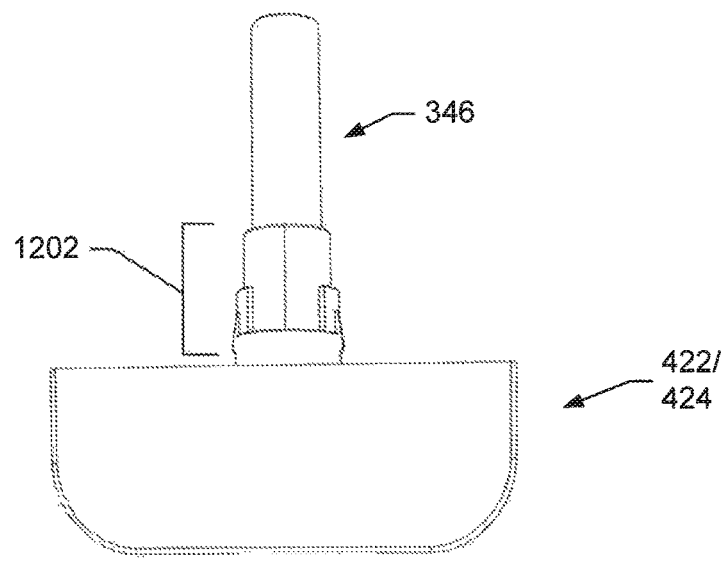
FIGS. 12A and 12B are top and side views, respectively, illustrating tabs for installing the A/V device with a viewer of FIGS. 7A-7C, according to various aspects of the present disclosure.
Figure 12B:
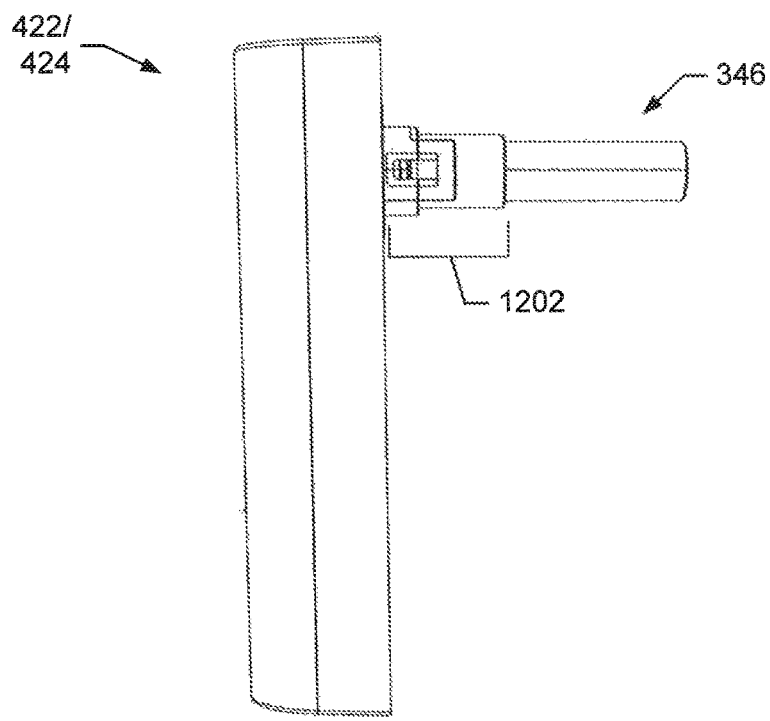

FIGS. 12A and 12B illustrate tabs 1202 to assist in installing the A/V device 210. FIG. 12A illustrates a top view of the first component 422 or the second component 424 and the viewer 346 with the tabs 1202 at a junction between the viewer 346 and the first component 422 or the second component 424. FIG. 12B illustrates a side view of the first component 422 or the second component 424 and the viewer 346 with the tabs 1202 at a junction between the viewer 346 and the first component 422 or the second component 424. The tabs 1202 may hold the first component 422 or the second component 424 and the viewer 346 within an opening in a barrier. To illustrate, when installing the A/V device 210, a user may attach the viewer 346 to the tabs 1202 and to the first component 422. The viewer 346 may then be inserted within the opening in the barrier, so that the tabs 1202 contact an inner surface of the opening and hold the combined first component 422 and viewer 346 in place (e.g., without falling out of the opening). The user may move to the other side of the barrier to connect the second component 424 to the second part 744 of the viewer 346 by using the fastener(s) 428, for example. In examples, the tabs 1202 have a wedge shape and engage the opening in the barrier in a friction fit to resist movement of the first component 422 and the second component 424 relative to the barrier. Although discussed as tabs, in other examples the tabs 1202 may be other types of fasteners, such as flanges, clamps, etc. Moreover, the first component 422 and the viewer 346 may be held to the barrier in other manners, such as with an adhesive.

In some examples, a sleeve (e.g., shaft) is used instead of (or in addition to) the tabs 1202. The sleeve may slide into a barrier and the viewer 346 may slide into the sleeve.

Figure 13B:
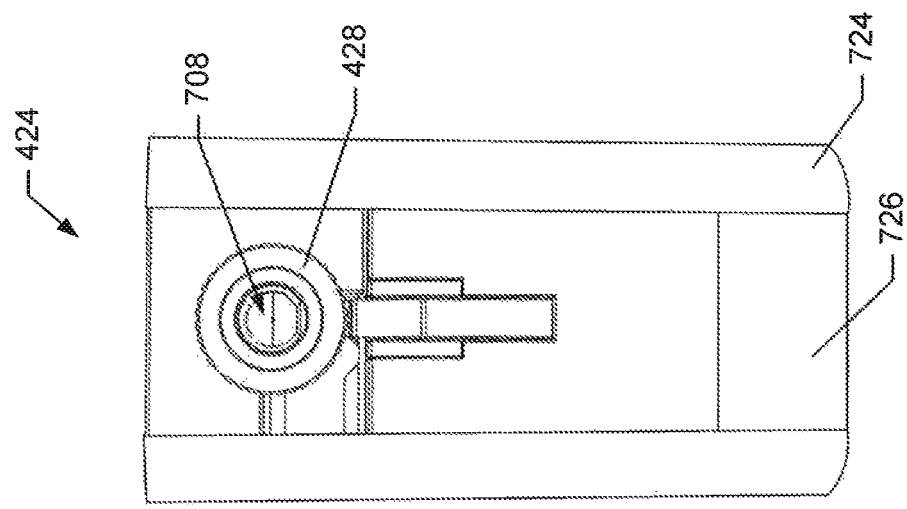
FIG. 13B is a front view of the second component of FIG. 13A with the cover removed, according to various aspects of the present disclosure.
Figure 13A:
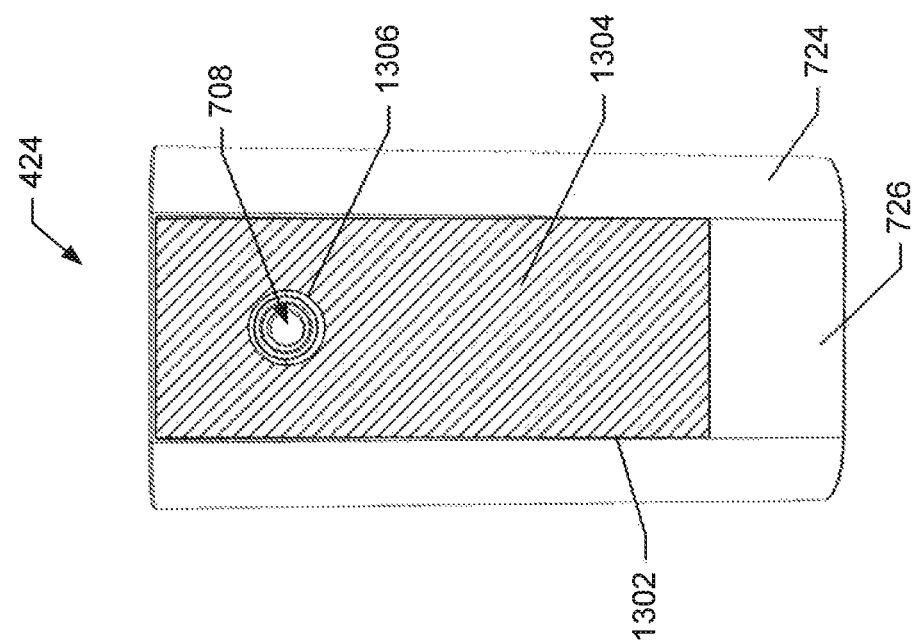
FIG. 13A is a front view of a second component of the A/V device with a viewer of FIGS. 7A-7C and including a cover disposed over a fastener, according to various aspects of the present disclosure.

FIG. 13A illustrates a front view of the second component 424 with a cover 1302 disposed over the fastener 428 and/or over the second opening 730, the passage 708 of the viewer 346, etc. The cover 1302 may be proximate the second front surface 726. The cover 1302 may be transparent, semi-transparent, solid, etc. For example, the cover 1302 may include a non-transparent portion 1304 illustrated with cross-hatching to cover the fastener 428 and other components within the second component 424. The non-transparent portion 1304 may provide an aesthetically pleasing appearance for the second component 424. Further, the cover 1302 may include a transparent (or semi-transparent) portion 1306, so that a user may look through the passage 708 in the viewer 346 (e.g., look through a door viewer implemented by the viewer 346). The cover 1302 may be formed of plastic, glass, metal, etc. In some examples, the cover 1302 is part of the second housing 724, while in other examples the cover 1304 is a separate component. FIG. 13B illustrates a front view of the second component 424 with the cover 1302 of FIG. 13A removed.

Although the cover 1302 is illustrated, in many examples the A/V device 210 does not include the cover 1302. For example, the second housing 724 may be formed of one or more pieces that do not include the cover 1302. Here, the second housing 724 may cover the internal components of the second component 424.

FIG. 14A illustrates an example of the rear portion 724(B) of the second housing 724 with the front portion 724(A) of the second housing 724 removed. In particular, FIG. 14A illustrates the battery 342, the flexible connector 426, the second coupler 738 of the flexible connector 426, a fastening portion 1402, and a slack receiving portion 1404(A)/1404(B). The fastening portion 1402 (e.g., a recess) may be configured to receive the fastener 428 when the viewer 346 is positioned through the second opening 730 and the fastener 428 is coupled to the viewer 346. As illustrated, the fastening portion 1402 is part of an internal portion of the second component 424 (e.g., part of the rear portion 724(B) of the second housing 724).

The slack receiving portion 1404(A)/1404(B) may receive excess length (e.g., slack) in the flexible connector 426. For example, the flexible connector 426 may be manufactured with a relatively long length to accommodate various door thicknesses. If an entirety of the flexible connector 426 is not needed for an installation (e.g., the length of the flexible connector 426 is substantially longer than the thickness of the door), then there may be excess length in the flexible connector 426 (e.g., the installation may yield excess length in the flexible connector 426). Such excess is often referred to as a service loop. The slack receiving portion 1404(A)/1404(B) may receive and/or secure the service loop of the flexible connector 426. In this example, the slack receiving portion 1404(A)/1404(B) includes a channel 1404(A) that may receive a variable length of the flexible connector 426 and a tab 1404(B) to secure the service loop.

FIG. 14B illustrates the rear portion 724(B) of the second housing 724 without the flexible connector 426, such that the second connection port 740 is visible. The second connection port 740 may connect to the second coupler 738 of the flexible connector 426. The second connection port 740 may be implemented in a variety of manners, such as through a 20-pin connection, a 24-pin connection, an n-pin connection, a USB connection, etc.

FIG. 14C illustrates the rear portion 724(B) of the second housing 724 with the fastener 428 attached. Here, the flexible connector 426 has been pulled through a door, and excess in the flexible connector 426 is secured with the slack receiving portion 1404(A)/1404(B). As illustrated, the passage 750 in the fastener 428 provides a viewable passage to the passage 708 in the viewer 346.

Figure 15:
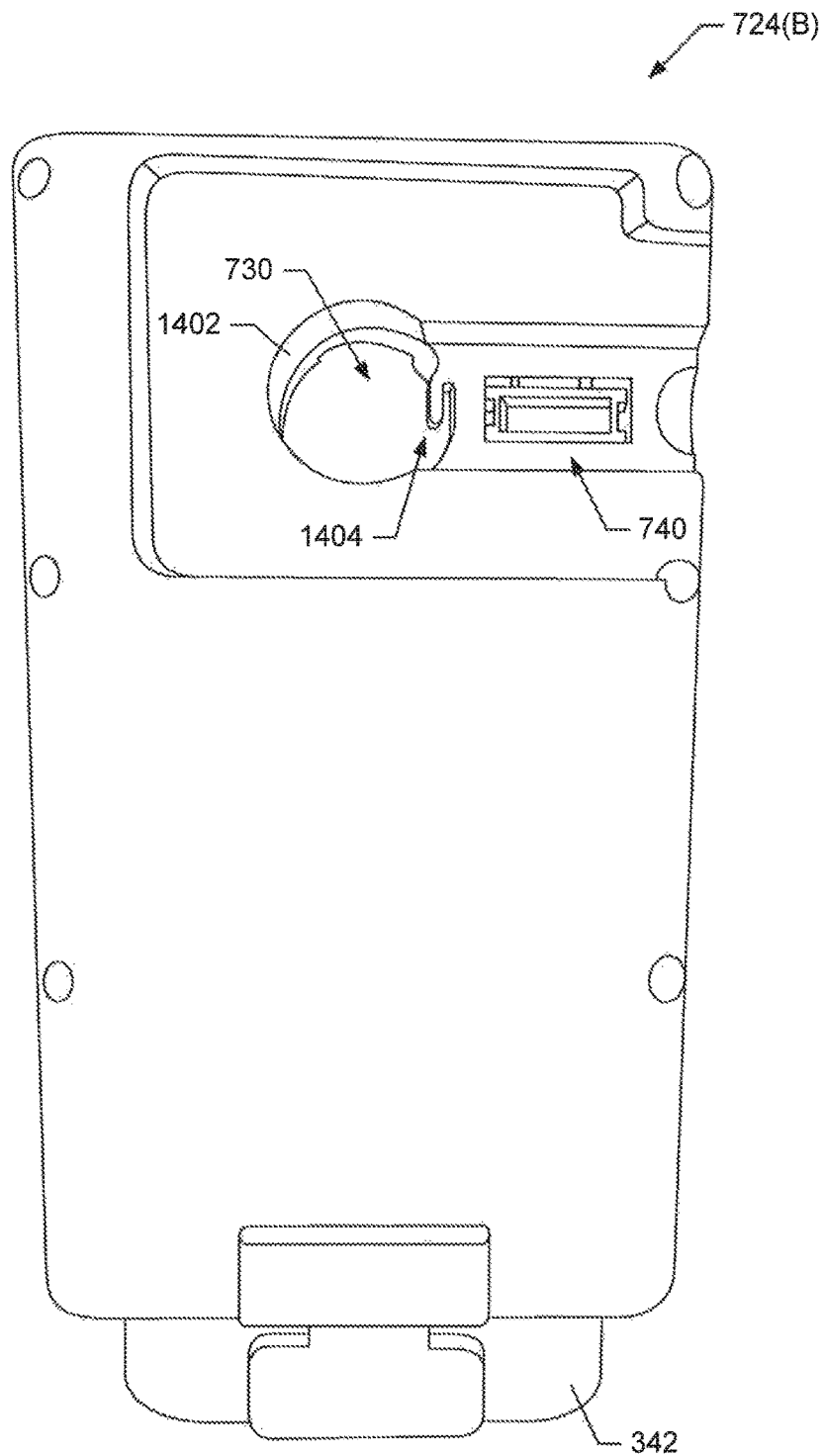
FIG. 15 is a rear perspective view of the second component of FIG. 13A with a portion of a housing of the second component removed, according to various aspects of the present disclosure.

FIG. 15 illustrates another example of the rear portion 724(B) of the second housing 724 with the front portion 724(A) of the second housing 724 removed. Here, the second connection port 740, the second opening 730, and the battery 342 are illustrated. In this example, the slack receiving portion 1404 includes a tab to adjust tension on the flexible connector 426 (not illustrated in FIG. 15). For example, the flexible connector 426 may be pulled through or around the tab 1404 to tighten the tension on the flexible connector 426 once the A/V device 210 is installed on a barrier (e.g., with the flexible connector 426 extending through an opening in the barrier). The second coupler 738 of the flexible connector 426 may then be connected to the second connection port 740. As noted above, in some examples, the flexible connector 426 may be implemented with a relatively long length to accommodate different thicknesses of barriers (e.g., different installation configurations). In other words, the flexible connector 426 may include more length than is needed to travel through openings in some barriers. As such, the tab 1404 may allow slack (e.g., excess length) in the flexible connector 426 to be removed by tightening through or around the tab 1404.

Figure 16:
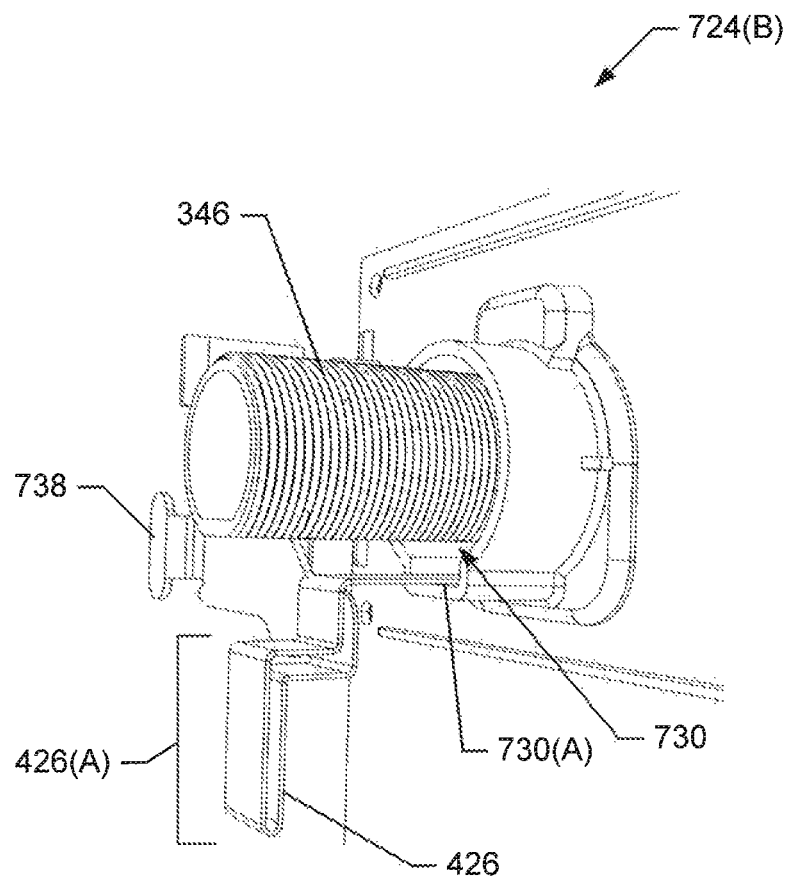
FIG. 16 is a side perspective view of an example service loop of a coupler, according to various aspects of the present disclosure.

FIG. 16 illustrates an example service loop 426(A) of the flexible connector 426. Here, various surfaces of the rear portion 724(B) of the second housing 724 have been removed to show the service loop 426(A) as it would be secured within the slack receiving portion 1404 of FIG. 14A or FIG. 14C (e.g., within a channel). As illustrated, the second opening 730 of the second component 424 includes a flat portion 730(A) (e.g., recess) to receive the flexible connector 426.

Figure 17:
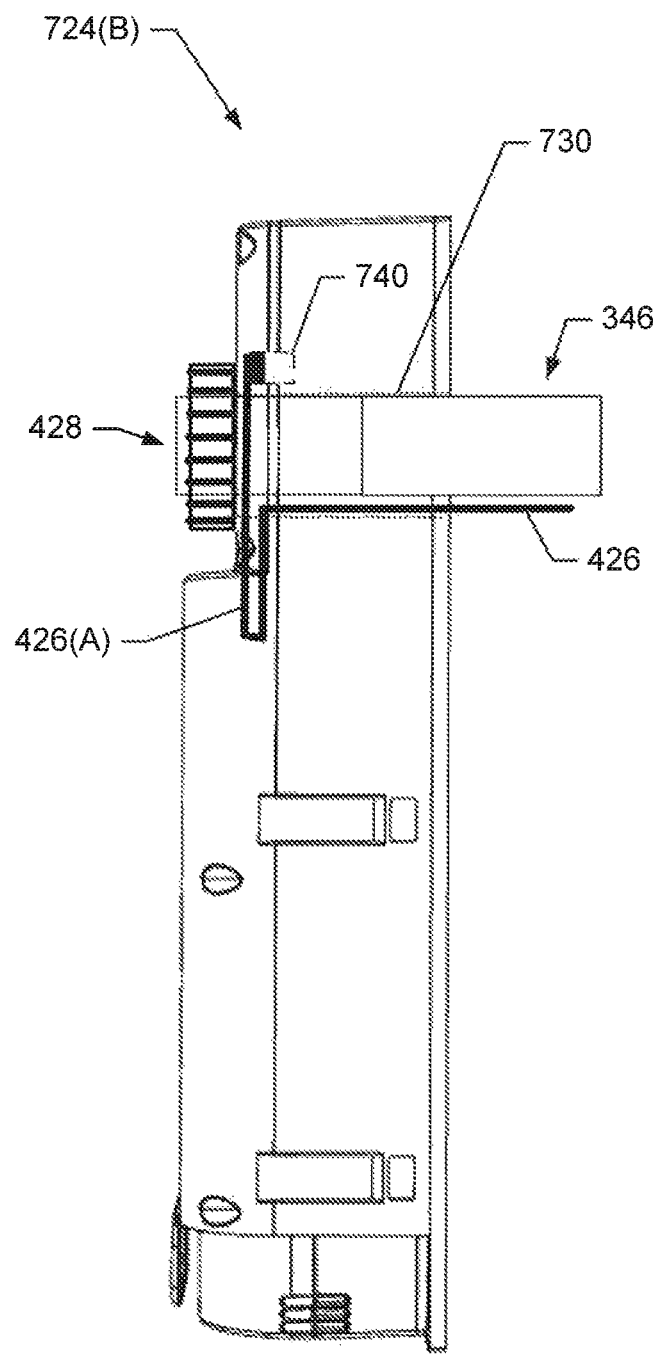
FIG. 17 is a side partial cross-sectional view of the second component of FIG. 13A including another example service loop of a coupler secured within a rear portion of the second component, according to various aspects of the present disclosure.

FIG. 17 illustrates another example service loop 426(A) of the flexible connector 426 secured within the rear portion 724(B) of the second housing 724. In this example, the fastener 428 is connected to the viewer 346 and the flexible connector 426 is positioned below the viewer 346 (e.g., along the flat portion 752 of the viewer 346). As shown, the flexible connector 426 extends through the second opening 730, around the fastener 428, and connects to the second connection port 740.

Figure 18A:
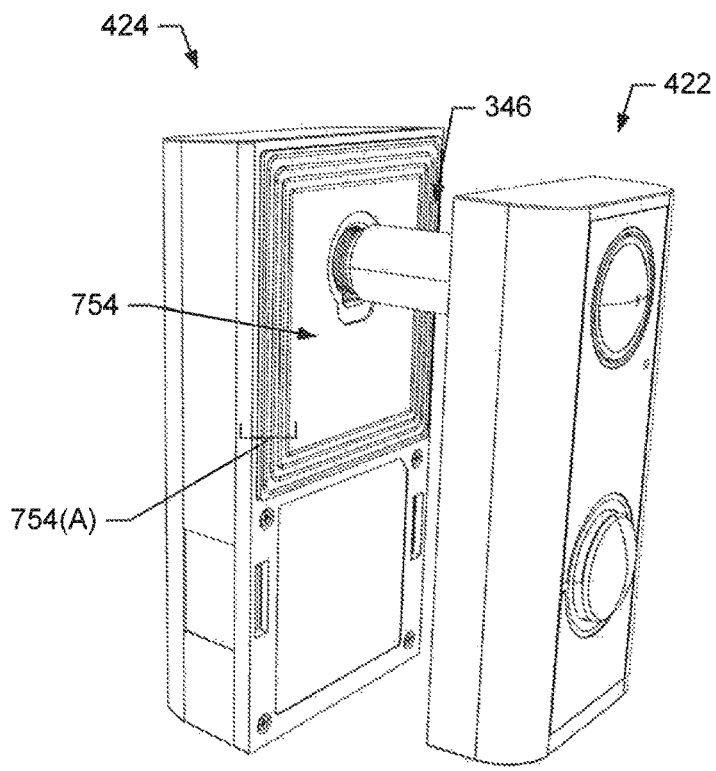
FIGS. 18A-18B are perspective views of a portion of the A/V device with a viewer of FIGS. 7A-7C, according to various aspects of the present disclosure.
Figure 18B:
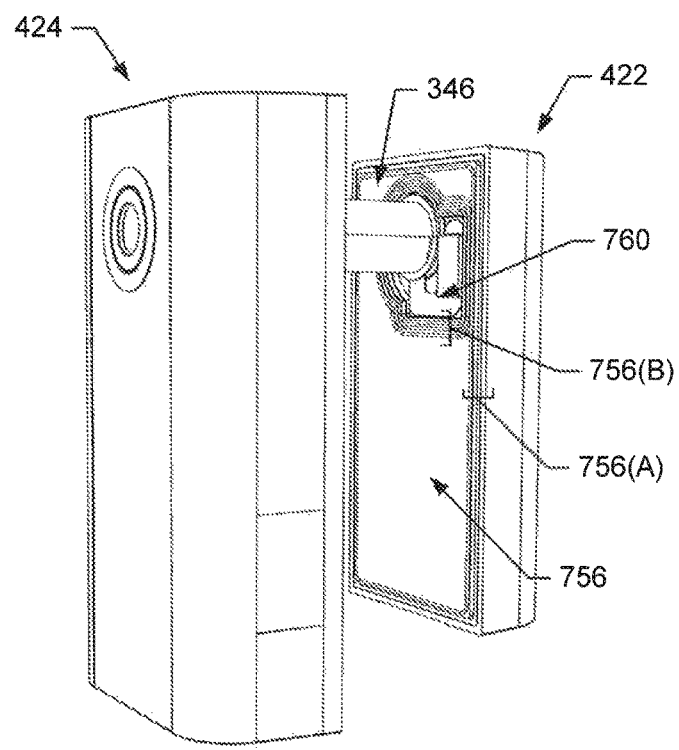

FIG. 18A illustrates the second gasket 754 attached to the second component 424, and FIG. 18B illustrates the first gasket 756 attached to the first component 422. In examples, the gasket(s) 754 and/or 756 may protect the A/V device 210, provide grip to enable the A/V device 210 to maintain an installed position, seal out water or other substances, etc. The gasket(s) 754 and/or 756 may comprise a high-friction material that provides grip to resist movement of the A/V device 210 relative to the barrier. In various embodiments, the gasket(s) 754 and/or 756 may comprise rubber, silicone, various plastics, etc.

In the examples of FIGS. 18A-18B, the gasket(s) 754 and/or 756 comprise ribbed portions (e.g., portions with raised bands). For example, the second gasket 754 may include a ribbed portion 754(A) that extends around a perimeter of the second gasket 754. Further, the first gasket 756 may include a first ribbed portion 756(A) that extends around a perimeter of the first gasket 756 and a second ribbed portion 756(B) that extends around the opening 760 in the first gasket 756. Although illustrated as ribbed components, the gasket(s) 754 and/or 756 may not be ribbed and/or may include other texture.

Figure 19A:
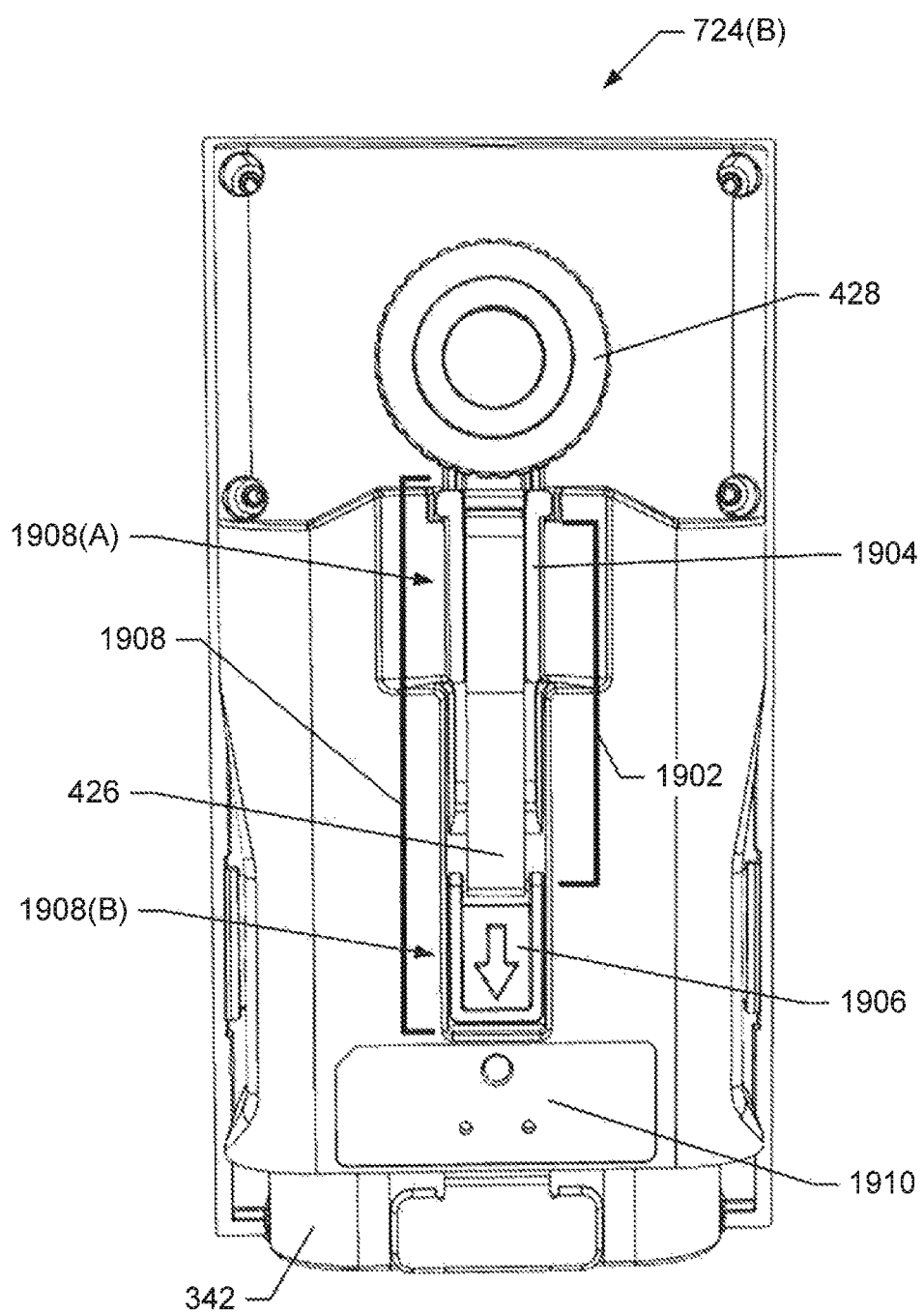
FIG. 19A is a front view illustrating an example of a second component of the A/V device of FIGS. 7A-7C, according to various aspects of the present disclosure.

FIGS. 19A-19M illustrate various aspects of securing an example flexible connector 426 to the second component 424. FIG. 19A illustrates an example of the rear portion 724(B) of the second housing 724 with the front portion 724(A) of the second housing 724 removed. In particular, FIG. 19A illustrates the battery 342, the flexible connector 426, an excess connector receiving portion 1902, a connector holder 1904, and a tab 1906. As shown, the flexible connector 426 may extend around the connector holder 1904 and the tab 1906. In examples, the flexible connector 426 may include excess length to allow the flexible connector 426 to be installed in barriers of various thicknesses. During installation, the tab 1906 may be pulled (e.g. in a downward direction with respect to FIG. 19A) to pull the excess length through the barrier, creating the excess connector receiving portion 1902 (e.g., a service loop). The tab 1906 and/or the connector holder 1904 may be attached to the rear portion 724(B) of the second housing 724 to secure the excess connector receiving portion 1902. For example, the connector holder 1904 may be attached to the flexible connector 426 and removably attachable to a first end 1908(A) of a channel 1908 on the rear portion 724(B) of the second housing 724. The tab 1906 may removably attach to a second end 1908(B) of the channel 1908. As such, the excess connector portion 1902 (e.g., a service loop of the flexible connector 426) may be retained within the channel 1908 when the connector holder 1904 is attached to the first end 1908(A) of the channel 1908 and the tab 1906 is attached to the second end 1908(B) of the channel 1908. A length of the channel 1908 may accommodate a length of the service loop when the flexible connector 426 is extended in an installed state.

In some examples, a Quick Response (QR) code, barcode, or other type of marker may be placed at a location 1910 (e.g., with a sticker, printed, etc.). A user may scan the marker with a camera of a mobile device, for example, and be directed to content that enables the user to install the A/V device 210, such as a website, application, etc.

Figure 19C:
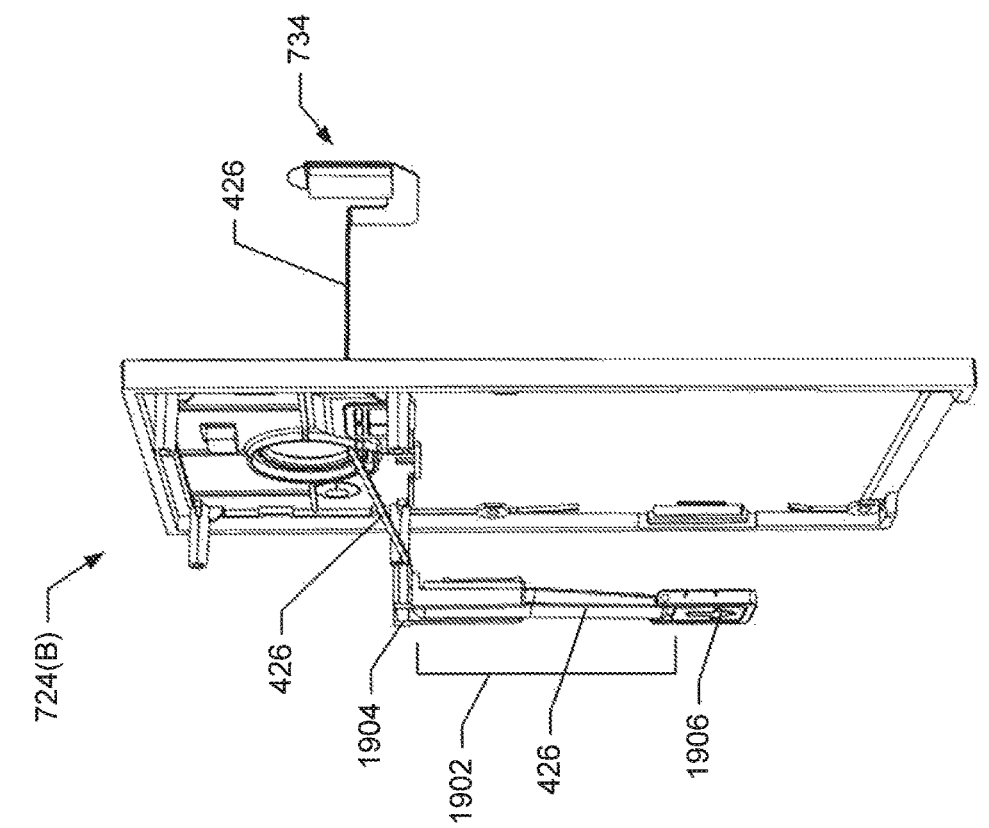
FIG. 19C is a side perspective view illustrating an example of the second component of the A/V device of FIG. 19B with a portion removed, according to various aspects of the present disclosure.
Figure 19B:
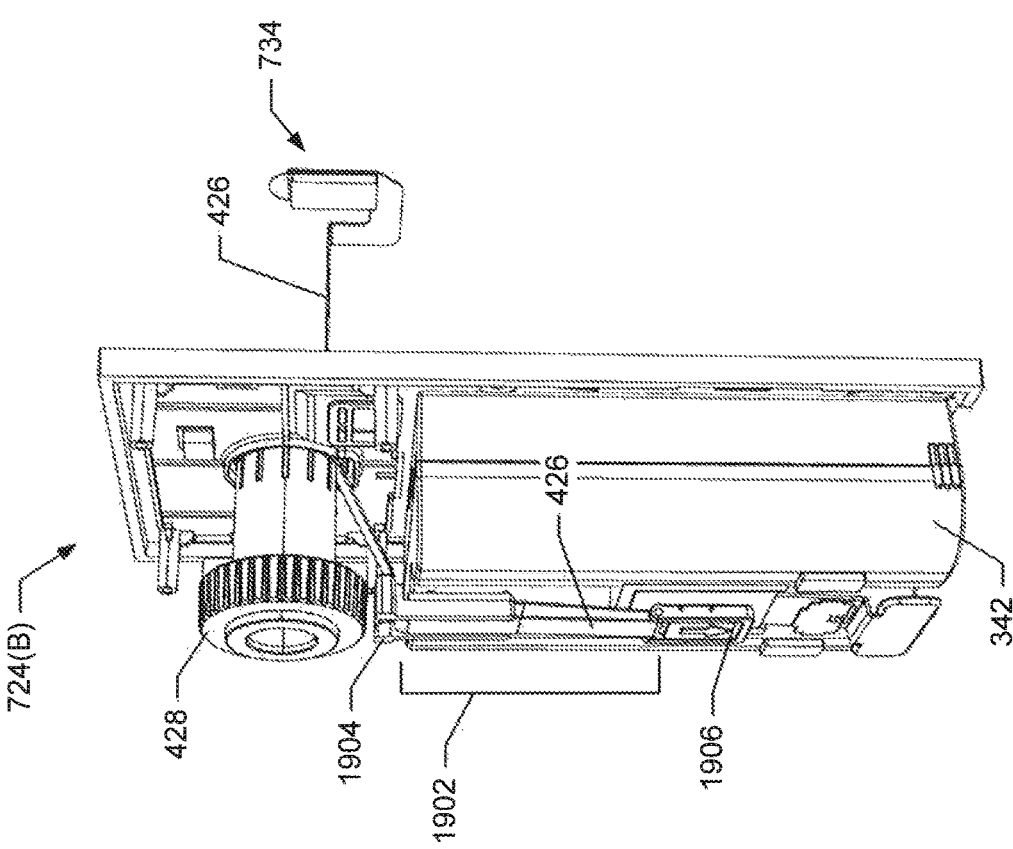
FIG. 19B is a side perspective view illustrating an example of the second component of the A/V device of FIG. 19A with a portion removed, according to various aspects of the present disclosure.

FIG. 19B illustrates an example of the rear portion 724(B) with a portion of the rear portion 724(B) that is illustrated in FIG. 19A removed to show how the flexible connector 426 is positioned in the A/V device 210 (e.g., in an installed and tightened position). As illustrated, the flexible connector 426 may include the first coupler 734 for connection to the first connection port 736 on the first component 422 (not illustrated in FIG. 19B). FIG. 19C illustrates an example of the rear portion 724(B) with components that are illustrated in FIG. 19B removed to show how the flexible connector 426 is positioned in the A/V device 210 (e.g., in an installed and tightened position).

FIG. 19D illustrates a first view of the flexible connector 426, the connector holder 1904, and the tab 1906 (e.g., removed from the rear portion 724(B)). FIG. 19E illustrates a second view of the flexible connector 426, the connector holder 1904, and the tab 1906 to show the first coupler 734 and the second coupler 738. As noted above, the first coupler 734 may connect to the first component 422 and the second coupler 738 may connect to the second component 424.

Figure 19F:
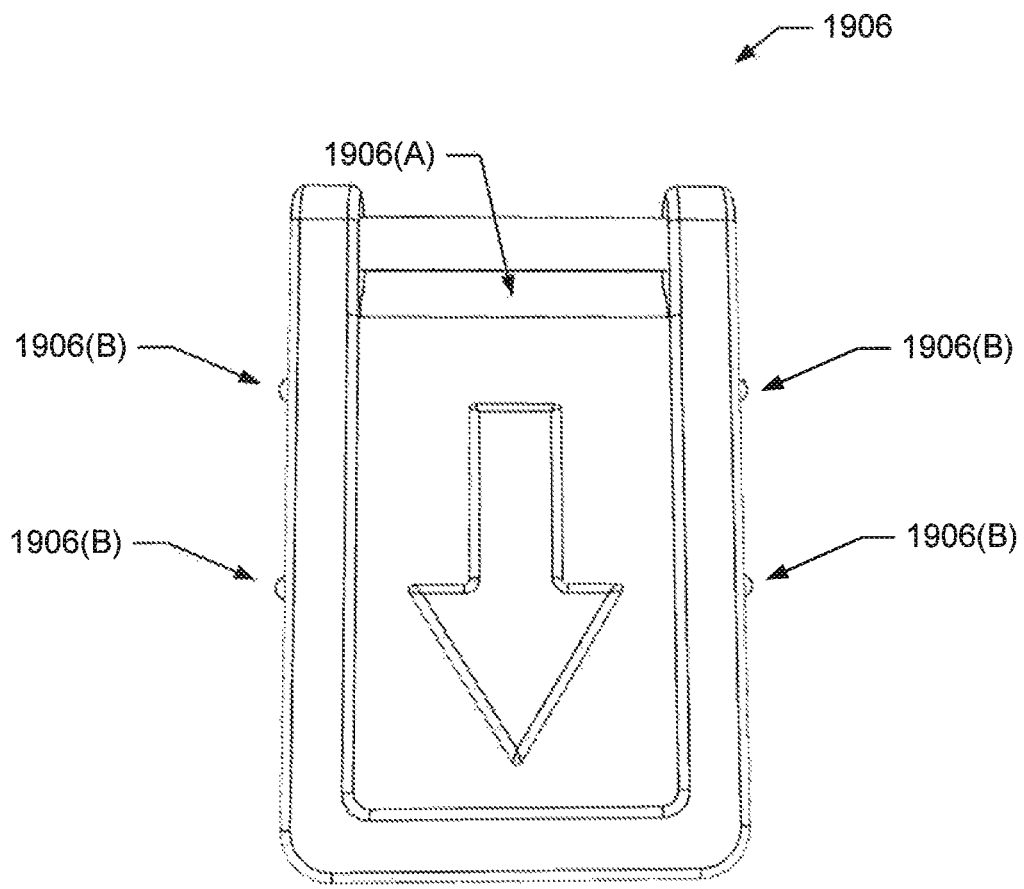
FIG. 19F is a front view illustrating an example tab, according to various aspects of the present disclosure.

FIG. 19F illustrates a front view of the tab 1906. The tab 1906 may include an opening 1906(A), such as a slot, to receive the flexible connector 426 (not illustrated in FIG. 19F). The flexible connector 426 may be pulled through the opening 1906(A) during installation to remove excess length in the flexible connector 426. The tab 1906 may also include detents (e.g., protrusions) 1906(B). The detents 1906(B) may enable the tab 1906 to engage the channel 1908 in the rear portion 724(B) of the second housing 724, as discussed in further detail below. Although four detents 1906(B) are illustrated in FIG. 19F, any number of detents may be used.

Figure 19H:
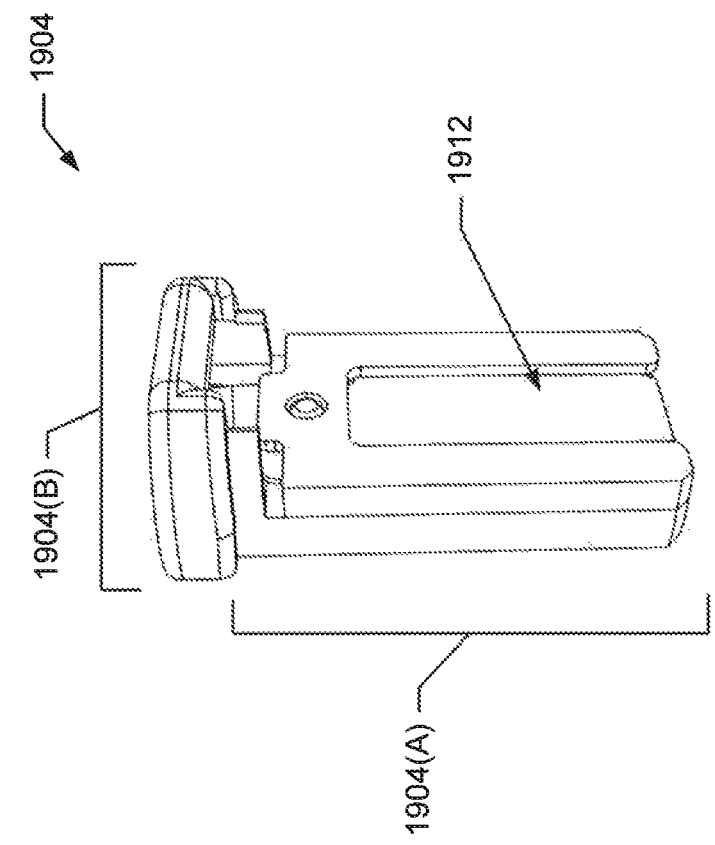
FIG. 19H is a rear perspective view of the example connector holder of FIG. 19G, according to various aspects of the present disclosure.
Figure 19G:
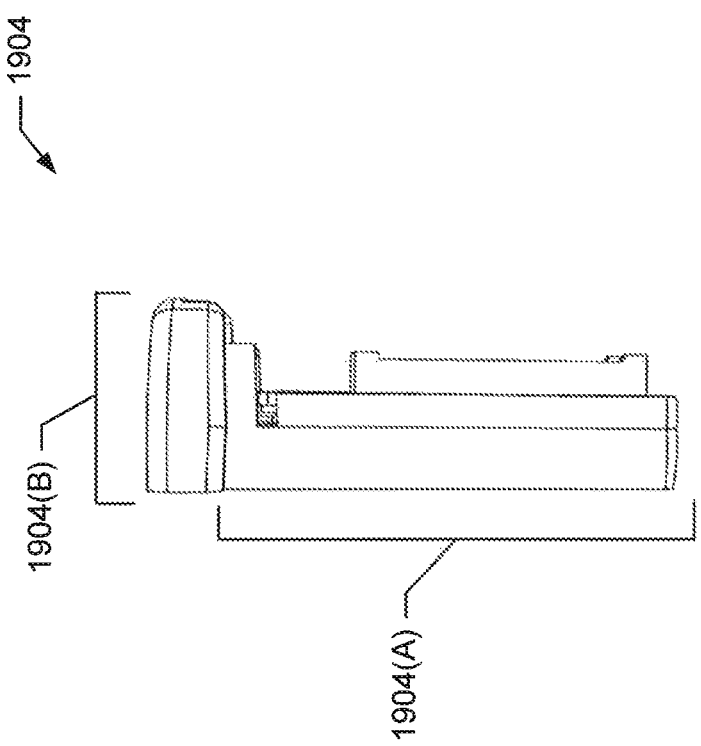
FIG. 19G is a side view illustrating an example connector holder, according to various aspects of the present disclosure.

FIG. 19G illustrates a side view of the connector holder 1904. The connector holder 1904 has a first portion 1904(A) that extends in a first direction and a second portion 1904(B) that extends from the first portion 1904(A) such that the second portion 1904(B) extends in a second direction transverse to the first direction, such as in a perpendicular manner.

FIG. 19H illustrates a perspective view of the connector holder 1904. As illustrated, the connector holder 1904 includes an opening 1912 where the second coupler 738 of the flexible connector 426 may protrude through, as shown in FIG. 19E. As such, the first portion 1904(A) of the connector holder 1904 may attach to the second coupler 738 of the flexible connector 426, again as shown in FIG. 19E.

Figure 19I:
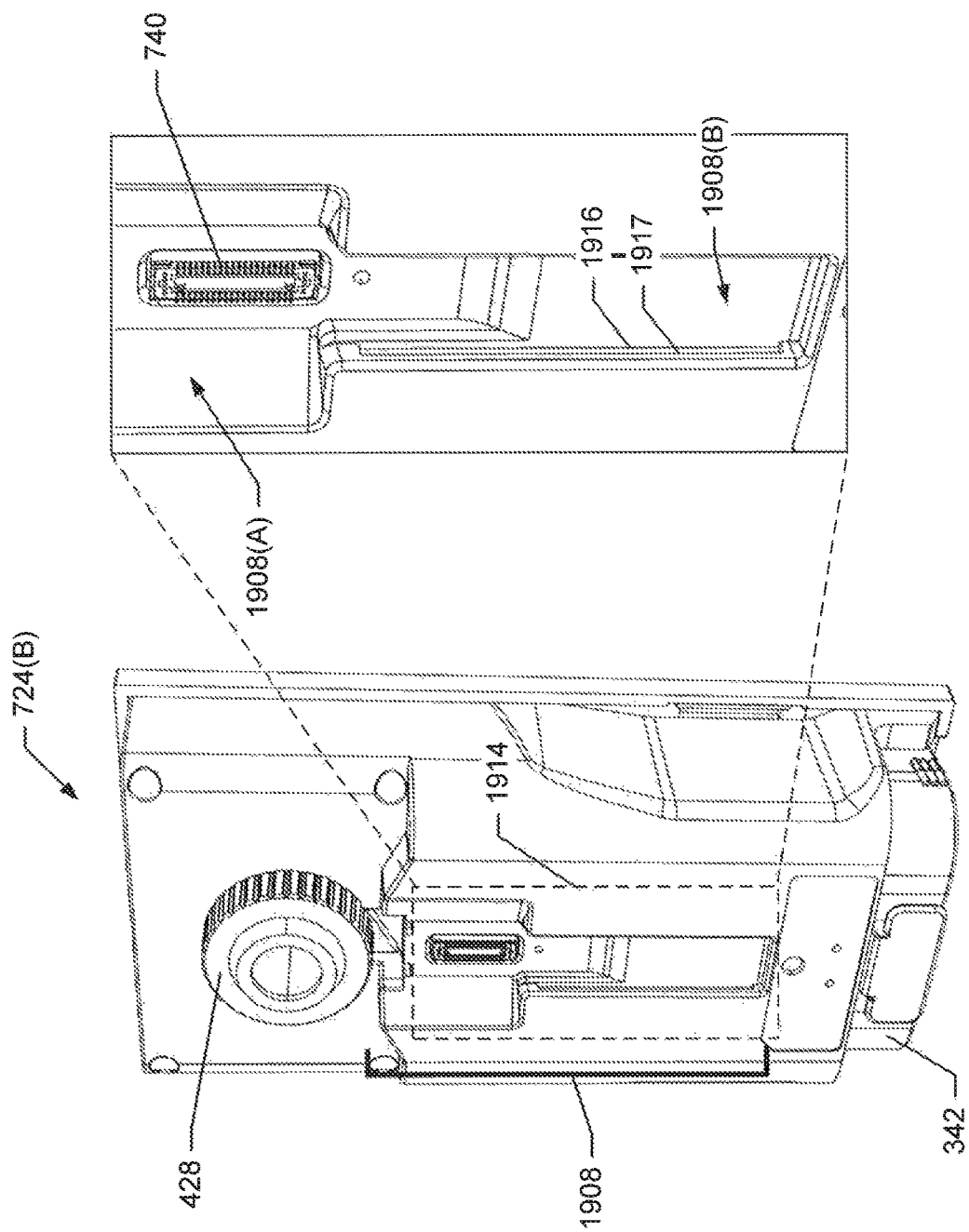
FIG. 19I is a detail perspective view of a channel of the second component of the A/V device of FIG. 19A taken from a first example perspective, according to various aspects of the present disclosure.

FIG. 19I illustrates example details of the channel 1908 of the rear portion 724(B) of the second housing 724 taken from a first example perspective view. In particular, FIG. 19I illustrates a detail view of a portion 1914 of the rear portion 724(B). As illustrated, the first end 1908(A) of the channel 1908 may include the second connection port 740 to connect to the second coupler 738 of the flexible connector 426. That is, the second housing 724 may include the second connection port 740 to connect to the second coupler 738 (FIG. 19E). The channel 1908 may also include an undercut 1916 just beneath first and second opposite ledges 1917, and the undercut 1916 and ledges 1917 may engage with the tab 1906 (e.g., to engage with the detents 1906(B)). For example, the tab 1906 may seat within the channel 1908 in a friction fit engagement with the detents 1906(B) seating within the undercut 1916 just beneath the ledges 1917. The tab 1906, including the detents 1906(B), engages the channel 1908 in a friction fit to resist any upward movement of the tab 1906 within the channel 1908, thereby maintaining a slight tension in the flexible connector 426 that resists relaxation of the flexible connector 426, which might otherwise create slack and/or bowing in the flexible connector 426. Further, when the tab 1906 is pressed into the channel 1908 during the process of installing the A/V device 210, the tab 1906 may "snap" into the channel 1908 as the detents 1906(B) seat within the undercut 1916 (e.g., because a width of the tab 1906 as measured across the detents 1906(B) may be slightly greater than a width of the channel 1908 as measured across the ledges 1917). In this example, the undercut 1916 may extend along a majority of a length of the channel 1908 (e.g., more than 50% of the length of the channel 1908). In other examples, the undercut 1916 may be shorter or longer in length.

Figure 19J:
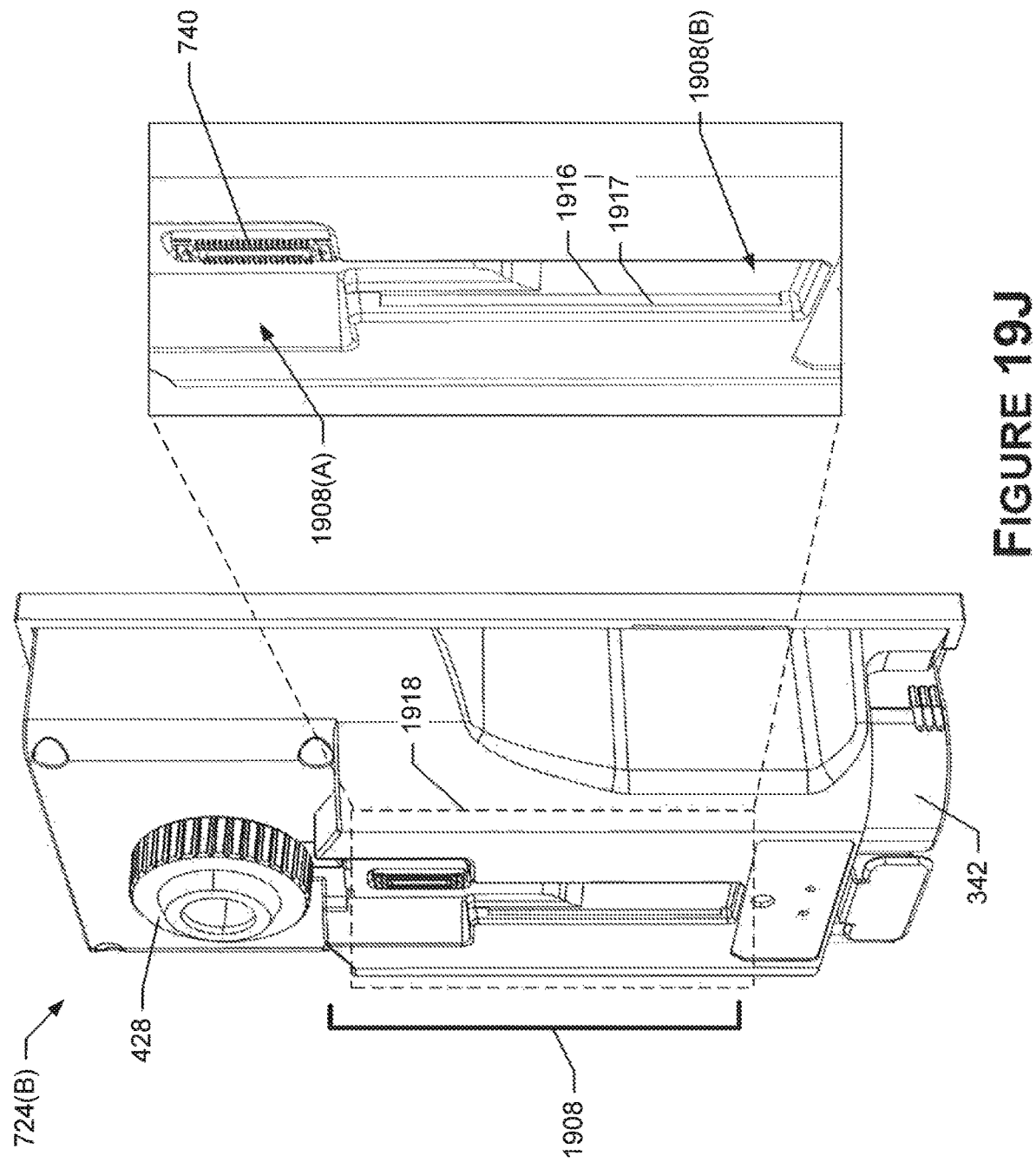
FIG. 19J is a detail perspective view of a channel of the second component of the A/V device of FIG. 19A taken from a second example perspective, according to various aspects of the present disclosure.

FIG. 19J illustrates further example details of the channel 1908 of the rear portion 724(B) of the second housing 724 taken from a second example perspective view. In particular, FIG. 19J illustrates a view of a portion 1918 of the rear portion 724(B) to further illustrate details of the undercut 1916 and the ledges 1917.

FIGS. 19K-19L illustrate the tubular member 347 and the flexible connector 426 during an example installation process. In particular, FIGS. 19K-19L illustrate how the flexible connector 426 may be positioned partly within tubular member 347 to facilitate inserting the flexible connector 426 into an opening in a barrier. In this example, the tubular member 347 is illustrated within a tube 1920 that represents the opening in the barrier. The flexible connector 426 may extend along the tubular member 347 in a space between the tubular member 347 and the tube 1920, where the space between the tubular member 347 and the tube 1920 is partially bounded by the flat portion 752 of the tubular member 347. FIG. 19K illustrates the connector holder 1904 inserted within an opening at the first end 347(A) of the tubular member 347, while FIG. 19L illustrates the connector holder 1904 removed from the first end 347(A) of tubular member 347.

With reference to FIG. 19L, in examples, an outer shape of the first portion 1904(A) of the connector holder 1904 may substantially correspond to an inner shape of the passage 708 of the viewer 346. In one example, the inner shape of the passage 708 may be circular and one or more of the outer surfaces of the first portion 1904(A) may be rounded to fit within the circular passage 708. In another example, the inner shape of the passage 708 may be rectangular and the first portion 1904(A) may be rectangular to fit within the rectangular passage 708. In examples, the first portion 1904(A) (and/or the second portion 1904(B)) may have a width, thickness, diameter, etc. that is the same as or less than a width, diameter, etc. of the inner surface of the passage 708. Further, in examples, the first portion 1904(A) may engage with the passage 708 in a friction fit engagement to maintain the connector holder 1904 in the viewer 346 during installation.

In examples, during installation, the connector holder 1904 may be disposed within the passage 708 in the viewer 346, as shown in FIG. 19K, with the second coupler 738 of the flexible connector 426 attached to the connector holder 1904, as shown in FIG. 19E. Then, the viewer 346 may be inserted into an opening (represented by the tube 1920 in FIG. 19K) in a barrier. This aspect of the present embodiments allows the flexible connector 426 to be passed through the opening in the barrier without being damaged. Once inserted, the connector holder 1904 may be removed from the viewer 346, as illustrated in FIG. 19L, and the second coupler 738 housed within the connector holder 1904 (FIG. 19E) may be connected to the second connection port 740 (FIG. 19I). The tab 1906 may then be pulled down to tighten any slack in the flexible connector 426, and the tab 1906 may then be snapped into the channel 1908 of the rear portion 724(B), as illustrated in FIG. 19A, with the detents 1906(B) seating within the undercut 1916 (FIG. 19I). An example process for mounting the A/V device 210 on a barrier is described in further detail below.

Figure 19M:
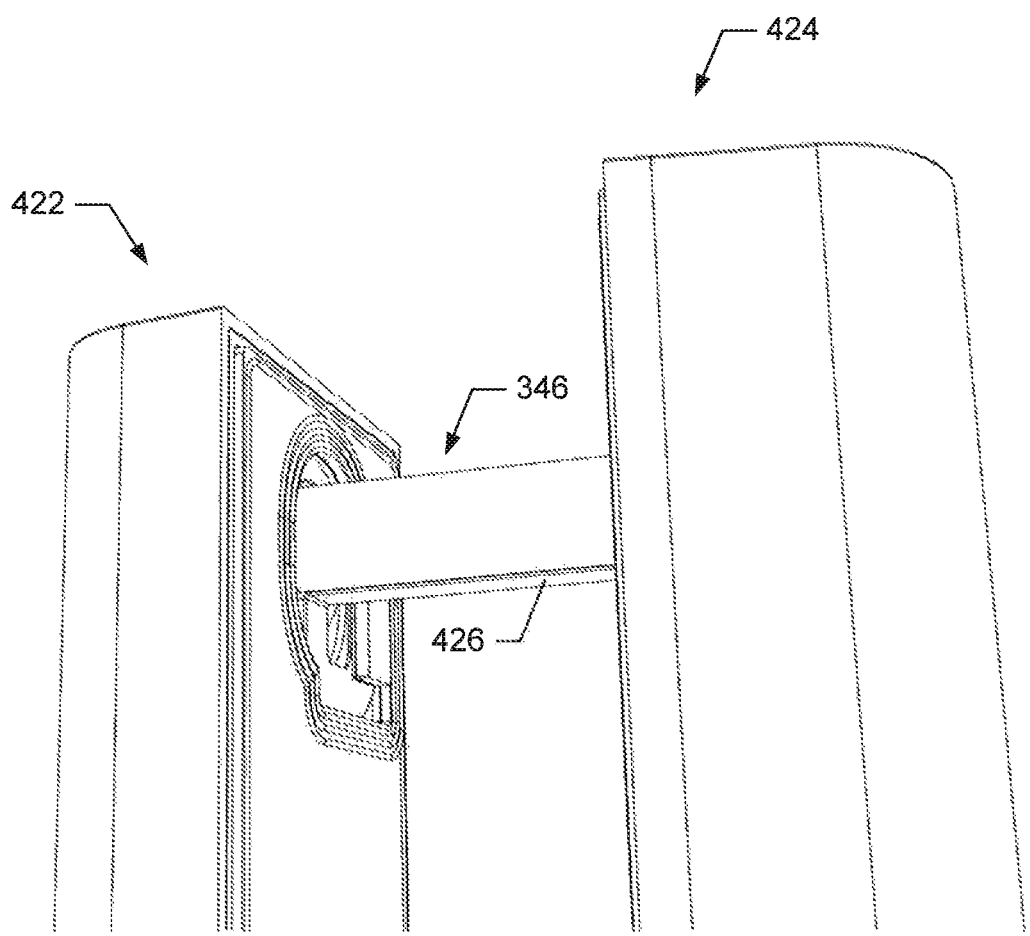
FIG. 19M is a side perspective view of the A/V device of FIG. 19A with an example flexible connector attached between the first component and the second component, according to various aspects of the present disclosure.

FIG. 19M illustrates the A/V device 210 with the flexible connector 426 attached between the first component 422 and the second component 424. In particular, the flexible connector 426 is positioned below, and extending along the flat portion 752 of, the viewer 346. FIG. 19M illustrates how the flexible connector 426 and the viewer 346 may be arranged when installed within an opening in a barrier (omitted from FIG. 19M for clarity). As illustrated, the flexible connector 426 may be pulled to be substantially taut by pulling downward on the tab 1906 as described above.

Figure 20:
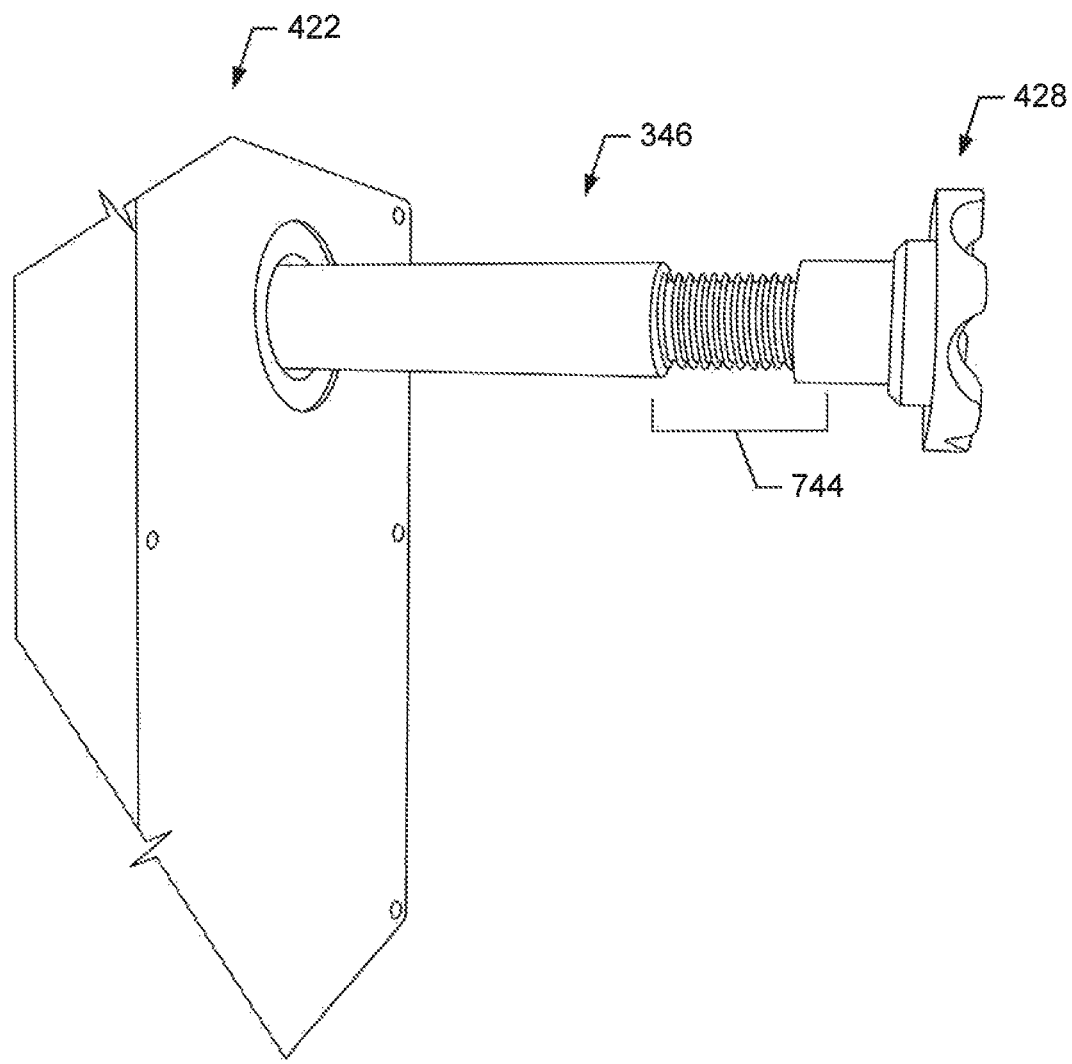
FIG. 20 is side perspective view of an example fastener that attaches to the viewer of FIG. 8, according to various aspects of the present disclosure.

FIG. 20 illustrates an example of the fastener 428 that attaches to the second part 744 of the viewer 346. In particular, the viewer 346 may extend into and/or be connected to the first component 422. Threads on the second part 744 of the viewer 346 may receive the fastener 428. The fastener 428 is implemented as a nut in this example. As one example of installation, the first component 422 (with the viewer 346 attached) may be placed in contact with an exterior of a barrier by sliding the viewer 346 through an opening in the barrier. The second component 424 may then be slid onto the second part 744 of the viewer 346. The fastener 428 may then be placed on the second part 744 of the viewer 346 and tightened. Tightening the fastener 428 may cause the first component 422, which is located on one side of the barrier, and the second component 346, which is located on the other side of the barrier, to clamp to the barrier.

In some examples, the A/V device 210 may include different sized viewers 346 and/or an extender that attaches to the viewer 346 in order to account for different thicknesses of barriers, different diameters of openings in barriers, etc. For example, the A/V device 210 may be distributed (e.g., sold) with multiple viewers 346 that are different lengths and/or diameters. A user may remove an existing door viewer and install the viewer 346 that is sized for that particular installation (e.g., extends through a barrier).

Although many examples are discussed in the context of using the viewer 346, in some examples the A/V device 210 may be implemented without the viewer 346. For example, an existing door viewer may be left in a door, and the first component 422 and the second component 424 may be installed and aligned to the existing door viewer, so that a user may continue to use the existing door viewer and implement the functionality of the A/V device 210. Here, the A/V device 210 may be attached to the barrier with fasteners, adhesive, etc.

Moreover, in some examples, the A/V device 210 may be implemented without a door viewer. To illustrate, the first component 422 may be attached to a first side of a barrier and the second component 424 may be attached to a second side of the barrier (using the viewer 346 through an opening in the barrier or without the viewer 346). Here, the first component 422 may capture image data and display the image data on a display on the second component 424. This configuration may allow a user to view what is occurring on the first side of the barrier without opening the barrier.

Figure 21:
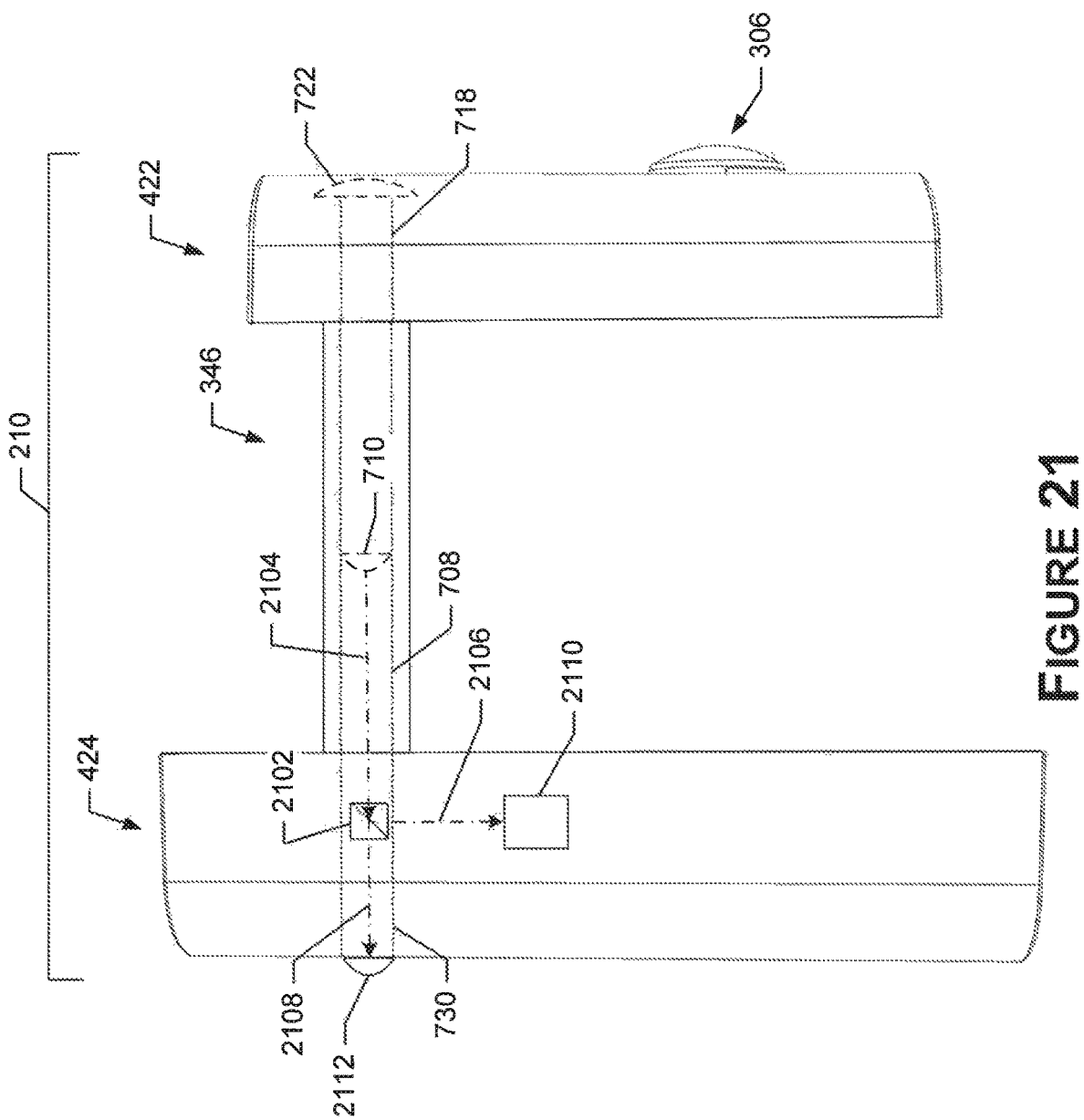
FIG. 21 is a side view of the A/V device with a viewer of FIGS. 7A-7C implemented with a beam splitter, according to various aspects of the present disclosure.

FIG. 21 illustrates the A/V device 210 implemented with a beam splitter 2102. The beam splitter 2102 is configured to split light 2104 received from the first lens 710 of the viewer 346 into a first beam of light 2106 and a second beam of light 2108. As illustrated, a camera 2110 may be aligned to receive the first beam of light 2106 (e.g., an image sensor of the camera 2110 may be aligned to receive the first beam of light 2106). The camera 2110 may comprise the camera 314 or an additional camera (e.g., a second camera in addition to the camera 314, which may be positioned on the first component 422). The second component 424 may also include a third lens 2112 aligned to receive the second beam of light 2108 (e.g., a longitudinal axis of the third lens 2112 may be aligned to the third longitudinal axis 732 (FIG. 7B)). The third lens 2112, the first lens 710, and/or the second lens 722 may form a door viewer. The beam splitter 2102 may comprise a variety of materials, such as glass, plastic, etc. In some examples, the beam splitter 2102 comprises a cube made of two triangular prisms. In another example, the beam splitter 2102 may comprise a sheet of glass or plastic with a thin coating of metal. The beam splitter 2102 may cause some light to pass through in a direction in which it entered and some light to be reflected.

Each of the processes described herein, including the processes 2200, 2300, 2400, and 2500 are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 22:
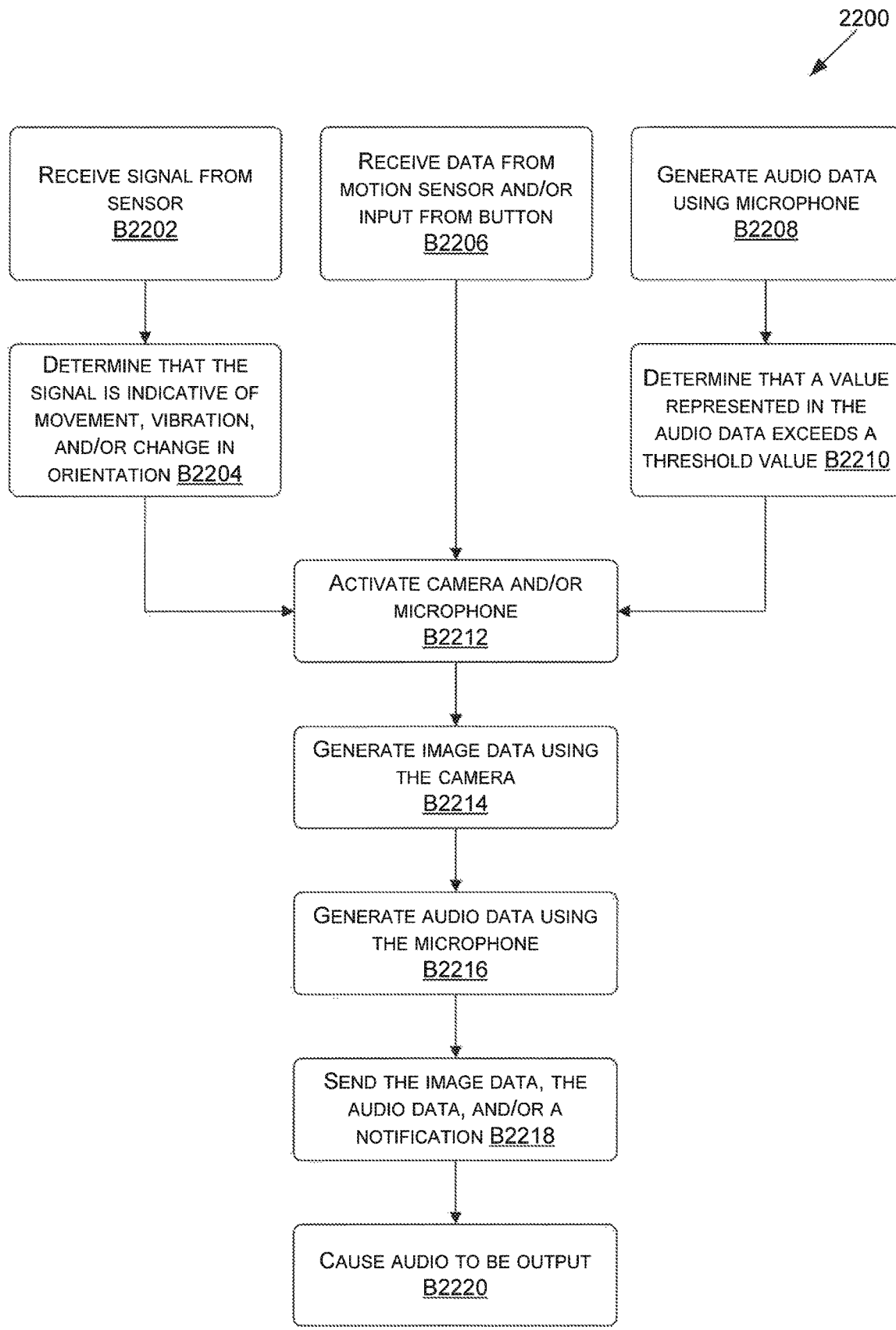
FIGS. 22 and 23 are flowcharts illustrating example processes for providing image data, audio data, and/or a notification regarding motion, vibration, movement, and/or a change in orientation at an A/V device, according to various aspects of the present disclosure.

Now referring to FIG. 22, FIG. 22 is a flowchart illustrating a process 2200 for providing image data, audio data, and/or a notification regarding motion, vibration, movement, and/or a change in orientation at an A/V device. The process 2200, at block B2202, includes receiving a signal from a sensor. For example, the one or more processors 310 of the A/V device 210 may receive a signal from the sensor 344. As noted above, the sensor 344 may include an accelerometer, a gyroscope, a magnetometer, and/or a glass break detector. In some examples, the signal may include the sensor data 420.

The process 2200, at block B2204, includes determining that the signal is indicative of movement, vibration, and/or change in orientation. For example, the A/V device 210 may determine that the signal (and/or the sensor data 420 included in the signal) is indicative of a threshold amount of movement, vibration, and/or change in orientation of the A/V device 210. Such determination may indicate that a barrier to which the A/V device 210 may be attached has been moved (e.g., opened, closed, etc.), impacted (e.g., a knock on a door, contact from an object, etc.), etc.

The process 2200, at block B2206, includes receiving data from a motion sensor and/or input from a button. For example, the one or more processors 310 of the A/V device 210 may receive the motion data 412 from the motion sensor(s) 326 and/or the input data 410 from the button 306. The process 2200, at block B2208, includes generating audio data using a microphone. For example, the microphone(s) 328 of the A/V device 210 may generate the audio data 408 in response to receiving sound.

The process 2200, at block B2210, includes determining that a value represented in the audio data exceeds a threshold value. For example, the A/V device 210 may determine that a value represented in the audio data 408 exceeds a threshold value. This may include determining that an amplitude of an audio signal, sound indicator (indicating a loudness of a sound, such as on a scale of one to ten), decibel measurement, etc. is greater than or otherwise exceeds a threshold value, such as a predetermined threshold value. In some examples, the A/V device 210 may detect more than a threshold amount of sound.

The process 2200, at block B2212, includes activating a camera and/or the microphone. For example, the one or more processors 310 of the A/V device 210 may activate the camera 314 and/or the microphone(s) 328 based on determining that the signal is indicative of movement vibration, and/or a change in orientation of the A/V device 210 at block B2204, receiving data from the motion sensor(s) 326 and/or the button 306 at block B2206, and/or determining that the value represented in the audio data 408 exceeds the threshold value at block B2210.

The process 2200, at block B2214, includes generating image data using the camera. For example, the A/V device 210 may generate, using the camera 314, the image data 406 based on activating the camera 314 at block B2212. The process 2200, at block B2216, includes generating audio data using the microphone. For example, the A/V device 210 may generate, using the microphone(s) 328, the audio data 408 based on activating the microphone(s) 328 at block B2212.

The process 2200, at block B2218, includes sending the image data, the audio data, and/or a notification. For example, the A/V device 210 may send the image data 406, the audio data 408, and/or the notification 416 to the client device 214, 216, the backend server 224, the hub device 202, and/or any other device. In some examples, the notification 416 may indicate movement, vibration, and/or a change in orientation of the A/V device 210. Further, in some examples, the notification 416 may indicate that motion was detected at the A/V device 210. Moreover, in some examples, the notification 416 may indicated that the value represented in the audio data 408 exceeds the threshold value.

The process 2200, at block B2220, includes causing audio to be output. For example, the A/V device 210 may cause audio to be output via the speaker(s) 330 of the A/V device 210. Additionally, or alternatively, the A/V device 210 may send a signal to a signaling device to cause the signaling device to output audio (e.g., through a speaker on the signaling device or otherwise).

Figure 23:
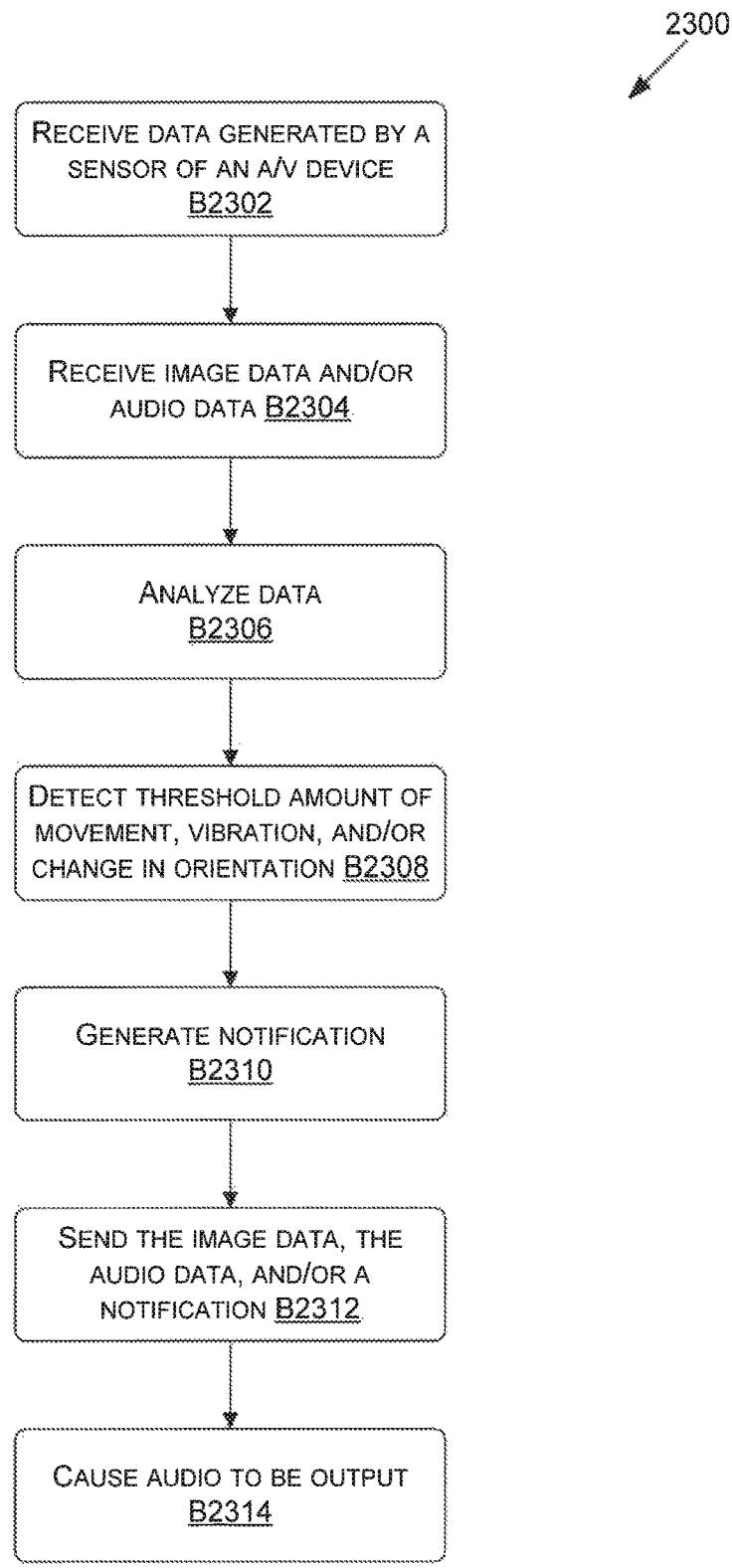

Now referring to FIG. 23, FIG. 23 is a flowchart illustrating a process 2300 for detecting movement, vibration, and/or change in orientation of an A/V device and providing data regarding such detection. The process 2300, at block B2302, includes receiving data generated by a sensor of an A/V device. For example, the backend server 224 and/or the hub device 202 may receive the sensor data 420 from the A/V device 210. The process 2300, at block B2304, includes receiving image data and/or audio data. For example, the backend server 224 and/or the hub device 202 may receive the image data 406 and/or the audio data 408 from the A/V device 210.

The process 2300, at block B2306, includes analyzing the data. For example, the backend server 224 and/or the hub device 202 may analyze the sensor data 420 and/or the audio data 408. For example, the analysis may determine that the sensor data 420 includes acceleration values from an accelerometer that are more than a threshold amount, the sensor data 420 includes orientation and/or angular velocity values from a gyroscope that are more than a threshold amount, the sensor data 420 includes values from a magnetometer that have changed by more than a threshold amount (e.g., in comparison to previous values), the sensor data 420 includes noise or vibration values from a glass break detector that are more than a threshold amount, the audio data 408 indicates more than a threshold amount of sound, and so on.

The process 2300, at block B2308, includes detecting a threshold amount of movement, vibration, and/or change in orientation. For example, based on the analysis at block B2306, the backend server 224 and/or the hub device 202 may detect a threshold amount of movement, vibration, and/or change in orientation of the A/V device 210. The process 2300, at block B2310, includes generating a notification. For example, the backend server 224 and/or the hub device 202 may generate the notification 416 based on the detecting at block B2306. In some examples, the notification 416 indicates movement, vibration, and/or change in orientation of the A/V device 210.

The process 2300, at block B2312, includes sending the image data, the audio data, and/or the notification. For example, the backend server 224 and/or the hub device 202 may send the image data 406, the audio data 408, and/or the notification 416 to the client device 214, 216 and/or any other device. In some examples, the notification 416 may indicate movement, vibration, and/or a change in orientation of the A/V device 210. Further, in some examples, the notification 416 may indicate that motion was detected at the A/V device 210.

The process 2300, at block B2314, includes causing audio to be output. For example, the backend server 224 and/or the hub device 202 may cause audio to be output via the speaker(s) 330 of the A/V device 210 (e.g., by sending a signal to the A/V device 210). Additionally, or alternatively, the backend server 224 and/or the hub device 202 may send a signal to a signaling device to cause the signaling device to output audio (e.g., through a speaker on the signaling device or otherwise).

Figure 24:
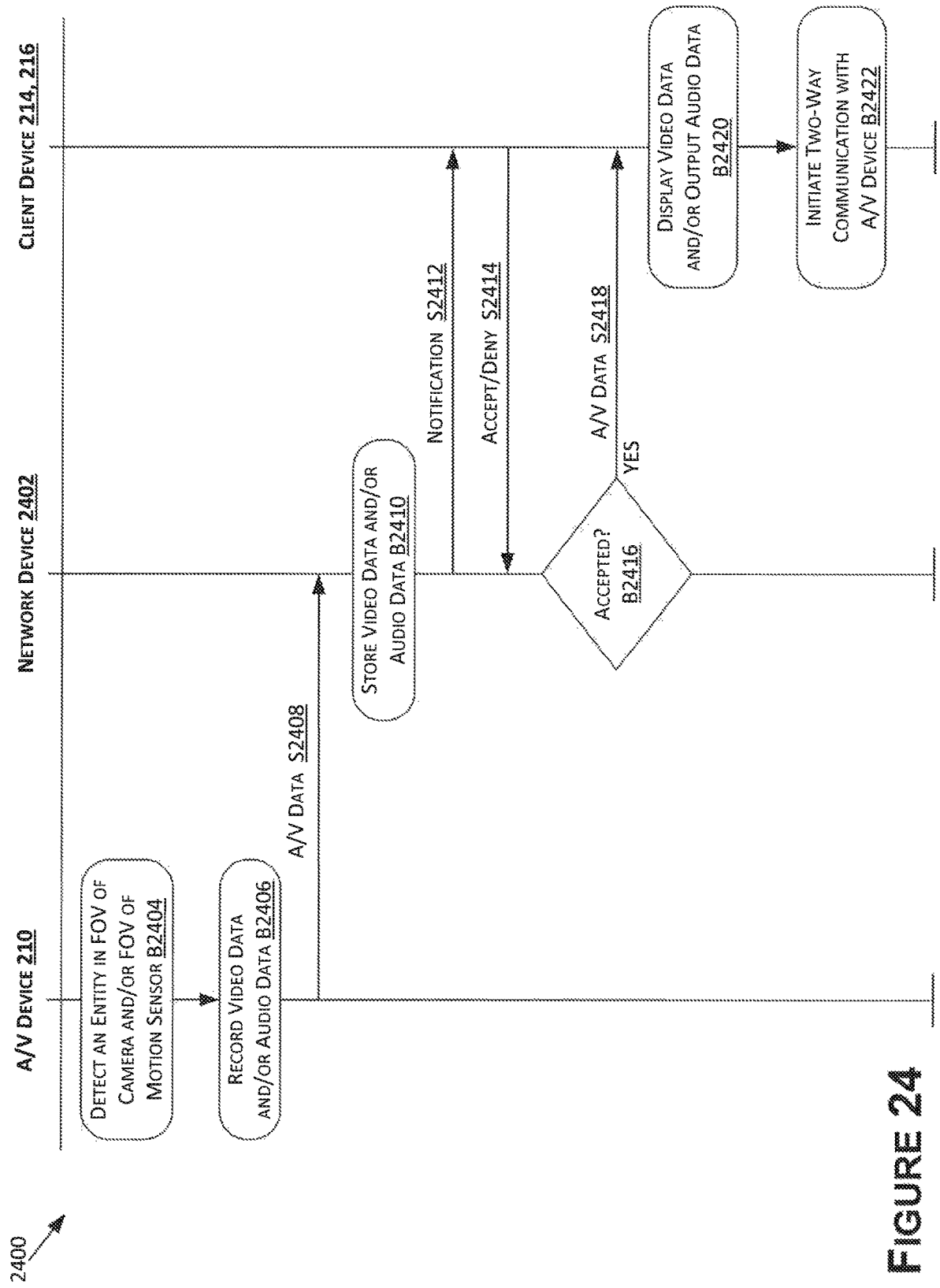
FIG. 24 is a signal diagram of a process for streaming and/or storing A/V content from an A/V device, according to various aspects of the present disclosure.

FIG. 24 is a signal diagram of a process 2400 for streaming and storing A/V content from the A/V device 210 according to various aspects of the present disclosure. The network device 2402 may include one or more of the hub device 202, the VA device 208, and/or any of the components of the network(s) of servers/backend devices 220 (e.g., the backend server 224, the backend API 226, the storage devices 222, etc.).

The process 2400, at block B2404, includes detecting an object in a field of view of a camera and/or a field of view of a motion sensor. For example, the A/V device 210 may detect the presence of an object within a field of view of view of the motion sensor(s) 326 (e.g., a motion sensor field of view) and/or a field of view of the camera 314 (e.g., a camera field of view). To detect motion using the motion sensor(s) 326, the data type (e.g., voltage for PIR sensors) from the output signal of the motion sensor(s) 326 may be analyzed, by the processor(s) 310 of the A/V device 210, to determine whether the output signal is indicative of motion of an object that should prompt the recording of the image data 406 and/or audio data 408 at block B2406 and signal S2408. To detect motion using the camera 314, the processor(s) 310 of the A/V device 210 may analyze the image data 406 by performing, for example, a frame by frame comparison of a change in pixels, to determine whether the image data 406 is indicative of motion of an object that should prompt the recording and transmission of image data 406 and/or audio data 408 at block B2406 and signal S2408.

The process 2400, at block B2406, includes recording video data and/or audio data. For example, the processor(s) 310 of the A/V device 210 may cause the camera 314 to begin generating the image data 406 and/or the microphone(s) 328 to being recording the audio data 408.

The process 2400, at signal S2408, includes transmitting the video data and/or the audio data to a network device 2402. For example, the processor(s) 310 of the A/V device 210, using the communication component 312, may transmit the image data 406 and/or the audio data 408 to the network device 2402. In response, the network device 2402 may receive, by respective processor(s) and using respective communication component(s), the image data 406 and/or the audio data 408. In some embodiments, the image data 406 and/or the audio data 408 is transmitted to the hub device 202 and/or the VA device 208, and the hub device 202 and/or the VA device 208 may transmit (or forward) the image data 406 and/or the audio data 408 to one or more components of the network(s) of servers/backend devices 220. In either embodiment, the network device 2402 may transmit the image data 406 and/or the audio data 408 to a client device(s) 214, 216. In other embodiments, the image data 406 and/or the audio data 408 may be transmitted to the hub device 202 and/or the VA device 208, and the hub device 202 and/or the VA device 208 may transmit (or forward) the image data 406 and/or the audio data 408 to the client device(s) 214, 216. Still, in some embodiments, the image data 406 and/or the audio data 408 may be transmitted directly to the client device(s) 214, 216 from the A/V device 210.

The process 2400, at block B2410, includes storing the video data and/or the audio data. For example, the network device 2402 may store the image data 406 and/or the audio data 408. The image data 406 and/or the audio data 408 may be stored for future access by the user(s) of the A/V device 210 (e.g., as Cloud storage). In some embodiments, the A/V device 210 may store the image data 406 and/or the audio data 408 locally (e.g., in the memory 402). In some embodiments, the image data 406 and/or the audio data 408 may not be stored, except during buffering, compression, and/or live (or near-live) streaming of the image data 406 and/or the audio data 408 to the client device(s) 214, 216. In such embodiments, at the conclusion of a motion event (e.g., when an object is no longer in the camera field of view and/or the motion sensor field of view), the video data and/or the audio data may be deleted from the network device 2402.

The process 2400, at signal S2412, includes transmitting a notification to the client device. For example, the network device 2402 may transmit, by the respective processor(s) and using the respective communication component(s), a notification 416 to the client device(s) 214, 216. In some embodiments, the notification 416 may be generated and transmitted, by the processor(s) 310 and using the communication component 312, directly to the client device(s) 214, 216 from the A/V device 210. The notification 416 may be a notification (e.g., a push notification, a message, (e.g., a short-message-service (SMS) message), an email, a phone call, a signal, and/or another type of notification. The notification 416 may be configured to provide a user of the client device(s) 214, 216 with an indication that an object is present at the A/V device 210. In some embodiments, the notification 416 may be informative as to the type of motion detected and/or object present at the A/V device 210. For example, if a person, an animal, a parcel, or a vehicle is present, the notification 416 may include an indication of such. As another example, if the person and/or animal detected are known to be dangerous and/or are acting suspicious (as determined using computer vision processing, image processing, behavioral analysis, third party source(s), etc.), the notification 416 may include an indication of such.

The process 2400, at signal S2414, includes transmitting an acceptance or denial of the notification. For example, the client device(s) 214, 216 may transmit, by the processor(s) 702 and using the communication component 710, an acceptance or denial of the notification 416. In various embodiments, acceptance of the notification 416 includes an acknowledgement of receipt of the notification 416 from the client device(s) 214, 216. In yet other embodiments, the acceptance includes the user interacting with (e.g., selecting through a user interface a user interface element of a modal window displayed by a display device the client device(s) 214, 216) the notification 416. Furthermore, denial of the notification 416 may include a variety of different actions and/or information. In one example, a denial includes a failure of the client device(s) 214, 216 to provide a response to the notification 416 within an interval of time. In yet another example, the denial includes the user interacting with the notification 416 by at least selecting an "ignore" user interface element of a GUI 718 of the client device(s)

214, 216. In response, the hub device 202, the VA device 208, and/or one or more components of the network(s) of servers/backend devices 220 may receive, by the respective processors and using the respective communication components, the acceptance or denial of the notification 416 from the client device(s) 214, 216.

The process 2400, at block B2416, includes determining whether the notification was accepted or denied. For example, the network device 2402 may determine, by the respective processors, whether the notification 416 was accepted or denied. In some embodiments, the processor(s) 310 of the A/V device 210, using the communication component 312, may determine whether the notification 416 was accepted or denied (e.g., in embodiments where the A/V device 210 and the client device(s) 214, 216 communicate directly). When the notification 416 is denied, the process 2400 may end, or another transmission type of the notification may be generated (e.g., if a user denies a push notification, an SMS message may be transmitted). When the notification 416 is accepted, the image data 406 and/or the audio data 408 may be transmitted to the client device(s) 214, 216 that accepted the notification 416.

The process 2400, at signal S2418, includes transmitting the video data and/or the audio data to the client device(s) 214, 216. For example, network device 2402, by the respective processor(s) and using the respective communication component(s), may transmit the image data 406 and/or the audio data 408 to the client device(s) 214, 216. In response, the client device(s) 214, 216, by the processor(s) 702 and using the communication component 710, may receive the image data 406 and/or the audio data 408. In some embodiments, the image data 406 and/or the audio data 408 may be transmitted by the processor(s) 310 of the A/V device 210, using the communication component 312, directly to the client device(s) 214, 216.

The process 2400, at block B2420, includes displaying the video data and/or outputs the audio data. For example, the processor(s) of the client device(s) 214, 216 may cause display, on the display 716 of the client device(s) 214, 216, the image data 406 and/or may cause output, by the speaker(s) 708 of the client device(s) 214, 216, the audio data 408. In addition to displaying the image data 406 and/or outputting the audio data 408, a GUI 718 may be displayed on the client device(s) 214, 216 that may allow a user of the client device(s) 214, 216 to perform one more actions. The one or more actions may include outputting a siren, or alarm, by selecting a siren/alarm icon, changing camera settings (e.g., pan, tilt, zoom, brightness, contrast, etc.) by selecting one or more camera settings icons, activating one or more modes by selecting a mode activation icon (e.g., for activating a parcel protection mode for monitoring a package in the camera field of view), arming or disarming a security system by selecting an arm/disarm icon, unlocking a door by selecting a door lock icon, etc. In some embodiments, the GUI 718 may further include a talk icon for initiating a two-way communication session between the client device(s) 214, 216 and the A/V device 210, as described below with respect to block B2422.

The process 2400, at block B2422, includes initiating a two-way communication with the A/V device. For example, the processor(s) 702 of the client device(s) 214, 216, using the communication component 710, may initiate a two-way communication session with the A/V device 210. In response, the A/V device 210 and/or the network device 2402 may receive the two-way communication request from the client device(s) 214, 216. Once the two-way communication session is established, the voice/sound input at the client device(s) 214, 216, as captured by the microphone(s) 706 of the client device(s) 214, 216, may be transmitted as audio data to the A/V device 210 for output by the speaker(s) 330. Additionally, the voice/sound input at the A/V device 210, as captured by the microphone(s) 328 of the A/V device 210, may be transmitted as audio data 408 to the client device 214, 216 for output by the speaker(s) 708 of the client device(s) 214, 216.

Figure 25:
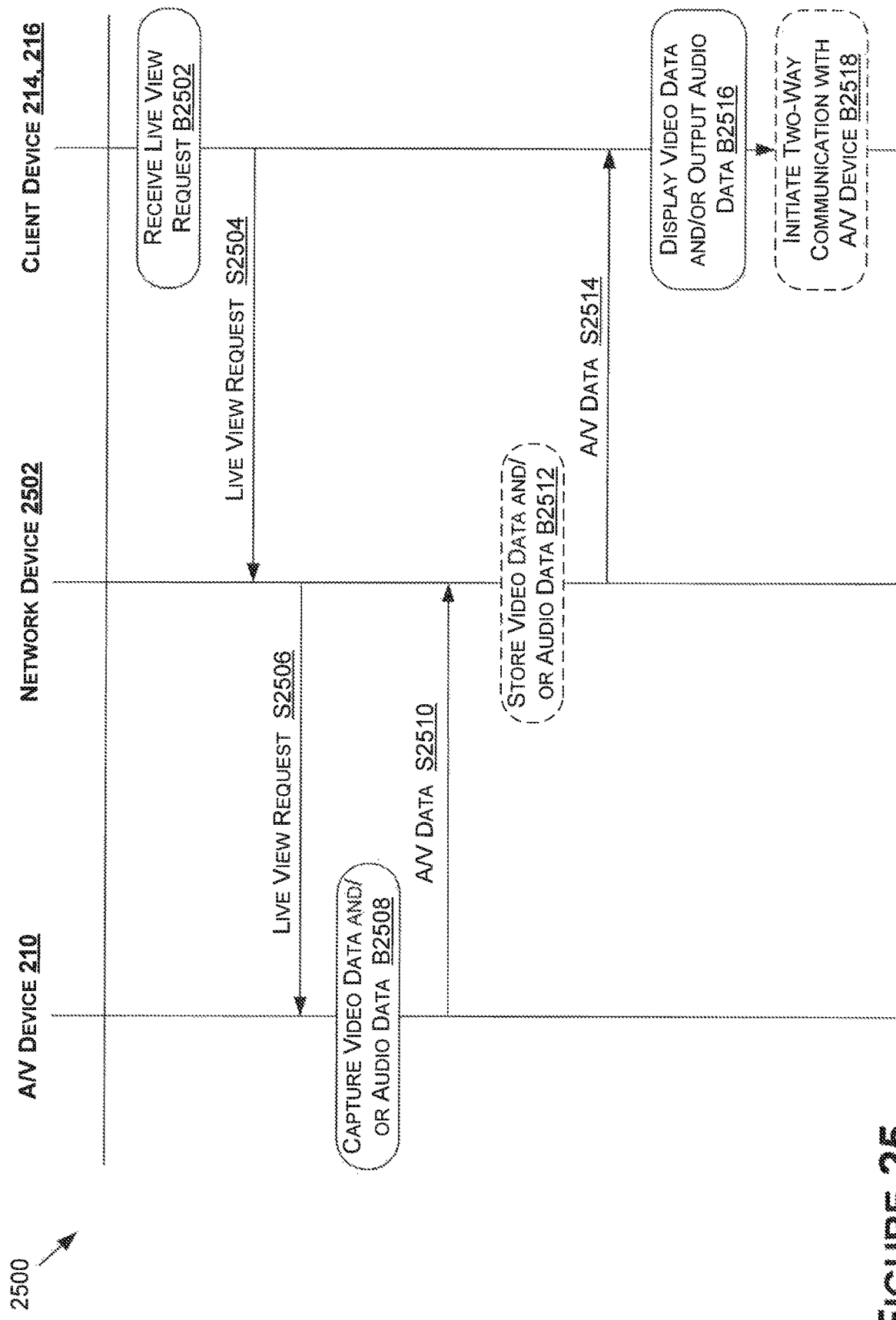
FIG. 25 is a signal diagram of a process for initiating a video-on-demand session for A/V content from an A/V device, according to various aspects of the present disclosure.

FIG. 25 is a signal diagram of a process 2500 for initiating a video-on-demand session for A/V content from an A/V device 210 according to various aspects of the present disclosure. The network device 2502 may include one or more of the hub device 202, the VA device 208, and/or any of the components of the network(s) of servers/backend devices 220 (e.g., the backend server 224, the backend API 226, the storage devices 222, etc.).

The process 2500, at block B2502, includes receiving a live view request. For example, the processor(s) 702 of the client device 214, 216 may receive a live view request from a user of the client device 214, 216. The live view request may include an input to user interface (e.g., the display 716, such as within a GUI 718 on the display 716, one or more physical buttons of the client device 214, 216, etc.).

The process 2500, at signal S2504, includes transmitting a live view request. For example, the live request may be transmitted, by the processor(s) 702 and using a communication component 710 of the client device 214, 216, to the network device 2502. In response, network device 2502 may receive, by the respective processor(s) and using the respective communication component(s), the live view request. In some embodiments, the live view request may be transmitted directly to the A/V device 210 from the client device 214, 216.

The process 2500, at signal S2506, includes transmitting the live request. For example, network device 2502 may transmit (or forward), by the respective processor(s) and using the respective communication component(s), the live view request to the A/V device 210. In response, the processor(s) 310 of the A/V device 210, using the communication component 312, may receive the live view request.

The process 2500, at block B2508, includes capturing video data and/or audio data. For example, in response to receiving the live view request, the processor(s) 310 of the A/V device 210 may cause the camera 314 to record the image data 406 and/or the microphone(s) 328 to record the audio data 408.

The process 2500, at signal S2510, includes transmitting the video data and/or the audio data. This process may be similar to that of signal S2408 of the process 2400, described above.

The process 2500, at block B2512, includes storing the video data and/or the audio data. This process may be similar to that of block B2410 of the process 2400, described above.

The process 2500, at block S2514, includes transmitting the video data and/or the audio data to the client device. This process may be similar to that of signal S2418 of the process 2400, described above.

The process 2500, at block B2516, includes displaying the video data and/or outputs the audio data. This process may be similar to that of block B2420 of the process 2400, described above.

The process 2500, at block B2518, includes initiating two-way communication with the A/V device 210. This process may be similar to that of block B2422 of the process 2400, described above.

Figure 26:
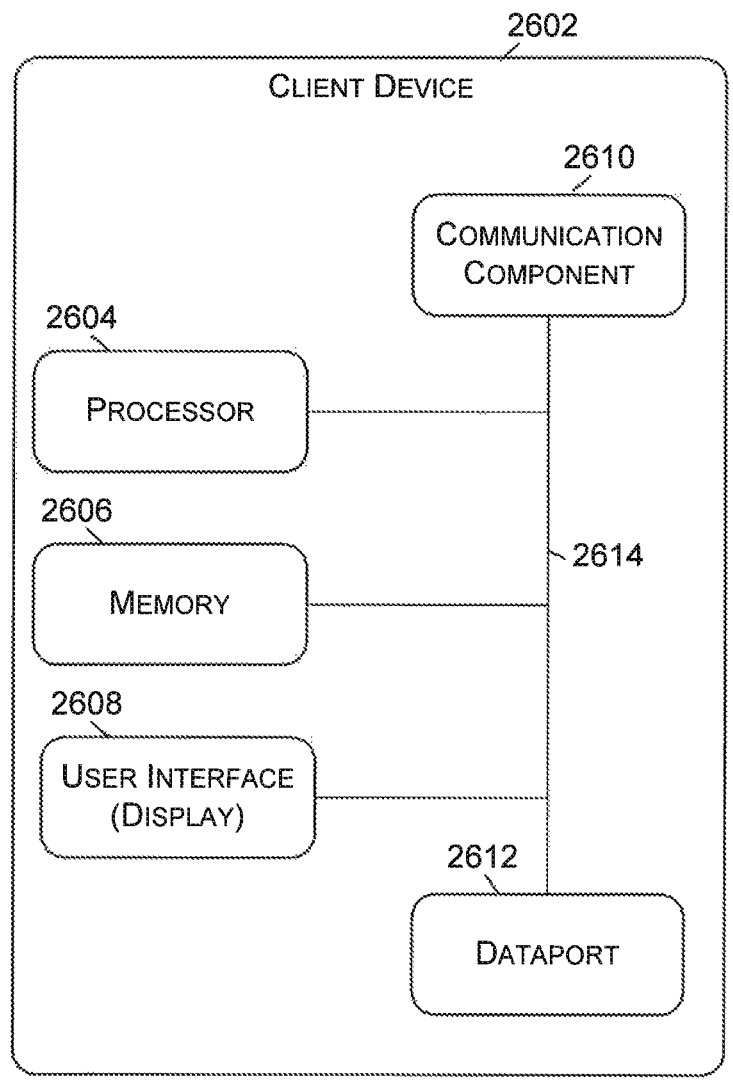
FIG. 26 is a functional block diagram of a client device on which the present embodiments may be implemented, according to various aspects of the present disclosure.

FIG. 26 is a functional block diagram of a client device 2602 on which the present embodiments may be implemented according to various aspects of the present disclosure. The client device(s) 214, 216 described with reference to FIG. 2 may include some or all of the components and/or functionality of the client device 2602. The client device 2602 may comprise, for example, a smartphone.

With reference to FIG. 26, the client device 2602 includes a processor 2604, a memory 2606, a user interface 2608, a communication component 2610, and a dataport 2612. These components are communicatively coupled together by an interconnect bus 2614. The processor 2604 may include any processor used in smartphones and/or portable computing devices, such as an ARM processor (a processor based on the RISC (reduced instruction set computer) architecture developed by Advanced RISC Machines (ARM).). In some embodiments, the processor 2604 may include one or more other processors, such as one or more conventional microprocessors, and/or one or more supplementary co-processors, such as math co-processors.

The memory 2606 may include both operating memory, such as random-access memory (RAM), as well as data storage, such as read-only memory (ROM), hard drives, flash memory, or any other suitable memory/storage element. The memory 2606 may include removable memory elements, such as a CompactFlash card, a MultiMediaCard (MMC), and/or a Secure Digital (SD) card. In some embodiments, the memory 2606 may comprise a combination of magnetic, optical, and/or semiconductor memory, and may include, for example, RAM, ROM, flash drive, and/or a hard disk or drive. The processor 2604 and the memory 2606 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 2604 may be connected to the memory 2606 via the dataport 2612.

The user interface 2608 may include any user interface or presentation elements suitable for a smartphone and/or a portable computing device, such as a keypad, a display screen, a touchscreen, a microphone, and a speaker. The communication component 2610 is configured to handle communication links between the client device 2602 and other, external devices or receivers, and to route incoming/outgoing data appropriately. For example, inbound data from the dataport 2612 may be routed through the communication component 2610 before being directed to the processor 2604, and outbound data from the processor 2604 may be routed through the communication component 2610 before being directed to the dataport 2612. The communication component 2610 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 2612 may be any type of connector used for physically interfacing with a smartphone and/or a portable computing device, such as a mini-USB port or an IPHONE®/IPOD® 30-pin connector or LIGHTNING® connector. In other embodiments, the dataport 2612 may include multiple communication channels for simultaneous communication with, for example, other processors, servers, and/or client terminals.

The memory 2606 may store instructions for communicating with other systems, such as a computer. The memory 2606 may store, for example, a program (e.g., computer program code) adapted to direct the processor 2604 in accordance with the present embodiments. The instructions also may include program elements, such as an operating system. While execution of sequences of instructions in the program causes the processor 2604 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 27:
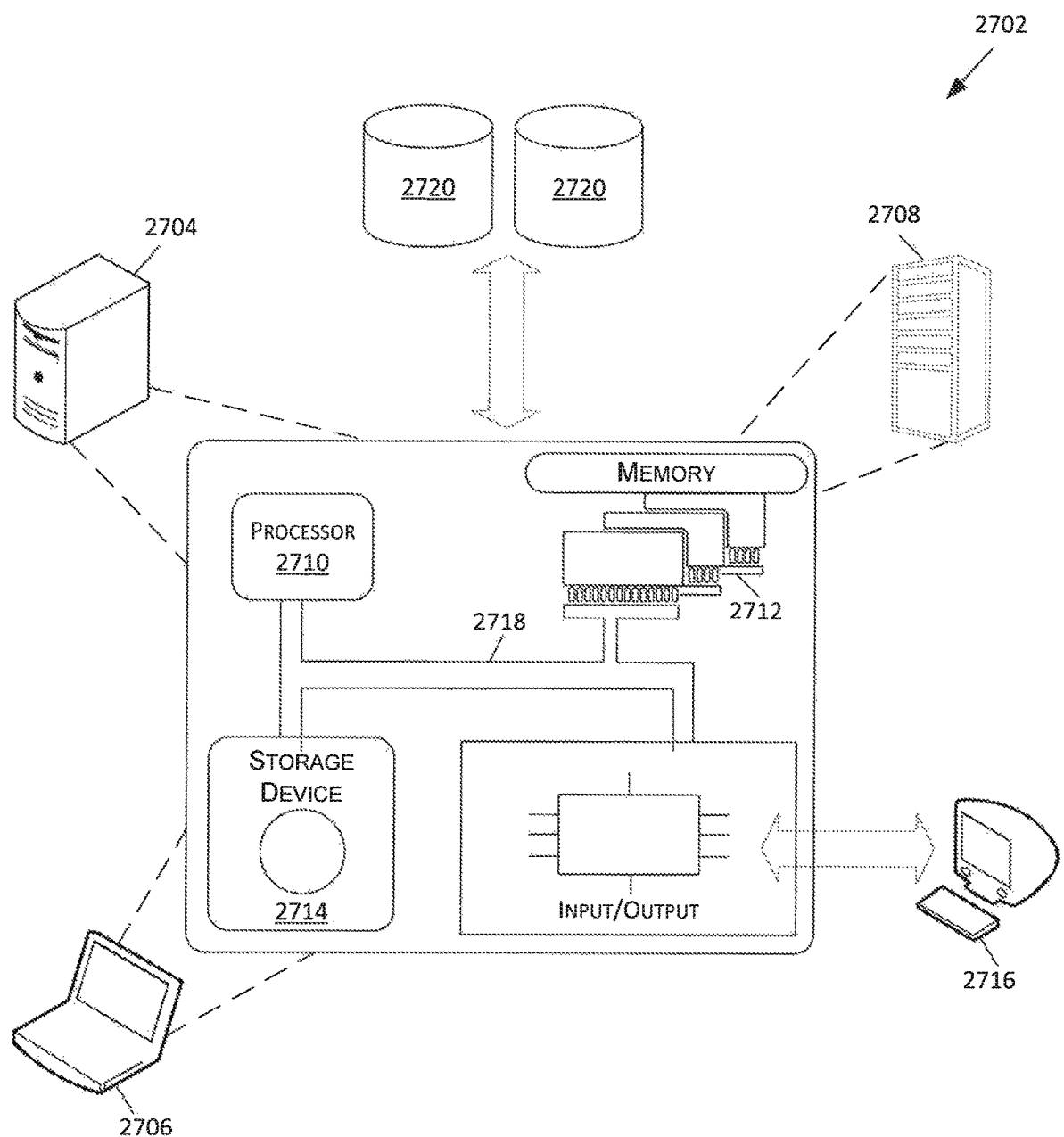
FIG. 27 is a functional block diagram of a general-purpose computing system on which the present embodiments may be implemented, according to various aspects of present disclosure.

FIG. 27 is a functional block diagram of a general-purpose computing system on which the present embodiments may be implemented according to various aspects of the present disclosure. The computer system 2702 may be embodied in at least one of a personal computer (also referred to as a desktop computer) 2704, a portable computer (also referred to as a laptop or notebook computer) 2706, and/or a server 2708 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 2702 may execute at least some of the operations described above. The computer system 2702 may include at least one processor 2710, memory 2712, at least one storage device 2714, and input/output (I/O) devices 2716. Some or all of the components 2710, 27 12, 2714, 2716 may be interconnected via a system bus 2718. The processor 2710 may be single- or multi-threaded and may have one or more cores. The processor 2710 execute instructions, such as those stored in the memory 2712 and/or in the storage device 2714. Information may be received and output using one or more I/O devices 2716.

The memory 2712 may store information, and may be a computer-readable medium, such as volatile or non-volatile memory. The storage device(s) 2714 may provide storage for the system 2702 and, in some embodiments, may be a computer-readable medium. In various aspects, the storage device(s) 2714 may be a flash memory device, a hard disk device, an optical disk device, a tape device, or any other type of storage device.

The I/O devices 2716 may provide input/output operations for the system 2702. The I/O devices 2716 may include a keyboard, a pointing device, and/or a microphone. The I/O devices 2716 may further include a display unit for displaying graphical user interfaces, a speaker, and/or a printer. External data may be stored in one or more accessible external databases 2720.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

Figure 28:
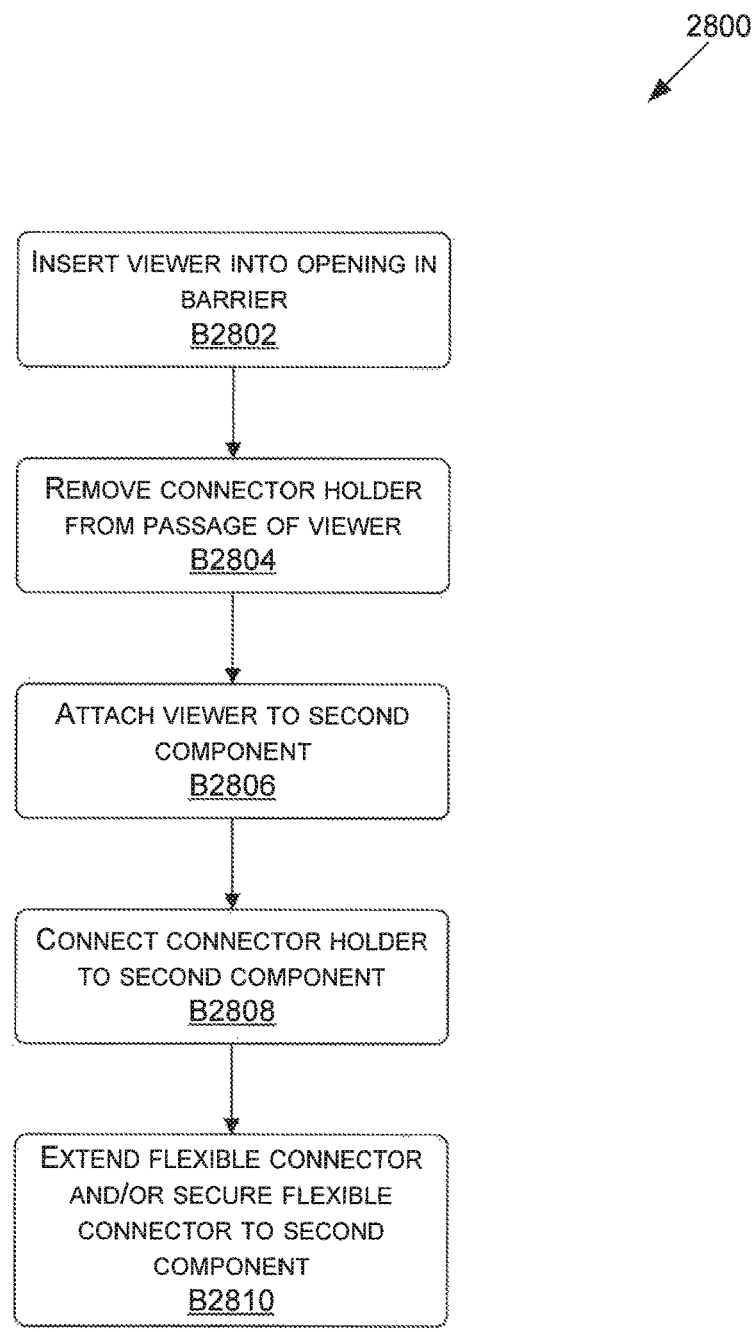
FIG. 28 is a flowchart illustrating an example process for installing various embodiments of the present A/V devices, according to various aspects of the present disclosure.

FIG. 28 is a flowchart illustrating a process 2800 for installing an A/V device on a barrier (e.g., a door) according to various embodiments of the present disclosure. In examples, the process 2800 may be performed by a user. For ease of illustration, the process 2800 will be discussed in the context of the example A/V device 210 discussed herein.

Prior to block B2802, the first end 704 (FIG. 7A) of the viewer 346 may be connected to the first component 422, the flexible connector 426 may be attached to the connector holder 1904 (FIG. 19E), and the connector holder 1904 may be disposed within the opening 347(A) of the passage 708 of the viewer 346 (FIG. 19K). In some embodiments, at least one of the foregoing steps may be an aspect of the process 2800, while in other embodiments these steps may be precursors to the process 2800, but not part of the process 2800 itself.

The process 2800, at block B2802, includes inserting the viewer into an opening in the barrier. For example, the viewer 346, which includes the connector holder 1904 disposed within the opening 347(A) of the viewer 346, may be inserted into an opening in a barrier. The barrier may be a door, and the viewer 346 may be inserted into the opening in the door from the outside, such that the first component 422 is disposed adjacent the outside surface of the door. In examples, the flexible connector 426 extends along the flat portion 752 of the tubular member 347, outside of the viewer 346.

The process 2800, at block B2804, includes removing (e.g., withdrawing) the connector holder from a passage of the viewer. For example, the connector holder 1904 may be pulled out from the opening 347(A) of the viewer 346.

The process 2800, at block B2806, includes attaching the viewer to the second component. For example, the second part 744 (FIG. 7B) of the viewer 346 may be inserted into the second opening 730 in the second component 424, and the fastener 428 may be attached to the second part 744 of the viewer 346 and tightened. Tightening the fastener 428 on the second part 744 of the viewer 346 brings the second component 424 and the first component 422 closer together, sandwiching the barrier in between and bringing the first and second components 422, 424 into close abutment with their respective sides of the barrier. Tightening the fastener 428 on the second part 744 of the viewer 346 also compresses the first gasket 756 between the first component 422 and the outer surface of the barrier, and compresses the second gasket 754 between the second component 424 and the inner surface of the barrier. The gaskets 754, 756, which may comprise a high-friction material, may resist movement of the first and second components 422, 424 relative to the barrier. The gaskets 754, 756, and particularly the ribbed portions 754(A), 756(A), 756(B) of the gaskets 754, 756 (FIGS. 18A-18B), may further provide moisture sealing for the space between the first component 422 and the barrier and the space between the second component 424 and the barrier.

The process 2800, at block B2808, includes connecting the connector holder to the second component. For example, the second coupler 738 (FIG. 19E) housed within the connector holder 1904 may be connected to the second connection port 740 (FIG. 19I) located in the first end 1908(A) of the channel 1908. Connecting the second coupler 738 to the second connection port 740 electrically and communicatively couples the first component 422 to the second component 424.

The process 2800, at block B2810, includes extending the flexible connector and/or securing the flexible connector to the second component. For example, the tab 1906 of the flexible connector 426 may pulled downward to tighten up excess length in the flexible connector 426, and the tab 1906 may then be seated within the channel 1908 to secure the flexible connector 426 to the second component 424. In examples, the flexible connector 426 includes the tab 1906 slidably disposed along its length.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present disclosure is not limited to the particular embodiments disclosed. On the contrary, the present disclosure covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Example Clauses

A. An audio/video (A/V) recording and communication device (A/V device) comprising: a viewer having an elongated tubular shape, a first end, a second end, and a passage extending between the first end and the second end; a first component coupled to the first end of the viewer, the first component comprising: a button; a camera; one or more processors; and memory communicatively coupled to the one or more processors; a second component coupled to the second end of the viewer, the second component comprising: a battery; and a wireless transceiver; and a flexible connector extending along an outside of the viewer and electrically coupling the first component and the second component to one another; wherein the memory stores executable instructions that, when executed by the one or more processors, cause the one or more processors to perform operations comprising: receiving, using the button, an input; generating, using the camera, image data representative of a field of view of the camera; and sending, using the wireless transceiver, the image data to a network device.

B. The A/V device of example A, wherein the flexible connector comprises a flex printed circuit board.

C. The A/V device of example A or B, further comprising: a connector holder attached to the flexible connector and removably securable within a first end of a channel within the second component; and a tab removably securable within a second end of the channel.

D. The A/V device of any of examples A through C, wherein the channel includes a ledge and an undercut, and the tab has at least one detent to seat within the undercut beneath the ledge.

E. The A/V device of any of examples A through D, wherein the tab engages the channel in a friction fit.

F. The A/V device of any of examples A through E, wherein a service loop of the flexible connector is retained within the channel when the tab is seated within the second end of the channel, a length of the channel accommodating a length of the service loop when the flexible connector is extended in an installed state.

G. The A/V device of any of examples A through F, wherein the connector holder is received within the passage of the viewer.

H. The A/V device of any of examples A through G, wherein: the flexible connector includes a coupler attached to the first portion of the connector holder; and the second component includes a connection port to connect to the coupler.

I. An audio/video (A/V) recording and communication device (A/V device) comprising: a viewer having an elongated tubular shape, a first end, a second end, and a passage extending between the first end and the second end; a first component coupled to the first end of the viewer, the first component comprising: a button; and a camera; a second component coupled to the second end of the viewer, the second component comprising: a battery; and a wireless transceiver; a flexible connector electrically coupling the first component and the second component to one another; one or more processors; and memory communicatively coupled to the one or more processors and storing executable instructions that, when executed by the one or more processors, cause the one or more processors to perform operations comprising: receiving, using the button, an input; generating, using the camera, image data representative of a field of view of the camera; and sending, using the wireless transceiver, the image data to a network device.

J. The A/V device of example I, wherein: a cross-sectional shape of the viewer includes a rounded portion and a flat portion; and the flexible connector extends along an outside of the viewer adjacent to the flat portion.

K. The A/V device of example I or J, wherein the second component further comprises: a beam splitter for splitting light received from a first lens of the viewer into a first beam of light and a second beam of light; an image sensor aligned to receive the first beam of light; and a second lens aligned to receive the second beam of light.

L. The A/V device of any of examples I through K, further comprising: a first lens disposed in the passage of the viewer; and a second lens attached to the first end of the viewer.

M. The A/V device of any of examples I through L, further comprising: a connector holder attached to the flexible connector and removably securable within a first end of a channel within the second component; and a tab removably securable within a second end of the channel.

N. The A/V device of any of examples I through M, wherein the channel includes a ledge and an undercut, and the tab has at least one detent to seat within the undercut beneath the ledge.

O. The A/V device of any of examples of I through N, wherein the tab engages the channel in a friction fit.

P. The A/V device of any of examples I through O, wherein a service loop of the flexible connector is retained within the channel when the tab is seated within the second end of the channel, a length of the channel accommodating a length of the service loop when the flexible connector is extended in an installed state.

Q. A method of mounting an audio/video (A/V) recording and communication device (A/V device) on a barrier, the A/V device including a first component, a second component, a viewer, and a flexible connector coupled to the first component and extending along an outside of the viewer, the method comprising: inserting a viewer of the A/V device into an opening in the barrier, the viewer having an elongated tubular shape, a first end, a second end, and a passage extending between the first end and the second end, a connector holder of the flexible connector being disposed within the passage; withdrawing the connector holder of the flexible connector from the passage; inserting the second end of the viewer into an opening in the second component of the A/V device; attaching the viewer to the second component; and connecting the connector holder to the second component.

R. The method of examples Q, wherein: the connector holder houses a coupler of the flexible connector; the second component comprises a connection port; and connecting the connector holder to the second component comprises connecting the coupler to the connection port.

S. The method of example Q or R, wherein the flexible connector includes a tab slidably disposed along its length.

T. The method of any of examples Q through S, further comprising: after connecting the coupler to the connection port, pulling the tab downward to remove slack from the flexible connector; and securing the tab within a channel of the second component.

What is claimed is:

1. An audio/video (A/V) recording and communication device (A/V device) comprising:
   a viewer having an elongated tubular shape, a first end, a second end, and a passage extending between the first end and the second end;
   a first component coupled to the first end of the viewer, the first component comprising:
      a first opening that substantially aligns with the passage of the viewer;
      a button;
      a camera located outside of the first opening;
      one or more processors; and
      memory communicatively coupled to the one or more processors;
   a second component coupled to the second end of the viewer, the second component comprising:
      a second opening extending through the second component, the second opening substantially aligning with the passage of the viewer;
      a battery; and
      a wireless transceiver; and
   a flexible connector extending along an outside of the viewer and electrically coupling the first component and the second component to one another;
   wherein the memory stores executable instructions that, when executed by the one or more processors, cause the one or more processors to perform operations comprising:
      receiving, using the button, an input;
      generating, using the camera, image data representative of a field of view of the camera; and
      sending, using the wireless transceiver, the image data to a network device.

2. The A/V device of claim 1, wherein the flexible connector comprises a flex printed circuit board.

3. The A/V device of claim 1, further comprising:
   a connector holder attached to the flexible connector and removably securable within a first end of a channel within the second component; and
   a tab removably securable within a second end of the channel.

4. The A/V device of claim 3, wherein the channel includes a ledge and an undercut, and the tab has at least one detent to seat within the undercut beneath the ledge.

5. The A/V device of claim 4, wherein the tab engages the channel in a friction fit.

6. The A/V device of claim 3, wherein a service loop of the flexible connector is retained within the channel when the tab is seated within the second end of the channel, a length of the channel accommodating a length of the service loop when the flexible connector is extended in an installed state.

7. The A/V device of claim 3, wherein the connector holder is received within the passage of the viewer.

8. The A/V device of claim 3, wherein:
   the flexible connector includes a coupler attached to the first portion of the connector holder; and
   the second component includes a connection port to connect to the coupler.

9. An audio/video (A/V) recording and communication device (A/V device) comprising:
   a viewer having an elongated tubular shape, a first end, a second end, and a passage extending between the first end and the second end;
   a first component coupled to the first end of the viewer, the first component comprising:
      a first opening that substantially aligns with the passage of the viewer;
      a button; and
      a camera located outside of the first opening;
   a second component coupled to the second end of the viewer, the second component comprising:
      a second opening extending through the second component, the second opening substantially aligning with the passage of the viewer;
      a battery; and
      a wireless transceiver;
   a flexible connector electrically coupling the first component and the second component to one another;
   one or more processors; and
   memory communicatively coupled to the one or more processors and storing executable instructions that, when executed by the one or more processors, cause the one or more processors to perform operations comprising:
      receiving, using the button, an input;
      generating, using the camera, image data representative of a field of view of the camera; and
      sending, using the wireless transceiver, the image data to a network device.

10. The A/V device of claim 9, wherein:
    a cross-sectional shape of the viewer includes a rounded portion and a flat portion; and
    the flexible connector extends along an outside of the viewer adjacent to the flat portion.

11. The A/V device of claim 9, wherein the second component further comprises:
    a beam splitter for splitting light received from a first lens of the viewer into a first beam of light and a second beam of light;
    an image sensor aligned to receive the first beam of light; and
    a second lens aligned to receive the second beam of light.

12. The A/V device of claim 9, further comprising:
a first lens disposed in the passage of the viewer; and
a second lens attached to the first end of the viewer.

13. The A/V device of claim 9, further comprising:
a connector holder attached to the flexible connector and removably securable within a first end of a channel within the second component; and
a tab removably securable within a second end of the channel.

14. The A/V device of claim 13, wherein the channel includes a ledge and an undercut, and the tab has at least one detent to seat within the undercut beneath the ledge.

15. The A/V device of claim 14, wherein the tab engages the channel in a friction fit.

16. The A/V device of claim 13, wherein a service loop of the flexible connector is retained within the channel when the tab is seated within the second end of the channel, a length of the channel accommodating a length of the service loop when the flexible connector is extended in an installed state.

17. A method of mounting an audio/video (A/V) recording and communication device (A/V device) on a barrier, the A/V device including a first component, a second component, a viewer, and a flexible connector coupled to the first component and extending along an outside of the viewer, the method comprising:
inserting a viewer of the A/V device into an opening in the barrier, the viewer having an elongated tubular shape, a first end, a second end, and a passage extending between the first end and the second end, a connector holder of the flexible connector being disposed within the passage;
withdrawing the connector holder of the flexible connector from the passage;
inserting the second end of the viewer into an opening in the second component of the A/V device;
attaching the viewer to the second component; and
connecting the connector holder to the second component.

18. The method of claim 17, wherein:
the connector holder houses a coupler of the flexible connector;
the second component comprises a connection port; and
connecting the connector holder to the second component comprises connecting the coupler to the connection port.

19. The method of claim 18, wherein the flexible connector includes a tab slidably disposed along its length.

20. The method of claim 19, further comprising:
after connecting the coupler to the connection port, pulling the tab downward to remove slack from the flexible connector; and
securing the tab within a channel of the second component.

* * * * *